US012732325B2

(12) United States Patent
Park et al.

(10) Patent No.: US 12,732,325 B2
(45) Date of Patent: Sep. 8, 2026

(54) SELECTING A SIDELINK POSITION REFERENCE SIGNAL CONFIGURATION BASED ON AVAILABLE POWER

(71) Applicant: SHARP KABUSHIKI KAISHA, Sakai City (JP)

(72) Inventors: Kenneth James Park, Cathlamet, WA (US); Zhanping Yin, Vancouver, WA (US); Tomoki Yoshimura, Camas, WA (US); Rudraksh Shrivastava, Erligheim (DE)

(73) Assignee: SHARP KABUSHIKI KAISHA, Sakai City (JP)

( * ) Notice: Subject to any disclaimer, the term of this patent is extended or adjusted under 35 U.S.C. 154(b) by 377 days.

(21) Appl. No.: 18/478,986

(22) Filed: Sep. 29, 2023

(65) Prior Publication Data

US 2025/0112746 A1 Apr. 3, 2025

(51) Int. Cl.
*H04L 5/00* (2006.01)
*H04W 76/20* (2018.01)

(52) U.S. Cl.
CPC ........... *H04L 5/0051* (2013.01); *H04W 76/20* (2018.02)

(58) Field of Classification Search
CPC ..... H04L 5/0051; H04L 5/0053; H04W 76/20
See application file for complete search history.

(56) References Cited

U.S. PATENT DOCUMENTS

2016/0174232 A1* 6/2016 Krishnamoorthy .. H04B 1/1027 455/452.2
2021/0105760 A1* 4/2021 Chen ................. H04W 72/0446
2022/0286247 A1* 9/2022 Liu ....................... H04L 5/0051

FOREIGN PATENT DOCUMENTS

WO WO-2022269467 A2 * 12/2022 ............ H04W 64/00

* cited by examiner

*Primary Examiner* — Jamal Javaid
(74) *Attorney, Agent, or Firm* — ScienBiziP, P.C.

(57) ABSTRACT

An energy harvesting transmitting wireless terminal for wirelessly communicating with a receiving wireless terminal is provided. The wireless terminal includes at least one processor that is configured to select a first Sidelink Position Reference Signal (SL-PRS) configuration from several SL-PRS configurations and determine whether the power required for transmitting the SL-PRS using the selected SL-PRS configuration satisfies a minimum receiving power threshold of the receiving wireless terminal. When the power does not satisfy the minimum receiving power threshold, the processor selects another SL-PRS configuration and repeats the determining and selecting until the power required for transmitting the SL-PRS using the selected SL-PRS configuration satisfies the minimum receiving power threshold or until the last SL-PRS configuration is not selected. The processor transmits the SL-PRS using the selected SL-PRS configuration when the selected SL-PRS configuration satisfies the minimum receiving power threshold.

11 Claims, 21 Drawing Sheets

SELECTING A SIDELINK POSITION REFERENCE SIGNAL CONFIGURATION BASED ON AVAILABLE POWER

TECHNICAL FIELD

The technology generally relates to wireless communications, and more particularly, to Sidelink Position Reference Signal (SL-PRS) transmission by a device in a wireless network.

BACKGROUND

The 3rd Generation Partnership Project (3GPP) (e.g., as indicated in Release 17 (Rel-17) of 3GPP) has conducted studies relating to "NR positioning enhancements" and "scenarios and requirements of in-coverage, partial coverage, and out-of-coverage NR positioning use cases."

The study regarding NR positioning enhancements investigated higher accuracy and lower latency location determination, particularly in view of high integrity and reliability requirements resulting from new applications and industry verticals for a fifth generation (5G) network, such as New Radio (NR). Some of the enhancements identified during this work have been specified in the 3GPP Rel-17 Work Item (WI) on "NR Positioning Enhancements," but several opportunities for enhancement remain that are yet to be studied and/or released in any of the 3GPP specifications.

The study relating to scenarios and requirements of in-coverage, partial coverage, and out-of-coverage NR positioning use cases focuses on vehicle-to-everything (V2X) features and public safety use cases (e.g., where the outcome has been captured in Technical Report (TR) 38.845). Additionally, the 3GPP Technical Specification Group (TSG) Service and System Aspects (SA) Working Group 1 (WG1) (more commonly known as "SA1") has developed requirements in Technical Specification (TS) 22.261 for "ranging-based services" and has developed positioning accuracy requirements in TS 22.104 for Industrial Internet of Things (IIoT) use cases (e.g., in out-of-coverage scenarios). However, there remains a need for 3GPP to study and develop sidelink (SL) positioning solutions that may support the use cases, scenarios, and requirements identified during such activities.

Regarding higher accuracy, promising techniques identified in earlier studies may be considered in the 3GPP Rel-18 study (e.g., the "Study on expanded and improved NR positioning (Acronym: FS_NR_pos_enh2), as discussed in 3GPP Radio Access Network (RAN) Work Item Description (WID) RP-213588). One aspect of the study looks to take advantage of the rich 5G spectrum to increase the bandwidth for the transmission and reception of Positioning Reference Signals (PRSs). That is, enhancements to positioning techniques may be achieved by taking advantage of the wider bandwidths provided by NR, for example, by way of Frequency Range 1 (FR1) (e.g., below 7.125 gigahertz (GHz)) and FR2 (e.g., the millimeter wave range of 24.25 to 71.2 GHz), such that different PRSs may be allocated to resources that may be transmitted and/or received by both a base station (e.g., Next Generation NodeB (gNB)) and a user equipment (UE).

In addition, the 3GPP TSG Radio Access Network WG1 (more commonly known as "RAN1") has begun a Rel-18 study on expanded and improved NR positioning, which derives many of its requirements from the above SA1 requirements. This RAN1 study covers three main areas: (1) sidelink positioning, (2) improved positioning accuracy, integrity, and power efficiency, and (3) positioning for "RedCap" (reduced capacity) UEs.

Low Power Wireless Access (LPWA) technologies such as Machine Type Communication (MTC), Narrowband IoT (NB-IoT), and Reduced Capability (RedCap) have been developed to fulfil the increasing demand from verticals to address market segments that are not well served by higher power/higher cost devices (e.g., UE's). These LPWA technologies have achieved low cost, low power and massive connections and may meet requirements of many applications. However, there are still many use cases and applications that cannot be addressed. For example, a conventional battery-powered device may not be deployed in extreme environmental conditions (e.g., high pressure, extremely high/low temperature, humid environment). Also, conventional battery devices cannot be used where maintenance-free devices are required (e.g., where the devices are inaccessible, and it is not possible to replace the device battery). Additionally, ultra-low complexity, very small device size/form factor (e.g., thickness of mm), longer life cycle, etc., are required for mass market use cases.

A new 3GPP IoT technology is emerging that relies on ultra-low complexity wireless terminals/devices with ultra-low power consumption for very-low end IoT applications. An example of such wireless terminals is an Ambient IoT (AIOT) device, which is an IoT device that is powered by energy harvesting. The harvested power may be obtained from the energy that is inherently available in the device's environment. Typically, an energy harvesting wireless terminal may not have a conventional battery, and the device may use energy harvested from the environment in lieu of a dedicated internal power source. For example, an energy harvesting wireless terminal may harvest energy from radio waves coming from different sources such as the 5G NR network entities, user equipment, or other sources of radio waves. An ambient power enabled IoT device may harvest energy from solar, light, motion, vibration, heat, pressure, or any other power sources.

As a new type of service provided by 5G, such energy harvesting wireless terminals lead to new functional and performance requirements to the 5G System (5GS). Specifically, the energy harvesting wireless terminals use cases require new functional requirements, for example, communication aspects of energy harvesting wireless terminals and network, positioning of energy harvesting wireless terminals, management of energy harvesting wireless terminals, exposure of related network capabilities, of data collected by the energy harvesting wireless terminals and of information about the energy harvesting wireless terminals, charging, security, and privacy. New performance may be required to support energy harvesting wireless terminals, for example, maximum allowed end-to-end latency, communication service availability, user-experienced data rate, message size, device density, communication range and positioning accuracy.

There are currently energy harvesting wireless terminal use cases and scenarios that may not be fulfilled by the existing 3GPP LPWA IoT technology. These uses cases include extreme environmental conditions, ultra-low complexity devices, devices with minimal form factor (e.g., thickness of mm), maintenance-free devices, devices with longer life cycles, and where a device driven by a conventional battery is not applicable. The use cases may be included into several groups, such as inventory, sensors, positioning, and actuators (e.g., switches). Fulfilling these use cases requires identifying the energy harvesting wireless terminal positioning requirements and incorporating these requirements in 3GPP.

SUMMARY

In a first aspect of the present application, a transmitting wireless terminal for wirelessly communicating with a receiving wireless terminal is provided. The transmitting wireless terminal harvests energy as a power source. The transmitting wireless terminal includes one or more non-transitory computer-readable media storing one or more computer-executable instructions and at least one processor coupled to the one or more non-transitory computer-readable media, and configured to execute the one or more computer-executable instructions to cause the transmitting wireless terminal to retrieve an SL-PRS configuration specifying a first number of symbols for transmission of the SL-PRS to the receiving wireless terminal and modify the SL-PRS configuration into several of modified SL-PRS configurations. Each modified SL-PRS configuration in the several modified SL-PRS configurations specifies a lower number of symbols for the transmission of the SL-PRS than the first number of symbols, and a power required for transmitting the SL-PRS using each of the several modified SL-PRS configurations satisfies a minimum receiving power threshold of the receiving wireless terminal. at least one processor is further configured to select one of the several modified SL-PRS configurations that results in a maximum number of SL-PRS symbols transmitted and transmit the SL-PRS using the selected of the several modified SL-PRS configurations.

In an implementation of the first aspect, modifying the SL-PRS configuration includes modifying at least one of the several modified SL-PRS configurations by reducing a density of subcarrier and symbols occupied by each transmitted SL-PRS.

In another implementation of the first aspect, modifying the SL-PRS configuration includes modifying at least one of several modified SL-PRS configurations by reducing a number of symbols that carry the SL-PRS.

In another implementation of the first aspect, modifying the SL-PRS configuration includes modifying at least one of the several modified SL-PRS configurations by reducing a number of Physical Resource Blocks (PRBs) allocated to the SL-PRS.

In another implementation of the first aspect, the SL-PRS configuration is stored in the one or more non-transitory computer-readable media when the transmitting wireless terminal was manufactured.

In another implementation of the first aspect, the at least one processor is further configured to execute the one or more instructions to cause the transmitting wireless terminal to receive the SL-PRS configuration via radio resource control (RRC) signaling.

In another implementation of the first aspect, the at least one processor is further configured to execute the one or more instructions to cause the transmitting wireless terminal to receive a configuration message including one or more rules to modify the SL-PRS configuration into the several modified SL-PRS configurations.

In another implementation of the first aspect, receiving the configuration message includes receiving the configuration message from a base station through broadcasting, wherein the configuration message includes an identification of the transmitting wireless terminal.

In another implementation of the first aspect, the at least one processor is further configured to execute the one or more instruction to cause the transmitting wireless terminal to establish an RRC connection with a gNB; enter an RRC-CONNECTED state with the gNB; and receive the configuration message from the gNB during the RRC-CONNECTED state.

In another implementation of the first aspect, the at least one processor is further configured to execute the one or more instructions to cause the transmitting wireless terminal to receive a configuration message including at least one rule to select the one of the several modified SL-PRS configurations.

In another implementation of the first aspect, the power required for transmitting the SL-PRS using each of the several modified SL-PRS configurations does not exceed an available power of the transmitting wireless terminal.

In another implementation of the first aspect, the at least one processor is further configured to execute the one or more instruction to cause the transmitting wireless terminal to use a rule that selects one or more criteria to modify the SL-PRS configuration into the several modified SL-PRS configurations.

In another implementation of the first aspect, the one or more criteria includes at least one of an available power of the transmitting wireless terminal, a density of subcarrier and symbols occupied by each transmitted SL-PRS configuration, a number of symbols used by the SL-PRS, and a number of PRBs allocated to the SL-PRS.

In a second aspect of the present application, a method of wireless communication by a transmitting wireless terminal is provided. The transmitting wireless terminal harvests energy as a power source. The method includes retrieving an SL-PRS configuration specifying a first number of symbols for transmission of the SL-PRS to a receiving wireless terminal; and modifying the SL-PRS configuration into several modified SL-PRS configurations. Each modified SL-PRS configuration in the several modified SL-PRS configurations specifies a lower number of symbols for the transmission of the SL-PRS than the first number of symbols, and a power required for transmitting the SL-PRS using each of the several modified SL-PRS configurations satisfies a minimum receiving power threshold of the receiving wireless terminal. The method selects one of the several modified SL-PRS configurations that results in a maximum number of SL-PRS symbols transmitted; and transmits the SL-PRS using the selected of the several modified SL-PRS configurations.

In an implementation of the second aspect, modifying the SL-PRS configuration includes modifying at least one of the several modified SL-PRS configurations by reducing a density of subcarrier and symbols occupied by each transmitted SL-PRS.

In another implementation of the second aspect, modifying the SL-PRS configuration includes modifying at least one of the several modified SL-PRS configurations by reducing a number of symbols that carry the SL-PRS.

In another implementation of the second aspect, modifying the SL-PRS configuration includes modifying at least one of the several modified SL-PRS configurations by reducing a number of PRBs allocated to the SL-PRS.

In another implementation of the second aspect, the SL-PRS configuration is stored in the one or more non-transitory computer-readable media when the transmitting wireless terminal was manufactured.

An implementation of the second aspect further includes receiving the SL-PRS configuration via RRC signaling.

Another implementation of the second aspect further includes receiving a configuration message including one or more rules to modify the SL-PRS configuration into the several modified SL-PRS configurations.

In another implementation of the second aspect, receiving the configuration message includes receiving the configuration message from a base station through broadcasting, wherein the configuration message includes an identification of the transmitting wireless terminal.

An implementation of the second aspect further includes establishing an RRC connection with a gNB; entering an RRC-CONNECTED state with the gNB; and receiving the configuration message from the gNB during the RRC-CONNECTED state.

Another implementation of the second aspect further includes receiving a configuration message including at least one rule to select the one of the several modified SL-PRS configurations.

In another implementation of the second aspect, the power required for transmitting the SL-PRS using each of the several modified SL-PRS configurations does not exceed an available power of the transmitting wireless terminal.

Another implementation of the second aspect further includes using a rule that selects one or more criteria to modify the SL-PRS configuration into the several modified SL-PRS configurations.

In another implementation of the second aspect, the one or more criteria includes at least one of an available power of the transmitting wireless terminal, a density of subcarrier and symbols occupied by each transmitted SL-PRS configuration, a number of symbols used by the SL-PRS, and a number of PRBs allocated to the SL-PRS.

In a third aspect of the present application, a transmitting wireless terminal for wirelessly communicating with a receiving wireless terminal is provided. The transmitting wireless terminal harvests energy as a power source. The transmitting wireless terminal includes one or more non-transitory computer-readable media storing one or more computer-executable instructions; and at least one processor coupled to the one or more non-transitory computer-readable media, and configured to execute the one or more computer-executable instructions to cause the transmitting wireless terminal to: retrieve an SL-PRS configuration specifying a first number of symbols for transmission of the SL-PRS by the transmitting wireless terminal; modify the SL-PRS configuration into a first modified SL-PRS configuration specifying a lower number of symbols for transmission of the SL-PRS than the first number of symbols; transmit the SL-PRS using the first modified SL-PRS configuration when the power required for transmitting the SL-PRS using the first modified SL-PRS configuration satisfies a minimum receiving power threshold of the receiving wireless terminal; modify the SL-PRS configuration into a second modified SL-PRS configuration when the power required for transmitting the SL-PRS using the first modified SL-PRS configuration does not satisfy the minimum receiving power threshold of the receiving wireless terminal, wherein the second modified SL-PRS configuration specifies a lower number of symbols for transmission of the SL-PRS than the first number of symbols; and transmit the SL-PRS using the second modified SL-PRS configuration when the power required for transmitting the SL-PRS using the second modified SL-PRS configuration satisfies the minimum receiving power threshold of the receiving wireless terminal.

In an implementation of the third aspect, the at least one processor is further configured to execute the one or more instructions to cause the transmitting wireless terminal to modify the SL-PRS configuration into a third modified SL-PRS configuration when the power required for transmitting the SL-PRS using the second modified SL-PRS configuration does not satisfy the minimum receiving power threshold of the receiving wireless terminal, wherein the third modified SL-PRS configuration specifies a lower number of symbols for transmission of the SL-PRS than the first number of symbols, and wherein a power required for transmitting the SL-PRS using the third modified SL-PRS configuration does not exceed an available power of the transmitting wireless terminal; and transmit the SL-PRS using the third modified SL-PRS configuration when the power required for transmitting the SL-PRS using the third modified SL-PRS configuration satisfies the minimum receiving power threshold of the receiving wireless terminal.

In another implementation of the third aspect, the power required for transmitting the SL-PRS using each of the first, second, and third modified SL-PRS configurations does not exceed an available power of the transmitting wireless terminal.

In another implementation of the third aspect, in one of the first and second modified SL-PRS configurations, a density of subcarrier and symbols occupied by each transmitted SL-PRS configuration is reduced.

In another implementation of the third aspect, in one of the first and second modified SL-PRS configurations, a number of symbols used by the SL-PRS is reduced.

In another implementation of the third aspect, in one of the first and second modified SL-PRS configurations a number of PRBs allocated to the SL-PRS is reduced.

In another implementation of the third aspect, the at least one processor is further configured to execute the one or more instruction to cause the transmitting wireless terminal to use a rule that selects one or more criteria to modify the SL-PRS configuration into the first, second, and third modified SL-PRS configurations.

In another implementation of the third aspect, the one or more criteria includes the available power of the transmitting wireless terminal, a density of subcarrier and symbols occupied by each transmitted SL-PRS configuration, a number of symbols used by the SL-PRS, and a number of PRBs allocated to the SL-PRS.

In a fourth aspect of the present application, a method of wireless communication by a transmitting wireless terminal is provided. The transmitting wireless terminal harvests energy as a power source. The method includes: retrieving an SL-PRS configuration specifying a first number of symbols for transmission of the SL-PRS by the transmitting wireless terminal; modifying the SL-PRS configuration into a first modified SL-PRS configuration specifying a lower number of symbols for transmission of the SL-PRS than the first number of symbols; transmitting the SL-PRS using the first modified SL-PRS configuration when the power required for transmitting the SL-PRS using the first modified SL-PRS configuration satisfies a minimum receiving power threshold of the receiving wireless terminal; modifying the SL-PRS configuration into a second modified SL-PRS configuration when the power required for transmitting the SL-PRS using the first modified SL-PRS configuration does not satisfy the minimum receiving power threshold of the receiving wireless terminal, wherein the second modified SL-PRS configuration specifies a lower number of symbols for transmission of the SL-PRS than the first number of symbols; and transmitting the SL-PRS using the second modified SL-PRS configuration when the power required for transmitting the SL-PRS using the second modified SL-PRS configuration satisfies the minimum receiving power threshold of the receiving wireless terminal.

An implementation of the fourth aspect includes modifying the SL-PRS configuration into a third modified SL-PRS configuration when the power required for transmitting the SL-PRS using the second modified SL-PRS configuration does not satisfy the minimum receiving power threshold of the receiving wireless terminal, wherein the third modified SL-PRS configuration specifies a lower number of symbols for transmission of the SL-PRS than the first number of symbols, and wherein a power required for transmitting the SL-PRS using the third modified SL-PRS configuration does not exceed an available power of the transmitting wireless terminal; and transmitting the SL-PRS using the third modified SL-PRS configuration when the power required for transmitting the SL-PRS using the third modified SL-PRS configuration satisfies the minimum receiving power threshold of the receiving wireless terminal.

In an implementation of the fourth aspect, the power required for transmitting the SL-PRS using each of the first, second, and third modified SL-PRS configurations does not exceed an available power of the transmitting wireless terminal.

In another implementation of the fourth aspect, in one of the first and second modified SL-PRS configurations, a density of subcarrier and symbols occupied by each transmitted SL-PRS configuration is reduced.

In another implementation of the fourth aspect, in one of the first and second modified SL-PRS configurations, a number of symbols used by the SL-PRS is reduced.

In another implementation of the fourth aspect, in one of the first and second modified SL-PRS configurations a number of PRBs allocated to the SL-PRS is reduced.

Another implementation of the fourth aspect includes using a rule that selects one or more criteria to modify the SL-PRS configuration into the first, second, and third modified SL-PRS configurations.

In another implementation of the fourth aspect, the one or more criteria includes the available power of the transmitting wireless terminal, a density of subcarrier and symbols occupied by each transmitted SL-PRS configuration, a number of symbols used by the SL-PRS, and a number of PRBs allocated to the SL-PRS.

In a fifth aspect of the present application, a transmitting wireless terminal for wirelessly communicating with a receiving wireless terminal is provided. The transmitting wireless terminal harvests energy as a power source. The transmitting wireless terminal includes one or more non-transitory computer-readable media storing one or more computer-executable instructions and at least one processor coupled to the one or more non-transitory computer-readable media, and configured to execute the one or more computer-executable instructions to cause the transmitting wireless terminal to select a SL-PRS configuration of several SL-PRS configurations as a next SL-PRS configuration; determine whether a power required for transmitting the SL-PRS using the next SL-PRS configuration satisfies a minimum receiving power threshold of the receiving wireless terminal; when the power required for transmitting the SL-PRS using the next SL-PRS configuration does not satisfy the minimum receiving power threshold of the receiving wireless terminal, select another of the several SL-PRS configurations as the next SL-PRS configuration, and repeat the determining and the selecting of the next SL-PRS configuration until the power required for transmitting the SL-PRS using the next SL-PRS configuration satisfies the minimum receiving power threshold of the receiving wireless terminal or until the last SL-PRS configuration in the several SL-PRS configurations is not selected for transmitting the SL-PRS; and transmit the SL-PRS using the next SL-PRS configuration when the next SL-PRS configuration is not the last SL-PRS configuration that is not selected.

In an implementation of the fifth aspect, the determining further includes determining whether the power required for transmitting the SL-PRS using the next SL-PRS configuration meets an available power of the transmitting wireless terminal.

In another implementation of the fifth aspect, each of the SL-PRS configurations specifies a density of subcarrier and symbols occupied by the transmitted SL-PRS.

In another implementation of the fifth aspect, each of the SL-PRS configurations specifies a number of symbols that carry the SL-PRS.

In another implementation of the fifth aspect, each of the SL-PRS configurations specifies a number of PRBs allocated to the SL-PRS.

In another implementation of the fifth aspect, the SL-PRS configurations are stored in the one or more non-transitory computer-readable media when the transmitting wireless terminal was manufactured.

An implementation of the fifth aspect further includes receiving the SL-PRS configurations via RRC signaling.

Another implementation of the fifth aspect further includes receiving a system information message that includes the SL-PRS configurations.

In another implementation of the fifth aspect, receiving the system information message includes receiving the system information message from a base station through broadcasting, wherein the system information message includes an identification of the transmitting wireless terminal.

Another implementation of the fifth aspect further includes establishing an RRC connection with a gNB; entering an RRC-CONNECTED state with the gNB; and receiving the system information message from the gNB during the RRC-CONNECTED state.

In another implementation of the fifth aspect, each of the several SL-PRS configurations is associated with a range of power that is available to the transmitting wireless terminal, and each of the several SL-PRS configurations is associated with a range of power that is greater than a range of power associated with a subsequent SL-PRS configuration in the several SL-PRS configurations.

In a sixth aspect of the present application, a method of wireless communication by a transmitting wireless terminal is provided. The transmitting wireless terminal harvests energy as a power source. The method includes: selecting an SL-PRS configuration of several SL-PRS configurations as a next SL-PRS configuration; determining whether a power required for transmitting the SL-PRS using the next SL-PRS configuration satisfies a minimum receiving power threshold of the receiving wireless terminal; when the power required for transmitting the SL-PRS using the next SL-PRS configuration does not satisfy the minimum receiving power threshold of the receiving wireless terminal: selecting another of the several SL-PRS configurations as the next SL-PRS configuration, and repeating the determining and the selecting of the next SL-PRS configuration until the power required for transmitting the SL-PRS using the next SL-PRS configuration satisfies the minimum receiving power threshold of the receiving wireless terminal or until a last SL-PRS configuration in the several SL-PRS configurations is not selected for transmitting the SL-PRS; and transmitting the SL-PRS using the next SL-PRS configuration when the next SL-PRS configuration is not the last SL-PRS configuration that is not selected.

In an implementation of the sixth aspect, the determining further includes determining whether the power required for transmitting the SL-PRS using the next SL-PRS configuration meets an available power of the transmitting wireless terminal.

In another implementation of the sixth aspect, each of the SL-PRS configurations specifies a density of subcarrier and symbols occupied by the transmitted SL-PRS.

In another implementation of the sixth aspect, each of the SL-PRS configurations specifies a number of symbols that carry the SL-PRS.

In another implementation of the sixth aspect, each of the SL-PRS configurations specifies a number of PRBs allocated to the SL-PRS.

In another implementation of the sixth aspect, the SL-PRS configurations are stored in the one or more non-transitory computer-readable media when the transmitting wireless terminal was manufactured.

An implementation of the sixth aspect further includes receiving the SL-PRS configurations via RRC signaling.

Another implementation of the sixth aspect further includes receiving a system information message includes the SL-PRS configurations.

In another implementation of the sixth aspect, receiving the system information message includes receiving the system information message from a base station through broadcasting, wherein the system information message includes an identification of the transmitting wireless terminal.

Another implementation of the sixth aspect further includes establishing an RRC connection with a gNB; entering an RRC-CONNECTED state with the gNB; and receiving the system information message from the gNB during the RRC-CONNECTED state.

In another implementation of the sixth aspect, each of the SL-PRS configurations is associated with a range of power that is available to the transmitting wireless terminal, and each of the several SL-PRS configurations is associated with a range of power that is greater than a range of power associated with a subsequent SL-PRS configuration in the several SL-PRS configurations.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

Figure 1:
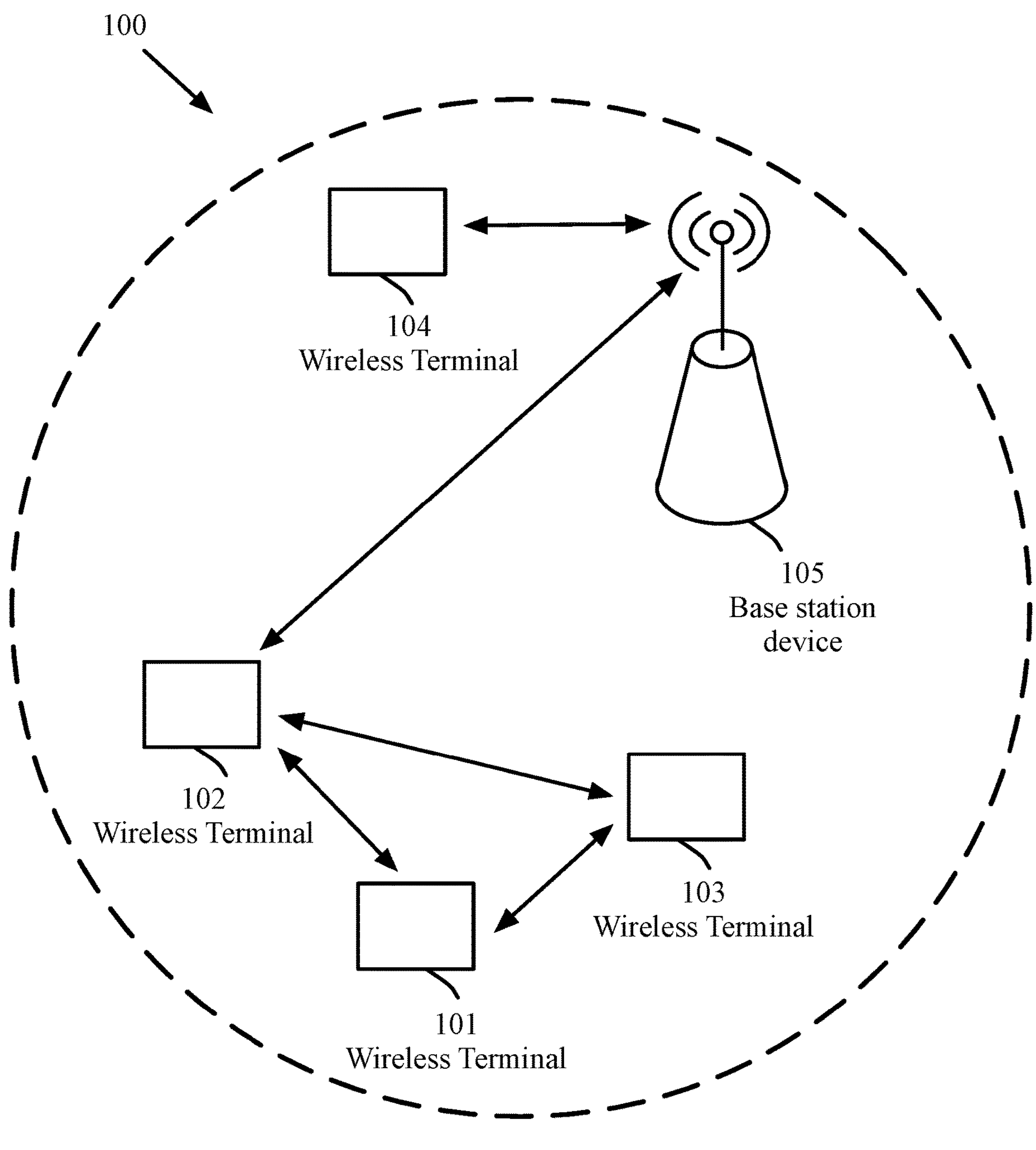
FIG. 1 is a schematic diagram illustrating a wireless communication system, according to an example implementation of the present disclosure.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not shown) by the same numerals in the example figures. However, the features in different implementations may differ in other respects, and thus may not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

Additionally, for the purposes of explanation and non-limitation, specific details, such as functional entities, techniques, protocols, standard, and the like are set forth for providing an understanding of the described technology. In other examples, detailed descriptions of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software, or a combination of software and hardware. Described functions may correspond to modules which may be software, hardware, firmware, or any combination thereof. The software implementation may include computer executable instructions stored on a computer-readable medium, such as a memory or other types of storage devices. For example, one or more microprocessors or general-purpose computers with communication processing capability may be programmed with corresponding executable instructions and carry out the described network function(s) or algorithm(s). The microprocessors or general-purpose computers may be formed of one or more Application-Specific Integrated Circuits (ASICs), programmable logic arrays, and/or one or more Digital Signal Processor (DSPs). Although some of the example implementations described in this specification are oriented to software installed and executing on computer hardware, nevertheless, alternative example implementations implemented as firmware, as hardware, or as a combination of hardware and software are well within the scope of the present disclosure.

The computer-readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station (BS), at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more BSs.

It should be noted that, in the present application, a UE (or a terminal device) may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A BS may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A BS may include, but is not limited to, a node B (NB) as in the UMTS, an evolved node B (eNB) as in the LTE or LTE-A, a radio network controller (RNC) as in the UMTS, a BS controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

The BS may be operable to provide radio coverage to a specific geographical area using several cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the DL and optionally the UL resources to at least one UE within its radio coverage for DL and optionally UL packet transmission). The BS may communicate with one or more UEs in the radio communication system through the cells.

A cell may allocate SL resources for supporting Proximity Service (ProSe) or V2X services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a DL transmission data, a guard period, and a UL transmission data should at least be included, where the respective portions of the DL transmission data, the guard period, the UL transmission data should also be configurable, for example, based on the network dynamics of NR. In addition, sidelink resources may also be provided in an NR frame to support ProSe services, (E-UTRA/NR) sidelink services, or (E-UTRA/NR) V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, a Master Cell Group (MCG) may be formed by an MN, and a Secondary Cell Group (SCG) may be formed by an SN. In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the Medium Access Control (MAC) entity is associated with the MCG or the SCG. Otherwise, the term Special Cell may refer to the PCell. A Special Cell may support a Physical Uplink Control Channel (PUCCH) transmission and contention-based Random Access, and may always be activated. Additionally, for a UE in an RRC_CONNECTED state that is not configured with the CA/DC, may communicate with only one serving cell (SCell) which may be the primary cell. Conversely, for a UE in the RRC_CONNECTED state that is configured with the CA/DC a set of serving cells including the special cell(s) and all of the secondary cells may communicate with the UE.

NR Frame Structure

The 5G NR Frame structure is described in the NR 3GPP standards (e.g., Technical Specification (TS) 38.211). The 5G NR frame structure includes subframes, slots, and symbol configurations. As described above, the 5G NR Supports two frequency ranges: FR1 (which is under 7.125 gigahertz (GHz)) and FR2 (also known as millimeter wave range, which is between 24.25 GHz to 71.2 GHz). NR uses flexible subcarrier spacing derived from basic 15 kilohertz (kHz) subcarrier spacing that is also used in the LTE. A frame may have a duration of 10 milliseconds (ms) which may include 10 subframes each having 1 ms duration, which is similar to the LTE networks. Each subframe may have $2^{\mu}$ slots ($\mu$ being a member of the set of [0 . . . 4]). Each slot may typically include 14 OFDM symbols. The number of symbols, however, may depend upon the start and length indicator value (SLIV). The radio frames of 10 ms may be transmitted continuously one after the other as per Time Division Duplex (TDD) or Frequency Division Duplex (FDD) topology. A subframe may be of a fixed duration (e.g., 1 ms) whereas a slot's length may vary based on a subcarrier spacing (SCS) and the number of slots per subframe. A slot is 1 ms for 15 kHz, 500 us for 30 kHz, and so on. The subcarrier spacing of 15 kHz may occupy one slot per subframe, whereas the subcarrier spacing of 30 kHz may occupy two slots per subframe, and so on. Each slot may occupy either 14 OFDM symbols or 12 OFDM symbols, depending on the normal cyclic prefix (CP) or extended CP, respectively.

It should be noted that even though for the remainder of this disclosure, a 14-symbol configuration that is based on a normal CP is discussed, a 12-symbol configuration that is based on an extended CP may not be precluded from the solution space.

In 5G, a resource element (RE) is the smallest physical resource in NR which may include one subcarrier during one OFDM symbol. Also, in 5G, one NR Resource Block (RB) may contain 12 subcarriers in the frequency domain, irrespective of the numerology, and is defined only in the frequency domain (e.g., the bandwidth may not be fixed and may be dependent upon the configured subcarrier spacing). Additionally, in 5G, Physical Resource Blocks (PRBs) are the RBs that are used for actual/physical transmission/reception.

NR Numerology

Numerology is a term used in the 3GPP specification to describe the different subcarrier spacing types, as there are several different types of subcarrier spacing as summarized in the following Table 1 (which is similar to the Table 4.2-1 in TS 38.211) that defines the supported transmission numerologies.

TABLE 1

| μ | $\Delta f = 2^{\mu} \cdot 15$ [KHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

It should be noted that for the remainder of this disclosure, the terms numerology and subcarrier spacing (SCS) may be used interchangeably. It should also be noted that the term "SCS configuration factor n" may be used to refer to a subcarrier spacing type, where n may belong to the set [0,1,2,3,4], as noted in the table above and is referred to as u.

Physical Layer Design for NR V2X Sidelink

Sidelink is a core topology of the 5G system design that enables direct communication between two devices without the participation of a BS in the transmission and reception of data traffic. The physical layer structure for the NR V2X sidelink is based on the Rel-15 NR interface (Uu) design. In addition, the physical layer procedures for the NR V2X sidelink may reuse some of the concepts of Rel-14 LTE V2X, with the introduction of additional procedures for providing physical layer support for unicast and groupcast transmissions.

NR V2X Physical Channels and Signals

A Physical Sidelink Control Channel (PSCCH) is sent within the first SL symbols of the first subchannel occupied by an associated Physical Sidelink Shared Channel (PSSCH), described below. The PSCCH carries the first stage Sidelink Control Information (SCI) (discussed more fully below), which indicates at least: (1) resource allocation, Modulation and Coding Scheme (MCS), and priority of the associated PSSCH; (2) resource reservation period; (3) time pattern and number of ports for the PSSCH Demodulation Reference Signal (DMRS); and/or (4) size and format of second-stage SCI.

A PSSCH is sent in one or multiple subchannels in a slot within a resource pool. The PSSCH carries a Transport Block (TB) (discussed in greater detail below) and the second-stage SCI, which indicates: (1) a Hybrid Automatic Repeat Request (HARQ) process ID, new data indicator (NDI), and redundancy version (RV); (2) Source ID and Destination ID; (3) HARQ enabled/disabled indicator; (4) transmission type and Channel State Information (CSI) request (SCI format 2-A); and/or (5) transmission (TX) UE's zone ID and required communication range (SCI format 2-B).

A Physical Sidelink Broadcast Channel (PSBCH) is sent periodically with a SL Primary Synchronization Signal (S-PSS) and a SL Secondary Synchronization Signal (S-SSS) in an SL Synchronization Signal Block (S-SSB), not in slots of a resource pool. The PSBCH may carry (1) a TDD configuration, (2) a direct frame number, (3) a slot index, and/or (4) an In-network/Global Navigation Satellite System (GNSS) coverage indicator.

A Physical Sidelink Feedback Channel (PSFCH) is sent periodically in a symbol near the end of a PSCCH/PSSCH slot. The PSFCH is transmitted in response to a PSSCH reception and carries the HARQ feedback (1) for unicast (Acknowledgement/Negative-Acknowledgement (ACK/NACK) feedback) or (2) for groupcast (NACK-only feedback (option 1) or ACK/NACK feedback (option 2)).

The TBs are the objects into which data is organized and that are carried in the PSSCH. Each TB is associated with an SCI. The SCI indicates the resources used by the PSSCH that carries the associated TB, as well as further information required for decoding the TB. A TB may occupy one or several subchannels depending on the size of the packet, the number of RBs per subchannel, and the utilized MCS. TBs may be transmitted using Quadrature Phase Shift Keying (QPSK), 16 Quadrature Amplitude Modulation (16QAM), or 64QAM modulations and turbo coding.

Regarding the SCI, each TB has an associated SCI message that is carried in the PSCCH. An SCI may include information such as (1) an indication of the RBs occupied by the associated TB, (2) the MCS used for the TB, (3) the priority of the message that is being transmitted, (4) an indication of whether it is a first transmission or a blind retransmission of the TB, and/or (5) the resource reservation interval. The SCI may include critical information for the correct reception of the TB. A TB may not be decoded properly if the associated SCI is not received correctly. A TB and its associated SCI may be transmitted in the same subframe. The TB and its associated SCI may be transmitted in adjacent subchannels. Alternatively, RBs may be divided into two pools, in which one pool is dedicated to transmitting SCIs and the other pool is dedicated to transmitting TBs.

The SCI in NR V2X may be transmitted in two stages. The first stage SCI in NR V2X may be carried on the PSCCH, while the second stage SCI may be carried on the corresponding PSSCH. Splitting the SCI in two stages (e.g., the first stage SCI and the second stage SCI) may allow other UEs which are not receiving (RX) UEs of a transmission to decode only the first stage SCI.

Further, the PSCCH may carry the first stage SCI that contains control information associated with a PSSCH and the second stage SCI. The first stage SCI may indicate the frequency resources (e.g., subchannels) of the PSSCH carrying the current transmission of a TB, as well as the resource reservation for up to two further retransmissions of the TB.

The PSSCH may carry the second stage SCI and the data payload including a TB. The second stage SCI may carry information used for decoding the PSSCH and for supporting HARQ feedback and CSI reporting. The second stage SCI may indicate the Layer 1 source ID and destination ID of a transmission that represent identifiers (in the physical layer) of the TX UE and intended recipients (RX UEs) of the TB. The Layer 1 source ID may allow an RX UE to know the identity of the TX UE, which may be used for determining the PSFCH for HARQ feedback.

After decoding the first stage SCI in the PSCCH, an RX UE may have the necessary information to decode the second stage SCI carried in the PSSCH. Thus, no blind decoding of the second stage SCI is needed.

The first stage SCI, having a fixed size and carried in the PSCCH, provides that the SCI has a known location within a subchannel. When the first stage SCI is decoded, it may indicate the resources of the second stage SCI carried in the PSSCH, and thus the second stage SCI may not be blind-decoded, and the second stage SCI may have a varying payload size.

Positioning Reference Signals

To enable more accurate positioning measurements than LTE, new dedicated reference signals are added to the NR Rel-16 specifications with a high RE density and with the correlation properties that are better than existing reference signals due to the diagonal or staggered reference signal patterns. In the downlink, the new signal is known as the "NR Positioning Reference Signal" (which may also be known as NR PRS, or only PRS) and in the uplink, the new signal is known as the "Sounding Reference Signal" (SRS) for positioning (e.g., determining the location of a wireless terminal).

It should be noted that in releases prior to the 3GPP Rel-16, an SRS may also be defined and used by the BS to estimate the quality of the uplink channel for the large bandwidths outside the assigned span to a specific wireless terminal. However, the prior release's SRS may have limitations on its density of use in the time domain that do not apply to the Rel-16 SRS for positioning. As such, the SRS for positioning and the SRS for channel quality estimation are configured separately and with different properties specific to their usage. Thus, for the remainder of this disclosure, any reference to an SRS may apply to the SRS for positioning.

Downlink PRS Signal

In DL transmissions, a dedicated Positioning Reference Signal (PRS) for positioning purposes (e.g., determining the location of a wireless terminal) is specified in 3GPP Rel-16. The PRS may include a pseudo-random sequence that is modulated by QPSK. The pseudo-random sequence may include a Gold sequence of length 31. The PRS is described in more detail in the 5G standard in TS 38.211. The generation of the PRS may include two steps: generation of PRS sequences based on Gold sequences and the PRS mapping.

A potential benefit of using a pseudo-random sequence for the PRS is its low sensitivity to timing and frequency offset error degradation, which may be a common condition when considering V2X scenarios with synchronization error and high device mobility.

Uplink SRS Signal

In UL transmissions, there is no dedicated pilot for positioning, so the Sounding Reference Signal (SRS) may be selected for this purpose. In 5G NR, the SRS generation is implemented according to the 3GPP TS 38.211. The uplink 5G NR sounding reference signal (NR-SRS) sent by the wireless terminal may be an OFDM-modulated Zadoff-Chu sequence that is feasible for time delay estimation. Similar to the generation of the PRS, the generation of the SRS may also include two steps: Zadoff-Chu sequence generation and the SRS mapping.

A potential benefit of using a Zadoff-Chu sequence for the PRS is that it may provide for better Peak-to-Average Power Ratio (PAPR) over the signal's transmission bandwidth compared to a pseudo-random sequence. However, one of the possible drawbacks of a Zadoff-Chu sequence is that it may be more sensitive to timing and frequency offset degradation, which may have a direct negative impact on positioning measurement. Such timing and frequency offset degradation may be more pronounced when considering V2X scenarios that address synchronization error and high device mobility.

Default Sidelink Positioning Reference Signal

For Rel-18 sidelink communications, it is expected that a "new dedicated positioning reference signal" will be defined for the PC5 interface. The purpose of the new dedicated positioning reference signal may be to assist the NR V2X-enabled device with respect to utilizing new Rel-18 sidelink positioning processes. For the purposes of this disclosure, this new dedicated Sidelink Position Reference Signal is referred to as SL-PRS.

However, support for SL-PRS may be optional; thus, not all NR-capable devices may be required to support it. While support for SL-PRS may be optional for some devices (e.g., low-cost IoT devices), support for SL-PRS may be mandatory for the NR gNB and other network (NW) components of the system. Thus, a default SL-PRS configuration may be known to the gNB and other NW components of the system, and the default SL-PRS configuration may also be known to the devices that optimally support SL-PRS.

A default SL-PRS may be defined to use a configuration that includes a signal encoding generator such as in Example A or Example B below:

Example A: A pseudo-random sequence that is modulated by QPSK. The pseudo-random sequence may use a Gold sequence of length 31, as specified in the 5G standard in TS 38.211.

Example B: An OFDM-modulated Zadoff Chu sequence that is feasible for time delay estimation. The Zadoff-Chu sequence generation may be implemented as specified in the 5G standard in TS 38.211.

A default SL-PRS configuration may also be referred to herein as a "type of SL-PRS".

Optional Sidelink Positioning Reference Signal

For Rel-18 sidelink communications, it is also expected that, in addition to the default SL-PRS configuration, one or more optional SL-PRS configurations may be defined. As NR-capable devices may not be required to support optional SL-PRS configurations, the optional SL-PRS configurations that are supported by NR-capable devices that support SL-PRS may not be known a priori to the gNB and other NW components of the system. Thus, additional communications between the NR-capable devices that support SL-PRS and the NR system may be needed to exchange information regarding the optional SL-PRS configurations that may be supported by the NR-capable devices that support SL-PRS.

An optional SL-PRS may be defined to use a configuration that includes a signal encoding generator such as in Example A or Example B below:

Example A: A pseudo-random sequence that is modulated by QPSK. The pseudo-random sequence may use a Gold sequence of length 31, as specified in the 5G standard in TS 38.211.

Example B: An OFDM-modulated Zadoff-Chu sequence that is feasible for time delay estimation. The Zadoff Chu sequence generation may be implemented as specified in the 5G standard in TS 38.211.

An optional SL-PRS configuration may also be referred to herein as a "type of SL-PRS".

It is expected that the configuration used by the default type of SL-PRS is not used by any optional type of PRS.

Types of SL-PRS

It is to be understood that the Positioning Reference Signal of a "type of SL-PRS" may be generated from one of the following sequence generators: a pseudo-random sequence, such as used by an NR-PRS signal; a Zadoff-Chu sequence, such as used for an NR-SRS signal; or other complex-valued mathematical sequence which, when applied to a signal, gives rise to a new signal (e.g., the previous list of sequence generation methods is not limiting).

Taken together, the default SL-PRS configuration and the optional SL-PRS configurations may be a set of configurations known as "types of SL-PRS."

Signaling of Types of SL-PRS

As noted above, the default type of SL-PRS is explicitly known by the system and by the devices that optionally support dedicated Sidelink Positioning Reference Signals (SL-PRSs). As such, communications between wireless terminals, and between wireless terminals and the NW, indicating the type of SL-PRS that a wireless terminal may support does not need to explicitly list the default type of SL-PRS. Thus, such communications may be optimized to include only an indication of the optional type of SL-PRS that a wireless terminal may support. Such a communication may take the form of a list of optional types of SL-PRS, and the default type of PRS may not an explicit member of that list, as it is not necessary, but the inclusion of the default type of PRS in the set of types of PRS supported by the device is implied by the presence of such a list in such communications, even if the list is empty.

A possible example of capabilities of an NR System V2X-enabled device (e.g., an Anchor UE (AUE) and a target UE (TUE), as described above) with respect to the types of SL-PRS used is provided below in Table 2.

TABLE 2

| Example of capabilities of NR System V2X-enabled devices with respect to the usage of Types of SL-PRS | V2X enable device operating as an AUE | V2X enable device operating as an TUE |
|---|---|---|
| Pseudo Random type SL-PRS for Tx | Optional | Optional |
| Pseudo Random type SL-PRS for Rx | Optional | Optional |
| Zadoff-Chu type SL-PRS for Tx | Optional | Optional |
| Zadoff-Chu type SL-PRS for Rx | Optional | Optional |
| The Default type SL-PRS for Tx | Yes | Yes |
| The Default type SL-PRS for Rx | Yes | Yes |

Mapping a Positioning Reference Signal

A wireless terminal may be configured with one or more downlink PRS positioning frequency layer configurations. A PRS positioning frequency layer may be defined as a collection of PRS resource sets with each PRS resource set defining a collection of PRS resources. All of the PRS resource sets defined in the PRS positioning frequency layer may be configured with a Subcarrier Spacing parameter and a Cyclic Prefix parameter, as described below.

The subcarrier spacing for all PRS resource sets in a PRS positioning frequency layer may be specified as 15, 30, 60, or 120 kHz. The SubcarrierSpacing parameter property in the nrCarrierConfig object may be used to set the subcarrier spacing of a PRS resource set.

The cyclic prefix for all PRS resource sets in a PRS positioning frequency layer may be specified as "normal" or "extended". The CyclicPrefix parameter property of the nrCarrierConfig object may be used to set the cyclic prefix of a PRS resource set.

To transmit the SRS in the 5G NR frames, the generated Zadoff-Chu sequence may be mapped to the given physical resources (e.g., which may include subcarriers and time slots). The mapping description may be found in chapter 6.4.1.4.3 of the 3GPP TS 38.211 specification.

The downlink PRS is the main reference signal supporting downlink-based positioning methods. Although other signals may be used, the PRS is specifically designed to deliver the highest possible level of accuracy, coverage, and interference avoidance and suppression. The PRS signal provides a large delay spread range, since it may be received from potentially distant neighboring BSs for position (e.g., of a wireless terminal) estimation. This may be achieved by covering the whole NR bandwidth and transmitting the PRS over multiple symbols which may be aggregated to accumulate power. The duration of a PRS may be associated with the duration of a symbol that is used to transport the PRS, and the duration of such a symbol may be associated with the Subcarrier Spacing (SCS) configuration (also known as the Numerology) that is used to define the carrier configuration parameters for a specific OFDM numerology, where such a Numerology may describe the time and frequency of waveforms used by the Resource Blocks (RBs) of an NR carrier.

In NR, the density of subcarrier occupied in a given PRS symbol is referred to as the comb_size. There are several configurable comb-based PRS patterns (i.e., comb-2, -4, -6 and -12) that are suitable for different scenarios serving different use cases. For comb-N PRS, N symbols may be combined to cover all the subcarriers in the frequency domain. By assigning a different comb set to different BSs, each BS may transmit in a different set of subcarriers and thus avoid interference. Since several BSs may transmit at the same time without interfering with each other, this solution may also be latency efficient. For use cases with higher transmission loss the PRS may be also configured to be repeated to improve the potential for reception at two levels; within a single slot and across multiple slots. Some implementations may configure the starting resource element (e.g., in the time and frequency domains) from a transmission-reception point (TRP) for a reception within a single slot. Some implementations may configure the gaps between the PRS slots, their periodicity, and their density (e.g., within a period) for a reception across multiple slots.

Direct Communication Using Sidelink

FIG. 1 is a schematic diagram illustrating a wireless communication system 100, according to an example implementation of the present disclosure. In FIG. 1, the wireless communication system 100 includes the wireless terminals 101-104 and the BS 105. The terms base station device, base station, and BS herein may be used interchangeably.

The BS 105 may communicate with one or more wireless terminals, such as wireless terminals 102 and 104, through one or more cells. A cell is defined as a set of resources used for a wireless communication. A cell may include one or both of a downlink component carrier and an uplink component carrier. A downlink component carrier and an uplink component carrier may also be referred to as component carriers.

The wireless terminals 101-104 may be energy harvesting wireless terminals. Some of the energy harvesting wireless terminals may be of such limited capability that they may have minimal or no capacity to receive DL signals from the BS 105 (or transmit UL signals to the BS 105). In the example of FIG. 1, the wireless terminals 102 and 104 may have enough available power, and/or may be is close vicinity of the BS 105, that may be able to communicate directly (e.g., though UL and/or DL signals) with the BS. The wireless terminals 101 and 103, on the other hand, may be able to directly communicate with each other (e.g., through SL signals) without the participation of the BS 105 in the transmission and reception of data traffic.

The wireless terminals 101 and 103 may be ambient power enabled IoT devices that harvest energy from solar, light, motion, vibration, heat, pressure, or any other power sources. The energy harvesting by a wireless terminal device may be continuous or incidental. It is also possible that the network controls when or where some forms of harvestable power, such as radio waves, are provided. The energy harvesting wireless terminal may not always have enough power to initiate or receive communication.

The operation of a battery-less energy harvesting wireless terminal (e.g., the activation and operation of the energy harvesting wireless terminal's microprocessor and other device components dependent upon the microprocessor's operation) may be dependent upon a harvestable energy source that is immediately available to the device and of a duration sufficient to power the device to the completion of its intended operational time frame.

An energy harvesting wireless terminal may have limited energy storage capability (e.g., a capacitor) in which case the operation of the device may be independent of an immediate availability and/or temporal harvestable energy source, and the device may store the harvested energy when available and use the stored energy as needed and as sufficient to power the device for a duration that is necessary to complete the device's intended operational time frame.

The energy harvesting wireless terminal may have low complexity, small size and lower capabilities and lower power consumption than previously defined 3GPP IoT devices (e.g., NB-IoT/enhanced Machine Type Communication (eMTC) devices). The energy harvesting wireless terminal may be maintenance free and may have long life span (e.g., more than 10 years). However, the life span of an energy harvesting wireless terminal may also be relatively short, such as, when tracking a package through a logistics chain.

The low complexity of an energy harvesting wireless terminal may be reflected in the energy harvesting wireless terminal's efficient use of 3GPP uplink (UL) and downlink (DL) time and frequency resources when communicating with a gNB or when communicating with other devices capable of using 3GPP UL and DL time and frequency resources. The low complexity of an energy harvesting wireless terminal may be reflected in a gNB's efficient use of 3GPP UL and DL time and frequency resources when communicating with an energy harvesting wireless terminal. The energy harvesting wireless terminals may have low data usage. Generally, energy harvesting wireless terminal data transmissions may contain only a few hundred bits of data.

As discussed above, such energy harvesting wireless terminals lead to new functional and performance requirements to a 5G system. Specifically, the energy harvesting wireless terminals use cases require new functional requirements, for example, communication aspects of energy harvesting wireless terminals and network, positioning of energy harvesting wireless terminals, management of energy harvesting wireless terminals, exposure of related network capabilities, of data collected by the energy harvesting wireless terminals and of information about the energy harvesting wireless terminals, charging, security, and privacy. The implementations provided in this disclosure discuss efficient communication mechanisms between such wireless terminals the require minimum power for signal transmission and/or reception.

Multiplexing PRS in a Slot

Figure 2A:
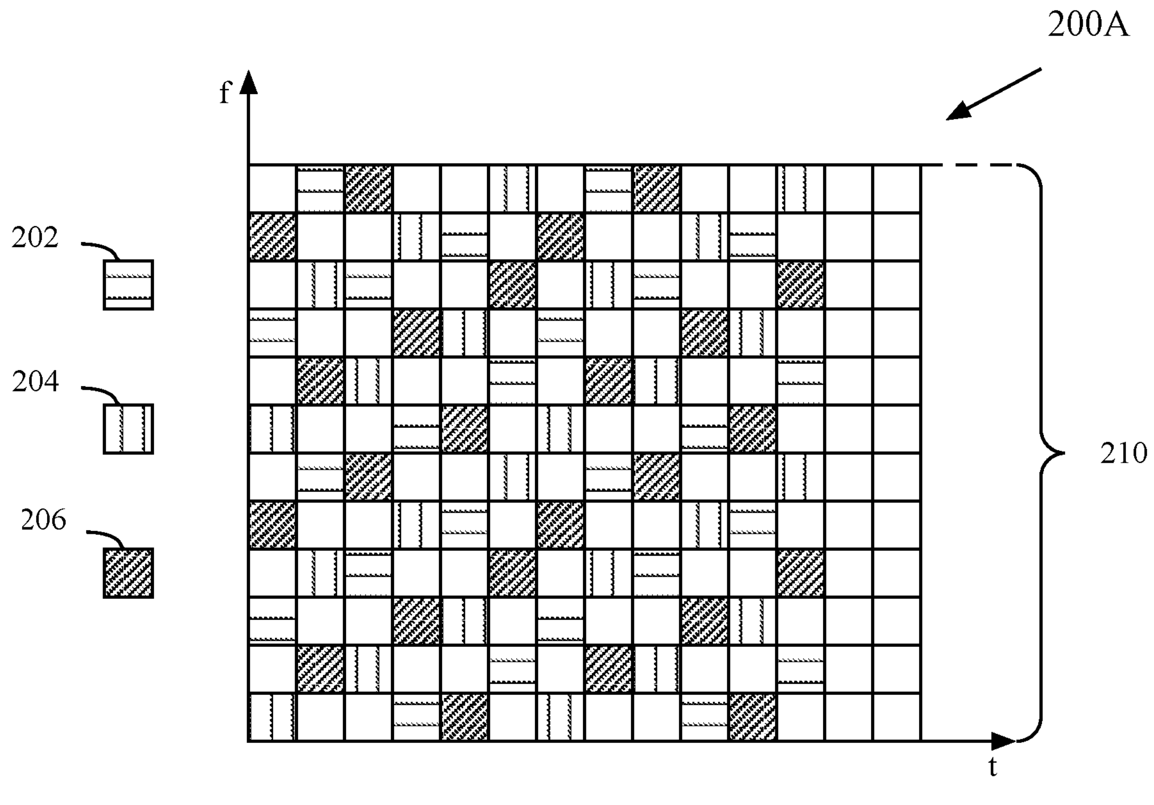
FIG. 2A illustrates a time-frequency resource grid in which a PRS transmission pattern (e.g., transmitted from three different BSs) in a physical resource block (PRB) is shown, according to an example implementation of the present disclosure.
Figure 2B:
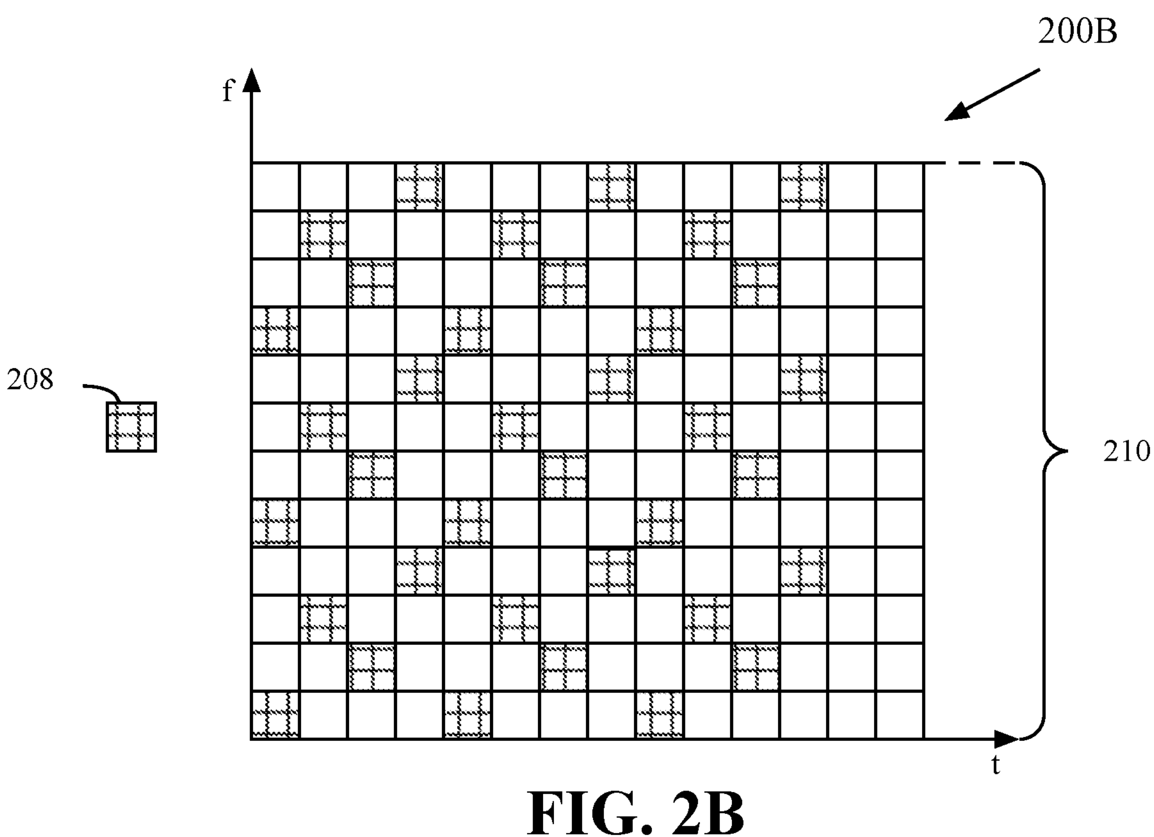
FIG. 2B illustrates a time-frequency resource grid in which a single SRS pattern (e.g., transmitted by a wireless terminal) in a PRB is shown, according to an example implementation of the present disclosure.

FIGS. 2A and 2B are functional diagrams illustrating a transmission pattern of a PRS and a transmission pattern of an SRS, respectively, according to an example implementation of the present disclosure. FIG. 2A illustrates a time-frequency resource grid 200A in which a PRS transmission pattern (e.g., transmitted from three different BSs) in a physical resource block (PRB) 210 is shown. FIG. 2B illustrates a time-frequency resource grid 200B in which a single SRS pattern (e.g., transmitted by a wireless terminal) in a PRB 210 is shown. The SRS 208 may be transmitted by a wireless terminal (not shown in the figure) in a set of symbols of the resource block. In FIGS. 2A and 2B, each individual block within PRB 210 may be an RE associated with a particular subcarrier and a particular symbol number of the slot.

For a comb-6 PRS, which is the case shown in FIG. 2A, three different symbols may be combined to cover all the subcarriers in the frequency domain. Each BS may then transmit, as shown in the figure, in different sets of subcarriers (or different sets of symbols of each subcarrier) to avoid interference with the PRS signals belonging to the other two BSs. For example, as shown in FIG. 2A, the first BS (not shown) may transmit PRS 202 in a first set of symbols, while the second BS (not shown) may transmit PRS 204 in a second set of symbols, and the third BS (not shown) may transmit PRS 206 in a third set of symbols. As shown in FIG. 2A, in a comb-6 pattern, each of PRSs 202, 204, and 206 has a comb pattern of 6, meaning that in the frequency domain (i.e., vertical) the pattern repeats every 6th sub-carrier. In some implementations, in general, for a comb-N PRS (N being a positive number), in the frequency domain, the pattern of transmitting the PRSs repeats every Nth sub-carrier. For example, in FIG. 2B, in which the comb pattern is 4 (i.e., comb-4), the pattern of transmitting the PRSs repeats every 4th sub-carrier in the frequency domain.

In the uplink direction, the SRS for positioning may resolve two aspects specific to positioning. Since positioning involves measurements (e.g., from multiple receiving BSs), the SRS may have enough range to reach not only the serving BS (e.g., to which the wireless terminal is connected), but also the neighboring BSs that are involved in the positioning process. The SRS may also be designed to cover the full bandwidth, where the resource elements are spread across different symbols, such as to cover all subcarriers. Therefore, the SRS may also be designed with a comb-based pattern similar to the PRS. The different wireless terminals signals may be multiplexed over the same transmitting symbol by assigning different comb patterns. To minimize the interference, a wireless terminal may be configured with different SRS instances, each having independent power control loops. This may allow the SRS pointed at neighboring cells to have better "hearability" (or reception) and may keep the interference low in the serving cell. As discussed above, an example SRS 208 transmitted by a wireless terminal is shown in FIG. 2B.

Maximum Bandwidth

The PRS footprint on the NR time-frequency grid may be configurable with a starting PRB and a PRS bandwidth. The PRS may start at any PRB in the system bandwidth and may be configured with a bandwidth ranging from 24 to 276 PRBs in steps of 4 PRBs. This amounts to a maximum bandwidth of about 100 MHz for 30-kHz subcarrier spacing (30 kHz/subcarrier×12 subcarrier/PRB×276PRB=99.360 Mhz) and to about 400 MHz for 120-kHz subcarrier spacing. The large bandwidth provides for a significant improvement in the time-of-arrival (TOA) accuracy compared to LTE. In NR Uu, the maximum bandwidth in NR V2X SL may depend on the SCS. Only one numerology (e.g., one combination of SCS and CP) may be used in a carrier at a time in NR V2X SL.

To support wireless terminals that cannot handle large bandwidths (e.g., due to processing limitations or high-power consumption), the concept of bandwidth part (BWP) has been introduced. A BWP may be a subset of the 100 MHz maximum bandwidth that may be configured for a 30-kHz SCS, such as in FR1, or a subset of the 400 MHz maximum bandwidth configured for a 120-kHz SCS, such as in FR2.

Bandwidth Part

In 5G, a BWP may be a subset of contiguous common resource blocks for a given numerology. A wireless terminal may be configured with up to four DL BWPs and up to four UL BWPs for each serving cell. Per serving cell, only one BWP in the DL and one BWP in the UL may be activated at a given time (e.g., one SL BWP may be active for all the wireless terminals in a serving cell). For the downlink, the wireless terminal may not be expected to receive outside an active BWP (e.g., except for Radio Resource Management purposes). For the uplink, the wireless terminal may not transmit outside an active BWP and for an active cell, the wireless terminal may not transmit SRSs outside an active BWP. As the sidelink transmissions and receptions of a wireless terminal are contained within the SL BWP and employ the same numerology, all physical channels, reference signals, and synchronization signals in NR V2X sidelink are transmitted within the SL BWP. This also means that the sidelink wireless terminal may not be expected to receive or transmit in a carrier with more than one numerology.

In 5G, PRBs are the RBs that are used for actual transmission/reception. A set of PRBs may belong to a single BWP. PRBs of a BWP may be numbered from 0 to a threshold size (e.g., the size of a BWP-1 1). Each BWP may have its own set of PRBs.

Sidelink Bandwidth Part (SL-BWP)

A SL BWP may occupy a contiguous portion of the bandwidth within a carrier. In a carrier, only one SL BWP may be configured for all the wireless terminals. Sidelink transmissions and receptions of a wireless terminal may be contained within the SL BWP and may employ the same numerology. Thus, all physical channels, reference signals, and synchronization signals in NR V2X sidelink are transmitted within the SL BWP. This also means that in the sidelink, a wireless terminal is not expected to receive or transmit in a carrier with more than one numerology. The SL BWP may be divided into common RBs. A common RB may include 12 consecutive subcarriers with the same SCS, where the SCS may be given by the numerology of the SL BWP.

Resource Pools

In NR V2X, only certain slots are configured to accommodate SL transmissions. Thus, the available sidelink resources may include slots that are allocated for sidelink (time resources) and common RBs within a SL BWP (frequency resources). In NR V2X, a subset of the available SL resources may be configured to be used by several wireless terminals for their SL transmissions. This subset of available SL resources is referred to as a resource pool. The common resource blocks within a resource pool are referred to as PRBs. A resource pool may include contiguous PRBs and contiguous or non-contiguous slots that have been configured for SL transmissions. A resource pool shall be defined within the SL BWP. Therefore, a single numerology is used within a resource pool. If a wireless terminal has an active UL BWP, the SL BWP shall use the same numerology as the UL BWP if they are both included in the same carrier.

Resource Pools in the Frequency Domain

A resource pool may be divided into a configured number L of contiguous subchannels, where a subchannel may include a group of consecutive PRBs in a slot. The number Msub of PRBs in a subchannel corresponds to the subchannel size, which may be configured within a resource pool. In NR V2X SL, the subchannel size Msub may be equal to 10, 12, 15, 20, 25, 50, 75, or 100 PRBs. A subchannel may represent the smallest unit for a sidelink data transmission or reception. A sidelink transmission may use one or multiple sub-channels.

Resource Pools in the Time Domain

The slots that are part of a resource pool are configured and occur with a periodicity of 10,240 ms. In the time domain, the resources (e.g., slots) available for sidelink may be determined by repeating sidelink bitmaps. The length of the bitmap may be equal to 10 bits, 11 bits, 12 bits, . . . , 160 bits. In the case of TDD communications, the resources available for sidelink may be given by the combination of the TDD pattern and the sidelink bitmap.

At each slot of a resource pool, only a subset of consecutive symbols may be configured for the sidelink out of the 14 symbols per slot for a normal CP. The number of consecutive SL symbols may vary between 7 and 14 symbols depending on the physical channels which are carried within a slot.

Resource Pool Allocations: Mode1 and Mode2

In 5G, two different modes (e.g., mode1 and mode2) are used for the selection of subchannels in NR V2X SL communications (e.g., when using the NR V2X PC5 interface). mode1 and mode2 may be equivalent to mode3 and mode4 in LTE V2X but may be extended to include functionality in support of groupcast and unicast communications over NR V2X SL. Mode1 refers to a centralized resource allocation via a BS (e.g., a gNB). The BS may schedule mode1 type sidelink resources to be used by the wireless terminal for sidelink transmissions. Mode1 may apply to scenarios in which the various wireless terminals may be inside the coverage of the BS. Mode2 may refer to autonomous allocations determined via the wireless terminal. With mode2, the wireless terminal may autonomously determine the sidelink transmission resources within the sidelink resources configured by the BS (e.g., a gNB) or preconfigured by the network. Mode2 may apply to scenarios in which the various wireless terminals maybe inside the coverage of the gNB, or outside the coverage of the gNB, or both.

The SL radio resources may be configured such that mode1 and mode2 use separate resource pools. The alternative may be that mode1 and mode2 share the same resource pool. In this alternative scenario, mode1 wireless terminals may notify mode2 wireless terminals of the resources allocated for their future transmissions to avoid collision of shared resources.

Resource Pool: Pool Channels and SL-PRS

It is expected that resource pools may be configured to transport SL-PRS in Rel-18, and that such a configuration may only provide for the transport of SL-PRS and PSCCH (e.g., no PSSCH, PSBCH or PSFCH), where the symbol location of the SL-PRS in a slot may be indicated by a PSCCH that immediately precedes the SL-PRS in the slot, and the identity of the intended recipient(s) of the SL-PRS may be indicated by the SCI of the PSCCH that immediately precedes the SL-PRS in the slot. In this type of dedicated SL-PRS configuration, the slots and subchannels of such a pool may contain only PSCCH and SL-PRS.

Alternately, it is expected that resource pools may be configured to transport SL-PRS for Rel-18, and that such a configuration may provide for the transport of SL-PRS, PSCCH, PSSCH, PSBCH, and PSFCH. In this type of non-dedicated SL-PRS configuration, the slots and subchannels of such a pool may multiplex an SL-PRS with PSSCH, PSBCH, or PSFCH in slots and subchannels, and the identity of the intended recipient(s) of the SL-PRS may be indicated by the SCI of the PSCCH that immediately precedes the SL-PRS in the slot.

Resource Pool: Types of SL-PRS Supported

For Rel-18, it is expected that a resource pool may be configured to use only a first type of SL-PRS sequence (e.g., only Pseudo-Random type), another resource pool may be configured to use only a second type of SL-PRS sequence (e.g., only Zadoff-Chu type), and another resource pool may be configured to use multiple types of SL-PRS sequence (e.g., Pseudo-Random and Zadoff-Chu). For example, a first resource pool may be configured to use a first type of SL-PRS sequence to align with and optimize time and frequency resources of that pool (e.g., alignment of the bands supported by the system and the device, as may be defined in a supportedBandListSidelink IE described below), a second resource pool may be configured to use a second type of SL-PRS sequence so as to minimize the PAPR of a device's transmissions on the channel used by that pool, and a third resource pool may be configured to use one or multiple types of SL-PRS sequences.

Mode1 Resource Scheduling

Mode1 may use either a dynamic grant (DG) type of scheduling or a configured grant (CG) type of scheduling. With DG, mode1 wireless terminals request the gNB to allocate resources for the transmission of every single TB, for example, via a Scheduling Request (SR) sent to the gNB (e.g., using the PUCCH). The gNB may respond (e.g., with downlink control information (DCI) over the PDCCH) that indicates the SL resources (e.g., the slot(s) and subchannel(s)) allocated for the transmission of a TB (and up to 2 possible retransmissions of this TB) allocated to the wireless terminal.

With CG scheduling, mode1 wireless terminals may request the gNB to allocate resources for the transmission of several TBs by first sending to the gNB a message with wireless terminal assistance information that includes information about the expected SL traffic such as: periodicity of TBs, TB maximum size and quality of service (QOS) information, etc. This information may be used by the gNB to create, configure, and allocate a CG to the wireless terminal that may satisfy the requirements of the SL traffic. The CG may be configured using a set of parameters that may include the CG index, the time-frequency allocation, and the periodicity of the allocated SL resources. A wireless terminal may be assigned a maximum number of three SL resources during each period of the CG.

For CG scheduling, there may be two types of allocation schemes for SL: CG type 1 and CG type 2. CG type 1 allocations may be utilized by the wireless terminal immediately and until it is released by the BS. CG type 2 allocations may be used only after it is activated by the gNB and until it is deactivated. The gNB notifies the wireless terminal of the activation and deactivation of type 2 CG allocations (e.g., using DCI signaling). The DCI may also include the CG index and the time-frequency allocation of a type 2 CG. A type 2 CG may configure multiple CGs for a wireless terminal and may only activate a subset of the CGs based on the wireless termina's needs.

Mode2 Resource Scheduling

NR V2X wireless terminals may autonomously select their SL resources (e.g., one or several subchannels) from a resource pool when using MODE2. MODE2 wireless terminals may operate without network coverage. A MODE2 resource pool may be configured by the gNB when the wireless terminal is in network coverage. A MODE2 wireless terminal may operate using a dynamic or a semi-persistent scheduling scheme. The dynamic scheme only selects resources for a TB while the semi-persistent scheme selects resources for several consecutive Reselection Counter TBs.

The dynamic scheme selects new resources for each TB and may only reserve resources for the retransmissions of that TB. A reserved resource, in some implementations, may be a selected resource that a wireless terminal reserves for a future transmission (e.g., by notifying the neighboring wireless terminals using the first-stage SCI).

The semi-persistent scheme selects and reserves resources for the transmission of several TBs (and their retransmissions). The time period between the resources selected for the transmission of consecutive TBs in the semi-persistent scheme may be defined by the Resource Reservation Interval (RRI). The selected RRI may also determine the Reselection Counter that may be randomly set within an interval that depends on the selected RRI.

To select new SL resources for both dynamic and semi-persistent schemes, a wireless terminal first defines the selection window where it looks for candidate resources to transmit a TB. Once the selection window is defined, the wireless terminal may identify the candidate resources within the selection window. A candidate resource may be defined by a slot in the time domain and $L_{PSSCH}$ contiguous subchannels in the frequency domain ($L_{PSSCH}$ is the number of contiguous PSSCH in the frequency domain).

NR V2X Sidelink Numerology

The frequencies in which NR V2X sidelink may operate are within the two following frequency ranges: (i) Frequency range 1 (FR1): 410 MHz to 7.125 GHZ, and (ii) Frequency range 2 (FR2): 24.25 GHz to 71.2 GHz. To support diverse requirements and different operating frequencies in FR1 and FR2, a scalable OFDM numerology may be provided for NR V2X (e.g., based on Rel. 15 NR Uu). Each OFDM numerology may be defined by a Subcarrier Spacing (SCS) and a Cyclic Prefix (CP). NR V2X supports multiples of 15 kHz for the SCS of the OFDM waveform. Different OFDM numerologies may be obtained with a scalable SCS given by 2 to the power of $\mu \times 15$ kHz, where u is an SCS configuration factor. For NR V2X, the SCS configuration factor may be $\mu=0, 1, 2, 3$, such that the SCS may be equal to 15 kHz, 30 kHz, 60 kHz, or 120 kHz. In FR1, 15 kHz, 30 kHz, and 60 kHz may be supported for the SCS, while 60 kHz and 120 kHz may be supported for the SCS in FR2. It should be noted that only the 60 kHz SCS configuration may be supported in both FR1 and FR2.

NR V2X Sidelink Physical Layer Structure

Transmissions in NR V2X SL use the OFDM waveform with a CP. The sidelink frame structure may be organized in radio frames (also may be referred as frames), each with a duration of 10 ms. A radio frame may be divided into 10 subframes, each with a duration of 1 ms. The number of slots per subframe and the SCS for the OFDM waveform may be flexible for NR V2X (e.g., a subframe may have 1, 2, 4, or 8 slots per subframe, based on the SCS, resulting in a variable slot duration of 1 ms, 0.5 ms, 0.25 ms, or 0.0125 ms for an SCS of 15 kHz, 30 kHz, 60 kHz, or 120 kHz, respectively). It should be noted that the smallest unit of time for scheduling SL transmissions in NR V2X is a slot.

Definition of Sidelink Positioning Group (SPG)

A Sidelink Positioning Group (SPG) is a set of V2X-enabled wireless terminals that form a group for the purpose of positioning. The group of wireless terminal s send and receive SL-PRSs and calculate the position of the Target wireless terminal (defined below) based on the measurement done by the wireless terminals. Neither a Uu link nor a network-based location server is involved in the sidelink positioning process. Instead, the positioning process is fully distributed based on the positioning group. In one architecture, the Anchor UE (also defined below) of the group can assume the role of a location server.

Definition of Anchor UE (AUE)

An Anchor UE (AUE) is a wireless terminal whose location is known and is used to locate Target UEs of an SPG. In one architecture, the AUE of the group may take the role of a location server. The AUE participates in sidelink positioning and helps the Target wireless terminals of the SPG to acquire the position of the AUE by sending/receiving SL-PRS and doing relevant measurements. The absolute position of the AUE is known for absolute sidelink positioning, but it is not necessary for relative sidelink positioning.

Definition of Target UE (TUE)

A Target UE (TUE) is a wireless terminal that is associated with an SPG administered by an AUE.

Definition of Location Management Function (LMF)

A Location Management Function (LMF) is a network entity defined in a 5G Core Network to provide positioning functionality by means to determine the geographic position of a mobile device based on downlink and uplink location-measuring radio signals.

NR System Information

A wireless terminal receives a resource pool configuration and an SL DRB configuration via SIB12 for NR sidelink communication (e.g., as specified in TS 38.331) and/or resource pool configuration via SIB13 and SIB14 for V2X sidelink communication (e.g., also as specified in TS 38.331).

SI in NR includes a Master Information Block (MIB) and several System Information Blocks (SIBs), which are divided into Minimum SI and Other SI. Minimum SI carries basic information required for initial access and for acquiring any other SI. Minimum SI includes MIB and SIB1. For a wireless terminal to be allowed to camp on a cell, it may have acquired the contents of the Minimum SI from that cell. Other SI includes all SIBs not broadcast in the Minimum SI. The wireless terminal may not need to receive these SIBs before accessing the cell.

The content and scheduling of the minimum SI of MIB and SIB1 may be as indicated below.

The MIB may provide for a System Frame Number (SFN), critical information for the reception of SIB1 (e.g., SCS, subcarrier offset, DMRS position, and/or PDCCH configuration), a cell barred flag, and/or an intra-frequency reselection allowed flag. The MIB may be mapped on to a Broadcast Control Channel (BCCH) logical channel and may be carried on a Broadcast Channel (BCH) transport channel. The BCH is then mapped onto a Physical Broadcast Channel (PBCH).

The MIB may be transmitted with a periodicity of 80 ms and may be repeated (according to Synchronization Signal Block (SSB) periodicity) within the 80 ms. MIB contents may be the same over the 80 ms period, and the same MIB may be transmitted over all SSBs within the Synchronization Signal (SS) burst set. The MIB may provide the wireless terminal with parameters (e.g., Control Resource Set (CORESET) configuration) required to acquire SIB1 (e.g., more specifically, information useful for monitoring of a PDCCH for scheduling a PDSCH that carries SIB1).

SIB1 may provide cell selection information, a Public Land Mobile Network (PLMN) list, cell ID, tracking area code, RAN area code, cell reserved flag, connection establishment failure control information, SI scheduling information, serving cell common uplink and downlink configurations (e.g., configuration information for a Random Access Channel (RACH), paging, etc.), Supplementary UL (SUL) configuration, SSB scheduling information, cell-specific TDD UL/DL configurations, a cell's Internet Protocol (IP) Multimedia Subsystem (IMS) emergency bearer support flag (e.g., for wireless terminals in limited service), emergency call over IMS support flag, a wireless terminal's timers and constants, access control information, etc.

The SIB1 may carry the most critical information required for the wireless terminal to access the cell (e.g., random access parameters). The SIB1 may include information regarding the availability and scheduling of other SIBs (e.g., mapping of SIBs to SI message, periodicity, SI window size, etc.) SIB1 may also indicate whether one or more SIBs are only provided on-demand, in which case SIB1 may also provide a PRACH configuration needed by the wireless terminal to request the required SI. The SIB1 may be transmitted on the Downlink Shared Channel (DL-SCH (e.g., a logical channel-BCCH)) with a periodicity of 160 ms and variable transmission repetition periodicity within 160 ms. The SIB1 may be a cell-specific SIB.

The wireless terminal may acquire the SI upon cell selection (e.g., upon power on), cell reselection, return from out of coverage, after reconfiguration with sync completion, after entering the network from another Radio Access Technology (RAT), upon receiving an indication that the SI has changed, upon receiving a Public Warning System (PWS) notification, and/or whenever the wireless terminal does not have a valid version of a stored SIB.

SIB on Demand

For NR, two different types of SIBs may be employed. One type is transmitted periodically, like the SIBs in LTE; the other type is transmitted in response to a request from a wireless terminal. In NR, the MIB and SIB1 (e.g., the minimum SI) may always be transmitted periodically using broadcast resources, then, depending on the state of a flag in SIB1, the remaining SIBs may also be transmitted periodically and obtained from broadcast resources (e.g., SIB1). Otherwise, the state of the flag in SIB1 may indicate that the remaining SIBs of the system are acquired by the wireless terminal via a request to the gNB using Radio Resource Control (RRC) signaling. The remaining NR SIBs may be described as follows:

SIB2 may carry cell reselection criteria.

SIB3 may carry an NR intra-frequency neighbor cell list and associated reselection criteria.

SIB4 may carry an NR inter-frequency neighbor cell list and associated reselection criteria.

SIB5 may carry an E-UTRA neighbor cell list and associated reselection criteria.

SIB6 may carry Earthquake and Tsunami Warning System (ETWS) notification information.

SIB7 may carry ETWS secondary notification information.

SIB8 may carry Commercial Mobile Alert System (CMAS) notification information.

SIB9 may carry Global Positioning System (GPS) time and Coordinated Universal Time (UTC) information.

SIB10 may carry the Human-Readable Network Names (HRNNs) of the Non-Public Networks (NPNs) listed in SIB1.

SIB11 may carry information related to idle/inactive measurements.

SIB12 may carry NR sidelink communication configurations.

SIB13 may carry configurations of V2X sidelink communications (e.g., as defined in TS 36.311).

SIB14 may carry configurations of V2X sidelink communications (e.g., as defined in TS 36.311), which may be joined with the information included in SIB13.

SIB15 may carry configurations of disaster roaming information.

SIB16 may carry configurations of slice-specific cell reselection information.

SIB17 may carry configurations of Tracking Reference Signal (TRS) resources for idle/inactive wireless terminals.

SIB18 may carry Group IDs for Network selection (GINs) to support access using credentials from a credentials holder or to enable wireless terminal onboarding. SIB18 may only be present if there is at least one Standalone Non-Public Network (SNPN) that supports either access using a credentials holder or wireless terminal onboarding.

SIB19 may carry satellite assistance information.

SIB20 may carry information required to acquire the Multicast Control Channel (MCCH) configuration for Multicast and Broadcast Services (MBS) broadcast.

SIB21 may carry the mapping between frequency and MBS.

UE Assistance Information

UE Assistance Information may be a mechanism by which a wireless terminal may inform the NW (or a peer wireless terminal, in the case of V2X communications) of its various internal statuses so that the NW (or peer wireless terminal) can assign and/or control resources to better fit the specific RF, operational, or other conditions of the wireless terminal sending the assistance information message. The mechanism may use a UEAssistanceInformation message for a wireless terminal to inform the NW of its various internal statuses. The mechanism may use a UEAssistanceInformationSidelink message for a wireless terminal to inform a peer wireless terminal of its various internal statuses.

Possible Sidelink Positioning Enhancements

As mentioned above, improvements in positioning accuracy may be achieved by taking advantage of the PRS reference signal's design with respect to enchantments to time and frequency resource allocations, which includes high RE density and better correlation properties than that of the existing reference signals due to the diagonal or staggered reference signal pattern.

The 5G system is expected to implement SL-PRS (and other reference type signals) across multiple different types of wireless terminals (e.g., energy harvesting wireless terminals, IoT devices, cell phones, smart watches, customer-premise equipment), where each device may support different service levels. The term wireless terminal used in the following discussions includes the wireless terminals, such as the AIoTs, that are powered by energy harvesting. The discussed concepts may apply to other devices, such as the IoT devices, cell phones, smart watches, customer-premise equipment, or other wireless terminals, without departing from the scope of those concepts.

The 5G system may be required to support a different time and frequency resource allocation (e.g., dimensioning of time and frequency resource's) as used by each different device to transmit an SL-PRS as dictated by the capabilities (or lack of capabilities) of each different device type.

For some devices with higher capabilities, the dimensioning of RF resources used by the device to transmit the SL-PRS signal may be configured onto the device (e.g., via RRC signaling). Such a dimensioning of RF resources as transported to the device via RRC SL-PRS configuration may be determined by the 5GS and the dimensioning determination may consider at least the available 5G System's NW resources(s), the 5G system's NW configuration, the available gNB RF resources that can assign to the device, and the capabilities of the device.

However, some devices (e.g., energy harvesting wireless terminals) may have such limited capability that the dimensioning of time and frequency resources to be used by the device for the transmission of signals (which is not limited to just SL-PRS signals) may not be configured onto the device (e.g., via RRC signaling or any other DL transmission). Devices of such limited capability may be limited to the use of time and frequency dimension that is pre-configured into the device (e.g., at the time of device manufacturing), where the pre-configured dimension of time and frequency resources are matched to the capabilities of the device.

The wireless terminals, such as the wireless terminals 101-104, as shown in FIG. 1, may be energy harvesting wireless terminals. Some of the energy harvesting wireless terminals may be of such limited capability that they may have minimal or no capacity to receive DL signals from the 5G system. Also, the corresponding UL capacity of the energy harvesting wireless terminals may be severely restricted to only the most essential data. Thus, given the low power, low cost, and low complexity requirements of an energy harvesting wireless terminal, any additional UL signaling by the device in support of security, access control, mobility, and positioning may need to be highly optimized (e.g., as compared to current techniques used by IoT type devices).

For an energy harvesting wireless terminal, the energy available for the transmission of a UL signal may be limited to either the energy that is immediately available and concurrently harvested by the device or the energy that was previously harvested and stored in some limited storage apparatus (e.g., a capacitor) or both. In both of these scenarios, the energy available for powering the transmitter and transmission of an UL signal may be limited and temporal. Therefore, the management of the limited power budget for the transmission of UL signals (e.g., for devices 102 and 104 that are able to transfer UL signals) may be important for the energy harvesting wireless terminal type device to meet its operational requirements.

Wireless Terminal's Available Power for Transmission of SL-PRS

For an energy harvesting wireless terminal, the power available for the transmission for each symbol of an RE of an SL-PRS may be denoted as P_Txsym. The maximum value of P_Txsym may be P_TX_SYM_MAX, which is the maximum power at which a symbol may be transmitted. The minimum value of P_Txsym may be P_TX_SYM_MIN, which is the minimum power at which a symbol may be transmitted. The P_Txsym may be any value between P_TX_SYM_MIN and P_TX_SYM_MAX.

The total power used for the transmission of a configured SL-PRS signal may then be denoted as P_Txprs, where a value for P_Txprs may be calculated as follows.

P_Txprs=P_Txsym*n_RE*Num_PRBs_Per_SL-PRS*(1/comb_size) Num_Sym_Per_SL-PRS, where n_RE is 12 (12 REs in each PRB), Num_PRBs_Per_SL-PRS is the number of PRBs allocated to a SL PRS configuration, and Num_Sym_Per_SL-PRS is the number of symbols allocated to a SL PRS configuration.

A wireless terminal that receives an SL-PRS may have a signal detection threshold for receiving an SL-PRS RE which may be denoted as P_RX_MIN. The P_RX_MIN may be the minimum power at which an SL-PRS RE may be received at, and correctly decoded.

The maximum total power for the transmission of an SL-PRS may be denoted as Pmax_Txprs. The Pmax_Txprs may be equal to P_TX_SYM_MAX*n_ RE*Num_PRBs_Per_SL-PRS*(1/comb_size)*Num_Sym_Per_SL-PRS.

The minimum total power for the transmission of an SL-PRS may be denoted as Pmim_Txprs. The Pmim_Txprs may be equal to P_TX_SYM_MIN*n_ RE*Num_PRBs_Per_SL-PRS*(1/comb_size)*Num_Sym_Per_SL-PRS, then Pmim_Txprs represents the minimum total power for the transmission of an SL-PRS.

A power for the transmission of an SL-PRS that is between the Pmin_Txprs and the Pmax_Txprs may be denoted as P_Txprs. The P_Txprs may be equal to P_Txsym*n_RE*Num_PRBs_Per_SL-PRS*(1/comb_size)*Num_Sym_Per_SL-PRS.

The signal detection threshold for a wireless terminal receiving an SL-PRS RE may be denoted as P_RX_MIN. It may be understood that the transmitting wireless terminal needs to transmit each RE of the SL-PRS at a power level that is greater than or equal to P_RX_MIN in order to guarantee that the receiving wireless terminal may detect and properly decode the SL-PRS transmitted by the wireless terminal (e.g. P_Txprs> (P_RX_MIN*n_RE*Num_PRBs_Per_SL-PRS*(1/comb_size)*Num_Sym_Per_SL-PRS)). In other words, to satisfy the signal detection threshold (P_RX_MIN) of a receiving wireless terminal, a minimum transmission power needs to be guaranteed for each symbol (P_Txsym) for each RE of the SL-PRS. (e.g., P_Txsym has to be greater than or equal to P_RX_MIN).

Because the distance between a transmitting wireless terminal and a receiving wireless terminal is not fixed, the value of the P_Txsym needed to satisfy the P_RX_MIN may change as a function of the distance between the transmitting and receiving wireless terminal. Additionally, because the energy available for the operation of an energy harvesting wireless terminal is inherently variable (e.g., the energy from power harvesting) the power available for operating the wireless terminal's transmitter may also be variable, and at times may not be sufficient to transmit all symbols of an SL-PRS at a level sufficient to provide P_Txprs that is greater than or equal to (P_RX_MIN*n_ RE*Num_PRBs_Per_SL-PRS*(1/comb_size)*Num_Sym_Per_SL-PRS). Thus, there may be conditions where power available for the transmission of a configured SL-PRS may not be sufficient to provide a P_Txsym that is larger than the P_RX_MIN.

Using the current method for transmitting SL-PRS, the energy harvesting wireless terminal may transmit the SL-PRS as configured using the power available, which may result in P_Txsym that is equal to P_Txprs/(n_RE*Num_PRBs_Per_SL-PRS*(1/comb_size)*Num_Sym_Per_SL-PRS) to be less than P_RX_MIN for each RE to received. Thus, the receiver may not be able to detect the signal at all as the signal is below the detection threshold.

Therefore, there is a need to identify a process for the energy harvesting wireless terminal to manage the allocation of available power across the SL-PRS such that P_Txprs is greater than or equal to (P_RX_MIN*n_RE*Num_PRBs_Per_SL-PRS*(1/comb_size)*Num_Sym_Per_SL-PRS).

Assuming the energy harvesting wireless terminal is pre-configured with at least one SL-PRS configuration, which includes at least the parameters of comb_size, number of PRBs, and the number of transmitted symbols, the energy harvesting wireless terminal may adjust the dimensioning of one or more parameters to decrease the actual number of symbols that may be used by the SL-PRS transmission. By decreasing the number of symbols used in transmitting the SL-PRS the wireless terminal may increase the power allocated to each remaining transmitted symbol (from the power available for transmission of the SL-PRS) to ensure that P_Txprs is greater than or equal to (P_RX_MIN*n_RE*Num_PRBs_Per_SL-PRS*(1/comb_size)*Num_Sym_Per_SL-PRS).

Mechanisms for Reducing the Number of Symbols of an SL-PRS Configuration

Several methods/mechanisms for reducing the number of symbols of an SL-PRS configuration are described below. In each method, the energy harvesting wireless terminal may be pre-configured (e.g., either at the manufacturing time or through the NW messages) with SL-PRS parameters that are dimensioned to the capabilities of the wireless terminal, or maybe received from the network (e.g., via broadcast or RRC signaling). The minimum receiving power threshold of a target receiver and the power available to the energy harvesting wireless terminal to transmit a pre-configured SL-PRS are then determined.

A determination may then be made as to whether the power available to the energy harvesting wireless terminal to transmit a pre-configured SL-PRS is sufficient to meet the minimum receiving power threshold of a target receiver. If not, a re-dimensioning of the pre-configured SL-PRS that is optimal for reducing the number of symbols that would be used by an SL-PRS transmission may be achieved by applying one or more of the methods described below. The re-dimensioning may be made such that the power available to transmit the reduced number of SL-PRS symbols is sufficient to meet the minimum receiving power threshold of a target receiver while still maximizing the number of symbols that carry the SL-PRS.

Increasing the Comb-Size to Reduce the Number of Symbols of an SL-PRS Configuration In some implementations, decreasing the number of symbols used by the SL-PRS such that the actual power available for each symbol of the transmission of the SL-PRS is sufficient for the receiving wireless terminal to properly receive the SL-PRS (e.g., P_Txsym greater than or equal to P_RX_MIN) may be achieved by changing the comb_size, such that a smaller number of symbols per PRB is transmitted by the SL-PRS (this method is referred hereinafter as method 1).

For example, if the pre-configured comb-size is 2, then every other symbol of the PRB may be used to transmit an SL-PRS signal. Alternatively, if the pre-configured comb-size is 5, then every 5th symbol of the PRB may be used to transmit an SL-PRS signal. Thus, if a wireless terminal determines that for a given pre-configured SL-PRS the P_Txprs is less than (P_RX_MIN*n_RE*Num_ PRBs_Per_SL-PRS*(1/comb_size)*Num_Sym_Per_SL-PRS), then the wireless terminal may reduce the number of symbols used by the SL-PRS by changing the come size such that a smaller number of symbols per PRB is used. For example, the comb-size may be changed from 2 to 4.

As an example, assume the following:

$$P\_Txprs = 200$$

$$P\_RX\_MIN = 3$$

$$n\_RE = 12$$

$$Num\_PRBs\_Per\_SL-PRS = 4$$

$$Comb\_size = 2$$

$$Num\_Sym\_Per\_SL-PRS = 6$$

The power per symbol transmitted may be calculated as follows.

$$P\_Txsym = P\_Txprs/(n\_RE * Num\_PRBs\_Per\_SL-PRS * (1/Comb\_size) * Num\_Sym\_Per\_SL-PRS) = 200/(12*4*(1/2)*6) = 1.3888.$$

Then the power per symbol transmitted (P_Txsym) is less than the receiver minimum threshold (P_RX_MIN), which is 3.

However, if the comb_size is changed from 2 to 5, then the power per symbol transmitted may be calculated as follows.

$$P\_Txsym = 200/(12*4*(1/5)*6) = 3.47.$$

In this case, the power per symbol transmitted (P_Txsym) is greater than the receiver minimum threshold power (P_RX_MIN). Thus, by the reduction in the number of symbols, as derived from method 1, the power available for each remaining symbol that is transmitted is increased and thus the value of P_Txprs is also increased, such that P_Txprs is then greater than (P_RX_MIN*n_RE*Num_PRBs_Per_SL-PRS*(1/comb_size)*Num_Sym_Per_SL-PRS).

Reducing the Number of Symbols Transmitted by the SL-PRS to Reduce the Number of Symbols of an SL-PRS Configuration In some implementations, decreasing the number of symbols used by the SL-PRS (e.g., the number of consecutive OFDM symbols of a slot that are allocated to the SL-PRS), such that the actual power available for each symbol of the transmission of the SL-PRS is sufficient for the receiving wireless terminal to properly receive the SL-PRS (e.g., P_Txsym is greater than or equal to P_RX_MIN), may be achieved by reducing the number of symbols transmitted by the SL-PRS (this method is referred hereinafter as method 2).

For example, if the pre-configured number of symbols per SL-PRS is 6, then 6 consecutive symbols of a slot are used to transmit an SL-PRS signal. Alternatively, if the pre-configured number of symbols per SL-PRS is 2, then 2 consecutive symbols of a slot are of a PRB are used to transmit an SL-PRS signal. Thus, if a wireless terminal determines that for a given pre-configured SL-PRS that P_Txprs< (P_RX_MIN*n_RE*Num_PRBs_Per_SL-PRS*(1/comb_size)*Num_Sym_Per_SL-PRS), then the wireless terminal may reduce the number of symbols used by the SL-PRS by changing the Num_Sym_Per_SL-PRS, such that a smaller number of symbols per SL-PRS is used (e.g., change from 6 symbols per SL-PRS to 4 symbols per slot per SL-PRS).

As an example, assume the following:

$$P\_Txprs = 200$$

$$P\_RX\_MIN = 3$$

$$n\_RE = 12$$

$$Num\_PRBs\_Per\_SL-PRS = 4$$

$$Comb\_size = 2$$

$$Num\_Sym\_Per\_SL-PRS = 6$$

The power per symbol transmitted may be calculated as follows.

$$P\_Txsym = P\_Txprs/(n\_RE * Num\_PRBs\_Per\_SL-PRS * (1/comb\_size) * Num\_Sym\_Per\_SL-PRS)200/(12*4*(1/2)*6) = 1.3888.$$

Then the power per symbol transmitted (P_Txsym) is less than the receiver minimum threshold (P_RX_MIN), which is 3.

However, if the symbols per slot per SL-PRS is changed from 6 to 2, then the power per symbol transmitted may be calculated as follows.

$$P\_Txsym = 200/(12*4*(1/2)*2) = 4.16$$

In this case, the power per symbol transmitted (P_Txsym) is greater than the receiver minimum threshold (P_RX_MIN). Thus, by the reduction in the number of symbols as derived from method 2, the power available for each remaining symbol that is transmitted is increased and the value of P_Txprs is also increased such that P_Txprs is greater than (P_RX_MIN*n_RE*Num_PRBs_Per_SL-PRS*(1/comb_size)*Num_Sym_Per_SL-PRS).

Reducing the Number of Prbs of the SL-PRS to Reduce the Number of Symbols of an SL-PRS Configuration In some implementations, decreasing the number of PRBs used by the SL-PRS (e.g., the number of PRBs allocated to all SL-PRS resources), such that the actual power available for each symbol of the transmission of the SL-PRS is sufficient for the receiving wireless terminal to properly receive the SL-PRS (e.g., P_Txsym greater than or equal to P_RX_MIN), may be achieved by reducing the number of PRBs per SL-PRS (this method is referred hereinafter as method 3).

For example, if the pre-configured number of PRBs of the SL-PRS is 4, then 4 consecutive PRBs may be used to transmit an SL-PRS signal. Alternatively, if the pre-configured number of PRBs is 1, then 1 consecutive PRB is used to transmit an SL-PRS signal. Thus, if a wireless terminal determines that for a given pre-configured SL-PRS that P_Txprs less than (P_RX_MIN*n_RE* Num_PRBs_Per_SL-PRS*(1/comb_size)*Num_Sym_Per_SL-PRS), then the wireless terminal may reduce the number of symbols used by the SL-PRS by reducing the number of PRBs used (e.g., by changing from 4 PRB to 2 PRB).

As an example, assume the following:

$$P\_Txprs = 200$$

$$P\_RX\_MIN = 3$$

$$n\_RE = 12$$

$$Num\_PRBs\_Per\_SL{-}PRS = 4$$

$$Comb\_size = 2$$

$$Num\_Sym\_Per\_SL{-}PRS = 6$$

The power per symbol transmitted may be calculated as follows.

$$P\_Txsym = P\_Txprs/(n\_RE * Num\_PRBs\_Per\_SL{-}PRS * (1/comb\_size) * Num\_Sym\_Per\_SL{-}PRS) = 200/(12*4*(1/2)*6) = 1.3888.$$

Then the power per symbol transmitted (P_Txsym) is less than the receiver minimum threshold (P_RX_MIN), which is 3.

However, if the number of PRBs is changed from 4 to 1, then the power transmitted per symbol may be calculated as follows.

$$P\_Txsym = 200/(12*1*(1/2)*6) = 5.55.$$

In this case, the power per symbol transmitted (P_Txsym) is greater than the receiver minimum threshold (P_RX_MIN). Thus, by the reduction in the number of symbols as derived from method 3 the power available for each remaining symbol that is transmitted is increased and the value of P_Txprs is also increased such that P_Txprs is then greater than (P_RX_MIN*n_RE*Num_PRBs_Per_SL-PRS*(1/comb_size)*Num_Sym_Per_SL-PRS).

Combining Several Methods to Reduce the Number of Symbols of an SL-PRS Configuration In some implementations, decreasing the number of symbols used by the SL-PRS, such that the actual power available for each symbol of the transmission of the SL-PRS is sufficient for the receiving wireless terminal to properly receive the SL-PRS (e.g., P_Txsym is greater than or equal to P_RX_MIN), may be achieved by any combination of the methods 1-3, as described above (this method is referred hereinafter as method 4). There may be cases that each of the methods 1-3 may not individually provide sufficient reduction of symbols or there may be cases that are determined to be optimal to only reduce the number of symbols from each of two or more combined methods by a minimal amount, and that that the combined minimum from each is sufficient to result in a total smaller number of symbols being transmitted by the SL-PRS.

For example, if the pre-configured comb-size changed from come-size of 2 to a come-size of 4, and thus the total number of symbols used in the transmission of the SL-PRS is reduced, but the power available for each symbol that is transmitted is still less than P_RX_MIN, then an adjustment by using another method may be made. For example, if the pre-configured number of symbols per SL-PRS is changed from 6 symbols per slot per PRB to 4 symbols per slot per PRB, then the total number of symbols used in the transmission of the SL-PRS may be further reduced.

As an example, assume the following:

$$P\_Txprs = 200$$

$$P\_RX\_MIN = 3$$

$$n\_RE = 12$$

$$Num\_PRBs\_Per\_SL{-}PRS = 4$$

$$Comb\_size = 2$$

$$Num\_Sym\_Per\_SL{-}PRS = 6$$

The power per symbol transmitted may be calculated as follows.

$$P\_Txsym = P\_Txprs/(n\_RE * Num\_PRBs\_Per\_SL{-}PRS * (1/comb\_size) * Num\_Sym\_Per\_SL{-}PRS) = 200/(12*4*(1/2)*6) = 1.3888.$$

Then the power per symbol transmitted (P_Txsym) is less than the receiver minimum threshold (P_RX_MIN), which is 3.

However, if the comb_size is changed from 2 to 4 then, the power per symbol transmitted may be calculated as follows.

$$P\_Txsym = 200/(12*4*(1/4)*6) = 2.77$$

Then the power per symbol transmitted (P_Txsym) is still less than the receiver minimum threshold (P_RX_MIN).

However, if number of symbols per slot per PRB is also changed from 6 to 4, then the power per symbol transmitted may be calculated as follows.

$$P\_Txsym = 200/(12*4*(1/4)*4) = 4.16$$

In this case, the power per symbol transmitted (P_Txsym) is greater than the receiver minimum threshold (P_RX_MIN). Thus, by combining the reduction in the number of symbols as derived from method 1 and method 2, the power available for each remaining symbol that is transmitted is increased and thus the value of P_Txprs is also increased such that P_Txprs is then greater than (P_RX_MIN*n_RE*Num_PRBs_Per_SL-PRS*(1/comb_size)*Num_Sym_Per_SL-PRS). It should be noted that a combination of method 1 and method 2 is not a limiting condition, as any combination of method 1 or method 2 or method 3 may be used. Examples of the use of method 4 are described below with reference to FIGS. 4 and 6.

Transmission of the SL_PRS Using Re-Dimensioned SL-PRS Configurations

Different embodiments may use one or more of the methods described above to re-dimension the SL-PRS. Several such embodiments are described below with reference to FIGS. 3A-3B, 4, 5A-5C, and 6. In each embodiment, a multi-step process may be used that determines an optimal reduction in the number of symbols that would be used by an SL-PRS transmission such that the power available to transmit the remaining SL-PRS symbols is sufficient to meet the minimum receiving power threshold of a target/receiving wireless terminal while still maximizing the number of symbols of the reduced SL-PRS.

The wireless terminal may include rules for selecting one or more of the methods 1-4 to determine an optimal reduction in the number of symbols that would be used by an SL-PRS transmission. For any selected method, the pre-configured SL-PRS may be re-dimensioned by using the selected method to produce a potential SL-PRS with a reduced number of symbols.

Figure 3A:
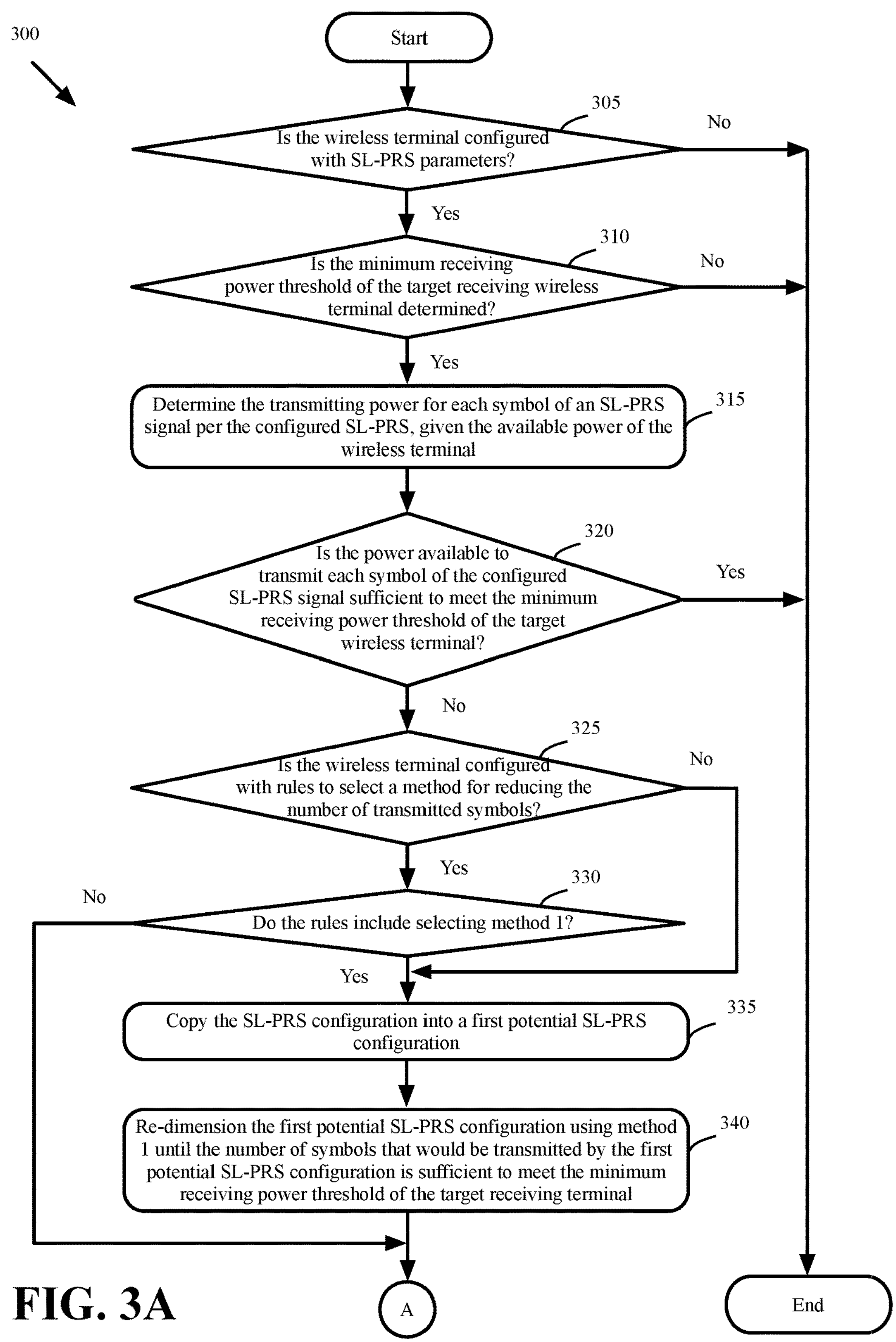
FIGS. 3A-3B illustrate a flowchart of an example method/process performed by a transmitting wireless terminal to reduce the number of symbols for transmitting an SL-PRS, according to an example implementation of the present disclosure.
Figure 3B:
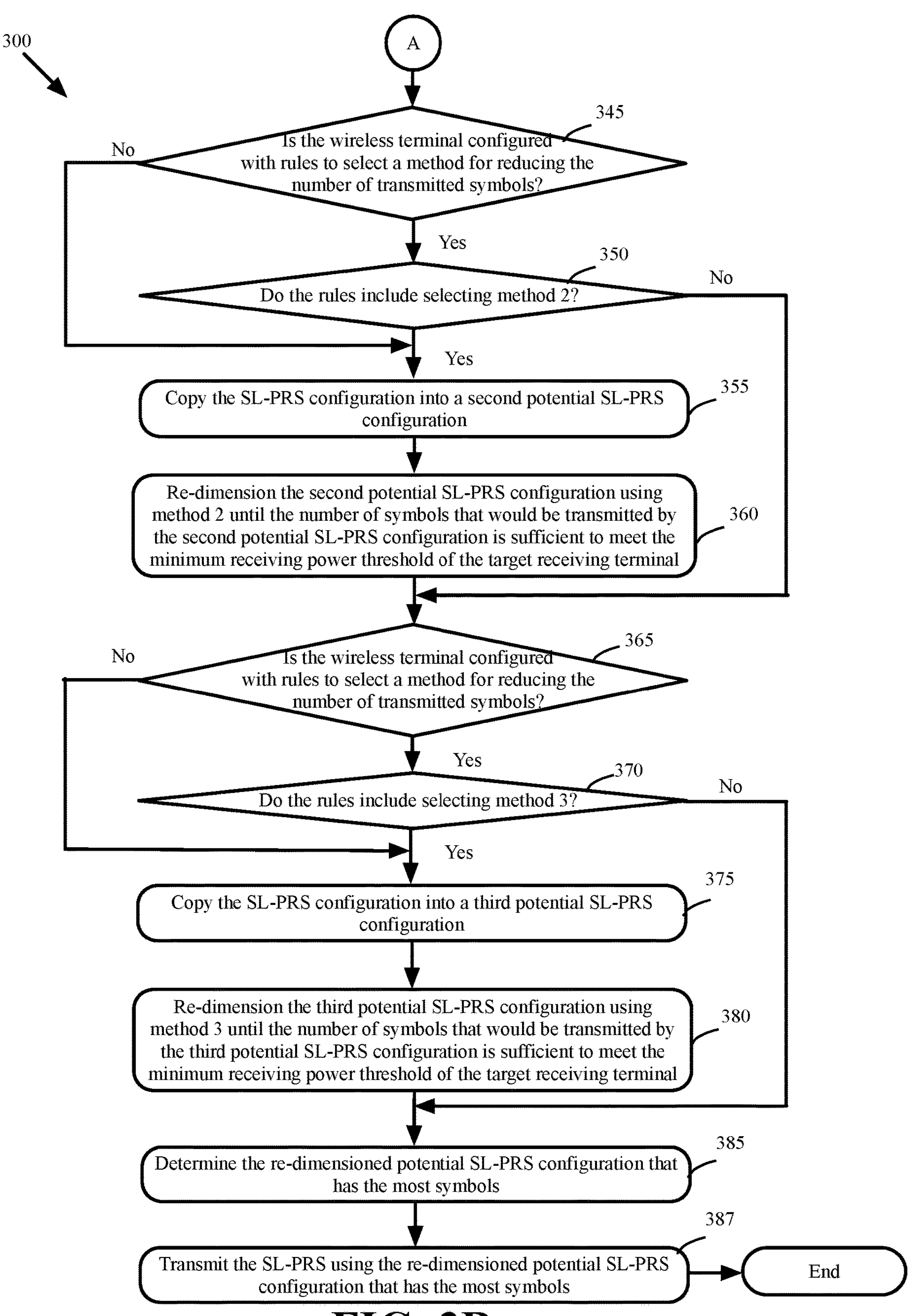

FIGS. 3A-3B illustrate a flowchart of an example method/process 300 performed by a transmitting wireless terminal to reduce the number of symbols for transmitting an SL-PRS, according to an example implementation of the present disclosure. With reference to FIGS. 3A-3B, the process 300 may be performed by at least one processor of any of the wireless terminals 101-104 of FIG. 1. The process 300 may be performed, for example and without limitations, in response to the wireless terminal being triggered to transmit an SL-PRS.

In some implementations, a triggering event for the process 300 (and all other processes/methods described in other figures) may include when the wireless terminal/device performing the process transitions into an RF field that is sufficient to activate its backscatter detection and harvesting operations. Once sufficient energy is harvested to operate one or more processors of the device, the device, by its normal operation of responding to a backscatter signal, may begin to transmit some data, such as the SL-PRS, using a default (pre-configured) SL-PRS configuration or a re-dimensioned configuration, as described above and below. Another (and more complex) triggering event may include, for a more capable device (e.g., capable of establishing an RRC connection), the device receiving a command (e.g., through DL) to transmit the SL-PRS, using a default configuration or a re-dimensioned configuration.

At block 305, a determination may be made as to whether the wireless terminal is configured with SL-PRS parameters. As described above, the wireless terminal may be pre-configured at the manufacturing time and/or through wireless signals (e.g., received from the network) with one or more SL-PRS configurations that may include different parameters. The wireless terminal may be pre-configured with SL-PRS parameters that are dimensioned to the capabilities of the wireless terminal. However, the pre-configured SL-PRS parameters may need to be changed in order to meet the available power of the transmitting wireless terminal as well as the signal detection threshold of a receiving wireless terminal. When the wireless terminal is not configured with SL-PRS parameters, the process 300 may end.

Otherwise, a determination may be made (at block 310) as to whether the minimum receiving power threshold of the target/receiving wireless terminal is determined. For example, the minimum receiving power threshold of the target/receiving terminal may depend on the distance between the transmitting and receiving wireless terminals and the receiving wireless terminal's capabilities. When the minimum receiving power threshold of the target/receiving terminal is not determined, the process 300 may end.

Otherwise, the transmitting power for each symbol of an SL-PRS signal per the configured SL-PRS may be determined (at block 315), given the available power of the wireless terminal. For example, the transmitting power for each symbol of an SL-PRS signal per the configured SL-PRS may be determined based on the total power available for the transmission of the SL-PRS and the number of symbols required by the SL-PRS configuration.

A determination may be made (at block 320) as to whether the power available to transmit each symbol of the configured SL-PRS signal is sufficient to meet the minimum receiving power threshold of the target wireless terminal. If the answer is yes, the process 300 may end. For example, when the power available for the transmission of an SL-PRS (as pre-configured or configured by RRC) is sufficient to meet the detection requirements of a receiver that would receive the SL-PRS transmission, there may be no need to re-dimension the configuration (e.g., to reduce the number of transmitted symbols using the process 300). It should be noted that the determination (at block 320) may be made based the power that would be allocated to a single symbol of the SL-PRS, where the available power allocation to a single symbol may be a fraction of the available power. For example, if each symbol of the SL-PRS that is to be transmitted is allocated an equal part of the available transmission power, then the determination of insufficient transmission power may be made at the level of a single symbol, and not on the total power that would be required to transmit the SL-PRS.

When the power available to transmit each symbol of the configured SL-PRS signal is determined (at block 320) as not to be sufficient to meet the minimum receiving power threshold of the target wireless terminal, a determination may be made (at block 325) as to whether the wireless terminal is configured with one or more rules to select a method for reducing the number of transmitted symbols. For example, a determination may be made as to whether one or more rules are configured in the wireless terminal that select from the set of methods 1-3, as discussed above, to be used to determine an optimal reduction in the number of symbols that would be used by an SL-PRS transmission.

If the wireless terminal is not configured with such rules, the process 300 may proceed to block 335, which is described below. Otherwise, a determination may be made (at block 330) as to whether the rules include selecting method 1. If not, the process 300 may proceed to block 345, which is described below.

At block 335, the SL-PRS configuration may be copied into a first potential SL-PRS configuration. The first potential SL-PRS configuration may then be re-dimensioned (at block 340) using method 1 until the number of symbols that would be transmitted by the first potential SL-PRS configuration is sufficient to meet the minimum receiving power threshold of the target/receiving terminal. For example, the first potential SL-PRS configuration may be re-dimensioned by changing the comb-size to reduce the total number of symbols that would be transmitted as part of the SL-PRS, as described above with reference to method 1. Changing the comb-size may change density of subcarrier and symbols occupied by the transmitted SL-PRS.

The pre-configured SL-PRS may be re-dimensioned by using method 1 to produce a potential SL-PRS with a reduced number of symbols in relation to a parameter X. For method 1, parameter X may be a unit of dimension of the comb_size (e.g., Symbols per PRB). The parameter X may be initially set to the value of the pre-configured comb_size. Then one or more iterations may be performed over method 1 by changing the value of X. For example, X may be incremented by "1" for each iteration until the output of method 1 results in a number of symbols that may carry the potential SL-PRS to be sufficient to meet the minimum receiving power threshold of a target receiver.

The reduced number of symbols from method 1 may be allocated an equal fraction of the available power. The symbol's allocation of the fraction of power may be sufficient to meet the detection requirements of a receiver that would receive the symbols as part of the SL-PRS transmission. For example, if each symbol of the re-dimensioned SL-PRS configuration that is to be transmitted is allocated an equal part of the available transmission power, then the determination of sufficient transmission power may be made at the level of a single symbol, and not on the total power that would be required to transmit the SL-PRS.

At block 345, a determination may be made as to whether the wireless terminal is configured with one or more rules to select a method for reducing the number of transmitted symbols. For example, a determination may be made as to whether one or more rules are configured in the wireless terminal that select from the set of methods 1-3 to be used to determine an optimal reduction in the number of symbols that would be used by an SL-PRS transmission.

If the wireless terminal is not configured with the rules, the process 300 may proceed to block 355, which is described below. Otherwise, a determination may be made (at block 350) as to whether the rules include selecting method 2. If not, the process 300 may proceed to block 365, which is described below.

At block 355, the SL-PRS configuration may be copied into a second potential SL-PRS configuration. The second potential SL-PRS configuration may then be re-dimensioned (at block 360) using method 2 until the number of symbols that would be transmitted by the second potential SL-PRS configuration is sufficient to meet the minimum receiving power threshold of the target/receiving terminal. For example, the second potential SL-PRS configuration may be re-dimensioned by reducing the number of symbols transmitted by the SL-PRS (e.g., the parameter Num_Sym_Per_SL-PRS) to reduce the total number of symbols that would be transmitted as part of the SL-PRS, as described above with reference to method 2.

The pre-configured SL-PRS may be re-dimensioned by using method 2 to produce a potential SL-PRS with a reduced number of symbols in relation to a parameter Y. For method 2, parameter Y may be a unit of dimension of NumPRSSymbols (e.g., the number of consecutive OFDM symbols allocated for each PRS resource). The parameter Y may be initially set to the value of the pre-configured NumPRSSymbols. Then one or more iterations may be performed over method 2 by changing the value of Y. For example, Y may be incremented by "1" for each iteration until the output of method 2 results in a number of symbols that would be transmitted by the potential SL-PRS is sufficient to meet the minimum receiving power threshold of a target receiver.

The reduced number of symbols from method 2 may be allocated an equal fraction of the available power. The symbol's allocation of the fraction of power may be sufficient to meet the detection requirements of a receiver that would receive the symbols as part of the SL-PRS transmission. For example, if each symbol of the re-dimensioned SL-PRS configuration that is to be transmitted is allocated an equal part of the available transmission power, then the determination of sufficient transmission power may be made at the level of a single symbol, and not on the total power that would be required to transmit the SL-PRS.

At block 365, a determination may be made as to whether the wireless terminal is configured with one or more rules to select a method for reducing the number of transmitted symbols. For example, a determination may be made as to whether one or more rules are configured in the wireless terminal that selects from the set of methods 1-3 to be used to determine an optimal reduction in the number of symbols that would be used by an SL-PRS transmission.

If the wireless terminal is not configured with the rules, the process 300 may proceed to block 375, which is described below. Otherwise, a determination may be made (at block 370) as to whether the rules include selecting method 3. If not, the process 300 may proceed to block 385, which is described below.

At block 375, the SL-PRS configuration may be copied into a third potential SL-PRS configuration. The third potential SL-PRS configuration may then be re-dimensioned (at block 380) using method 3 until the number of symbols that would be transmitted by the second potential SL-PRS configuration is sufficient to meet the minimum receiving power threshold of the target/receiving terminal. For example, the third potential SL-PRS configuration may be re-dimensioned by reducing the number of PRBs per SL-PRS (e.g., the parameter Num_PRBs_Per_SL-PRS) to reduce the total number of symbols that would be transmitted as part of the SL-PRS, as described above with reference to method 3.

The pre-configured SL-PRS may be re-dimensioned by using method 3 to produce a potential SL-PRS with a reduced number of symbols in relation to a parameter Z. For method 3, parameter Z may be a unit of dimension of the NumRB (Number of PRBs allocated for all PRS resources). The parameter Z may be initially set to the value of the pre-configured NumRB. Then one or more iterations may be performed over method 3 by changing the value of Z. For example, Z may be incremented by "1" for each iteration until the output of method 3 results in a number of symbols that would be transmitted by the potential SL-PRS is sufficient to meet the minimum receiving power threshold of a target receiver.

The reduced number of symbols from method 3 may be allocated an equal fraction of the available power. The symbol's allocation of the fraction of power may be sufficient to meet the detection requirements of a receiver that would receive the symbols as part of the SL-PRS transmission. For example, if each symbol of the re-dimensioned SL-PRS configuration that is to be transmitted is allocated an equal part of the available transmission power, then the determination of sufficient transmission power may be made at the level of a single symbol, and not on the total power that would be required to transmit the SL-PRS.

At block 385, the re-dimensioned potential SL-PRS configuration that has the most symbols may be determined. The SL-PRS signal may then be transmitted (at block 387) using the re-dimensioned potential SL-PRS configuration that has the most symbols. The process 300 may then end.

Figure 3C:
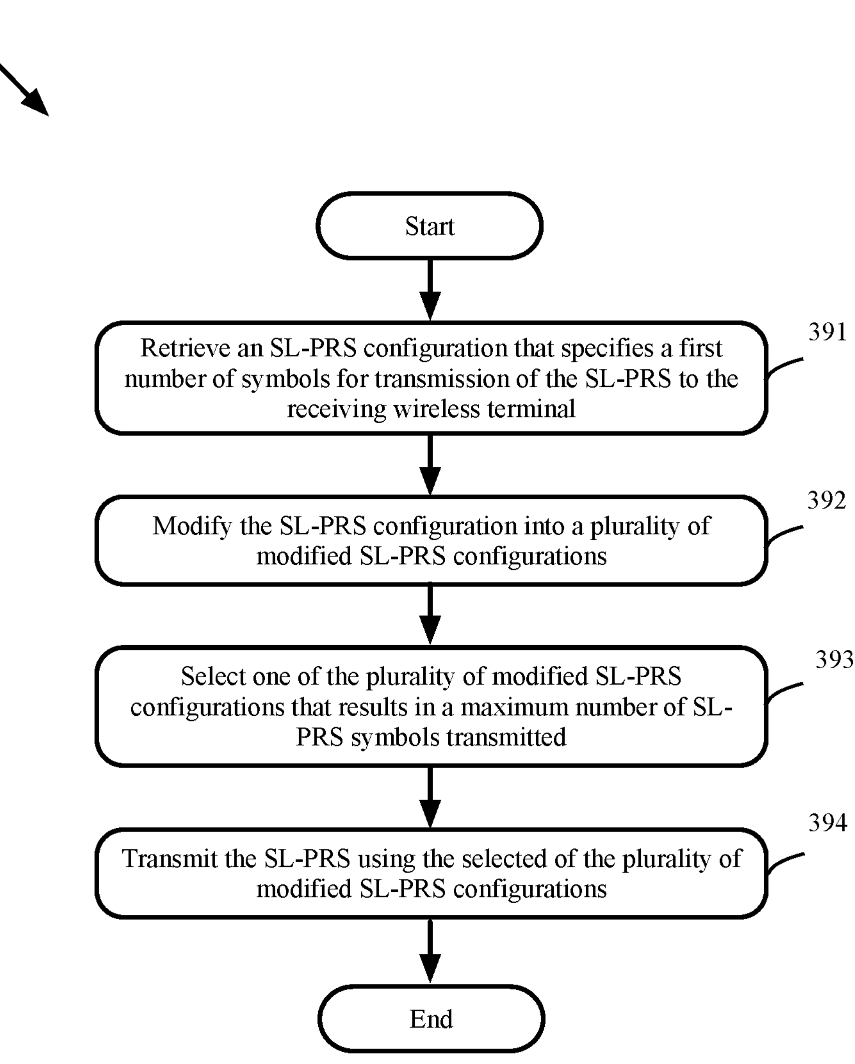
FIG. 3C is a flowchart illustrating an example method/process performed by a transmitting wireless terminal implementing the process of FIGS. 3A-3B, according to an example implementation of the present disclosure.

FIG. 3C is a flowchart illustrating an example method/process 390 performed by a transmitting wireless terminal implementing the process of FIGS. 3A-3B, according to an example implementation of the present disclosure. With reference to FIG. 3C, the process 390 may be performed by at least one processor of any of the wireless terminals 101-104 of FIG. 1. The process 390 may be performed, for example and without limitations, in response to the wireless terminal being triggered to transmit an SL-PRS.

As shown in FIG. 3C, the process 390 may retrieve (at block 391) an SL-PRS configuration that specifies a first number of symbols for transmission of the SL-PRS to a receiving wireless terminal. The wireless terminal may be pre-configured at the manufacturing time with one or more SL-PRS configurations that may include different parameters. For example, the SL-PRS configuration may be stored in the one or more non-transitory computer-readable media of the wireless terminal when the transmitting wireless terminal was manufactured.

In addition to, or in lieu of, being pre-configured at the manufacturing time, the wireless terminal may be pre-configured through wireless signals (e.g., received from the network). For example, in some implementations, the wireless terminal may receive the SL-PRS configuration from the network (e.g., via RRC signaling, via broadcast, etc.).

The wireless terminal may be pre-configured with SL-PRS parameters, such as the number of transmitted symbols, that are dimensioned to the capabilities of the wireless terminal. However, the pre-configured SL-PRS parameters may need to be changed in order to meet the available power of the transmitting wireless terminal as well as the signal detection threshold of a receiving wireless terminal.

The process 390 may modify (at block 392) the SL-PRS configuration into several modified SL-PRS configurations. For example, the SL-PRS configuration may be modified into at least one of the modified SL-PRS configurations by reducing the density of subcarrier and symbols occupied by each transmitted SL-PRS, by reducing the number of symbols that carry the SL-PRS, or by reducing the number of PRBs allocated to the SL-PRS.

Each modified SL-PRS configuration may specify a lower number of symbols for the transmission of the SL-PRS than the first number of symbols and the power required for transmitting the SL-PRS using each of the several modified SL-PRS configurations may satisfy a minimum receiving power threshold of a receiving wireless terminal. The power required for transmitting the SL-PRS using each of the modified SL-PRS configurations may not exceed the available power of the transmitting wireless terminal.

In some implementations, the wireless terminal may use a rule that modifies the SL-PRS configuration into the modified SL-PRS configurations based on one or more criteria. For example, the one or more criteria may include at least one of the available power of the transmitting wireless terminal, the density of subcarrier and symbols occupied by each transmitted SL-PRS configuration, the number of symbols used by the SL-PRS, and the number of PRBs allocated to the SL-PRS.

The process 390 may select (at block 393) one of the several modified SL-PRS configurations that results in a maximum number of SL-PRS symbols transmitted. In some implementations, the wireless terminal may receive a configuration message that includes at least one rule based on which to select the one of the modified SL-PRS configurations.

For example, the wireless terminal may receive the configuration message from a base station through broadcasting, where the configuration message includes an identification of the wireless terminal. As another example, the wireless terminal may establish an RRC connection with a gNB. The wireless terminal may enter an RRC-CONNECTED state with the gNB and may receive the configuration message from the gNB during the RRC-CONNECTED state.

The process 390 may transmit (at block 394) the SL-PRS using the selected modified SL-PRS configurations. The process 390 may then end.

Figure 4:
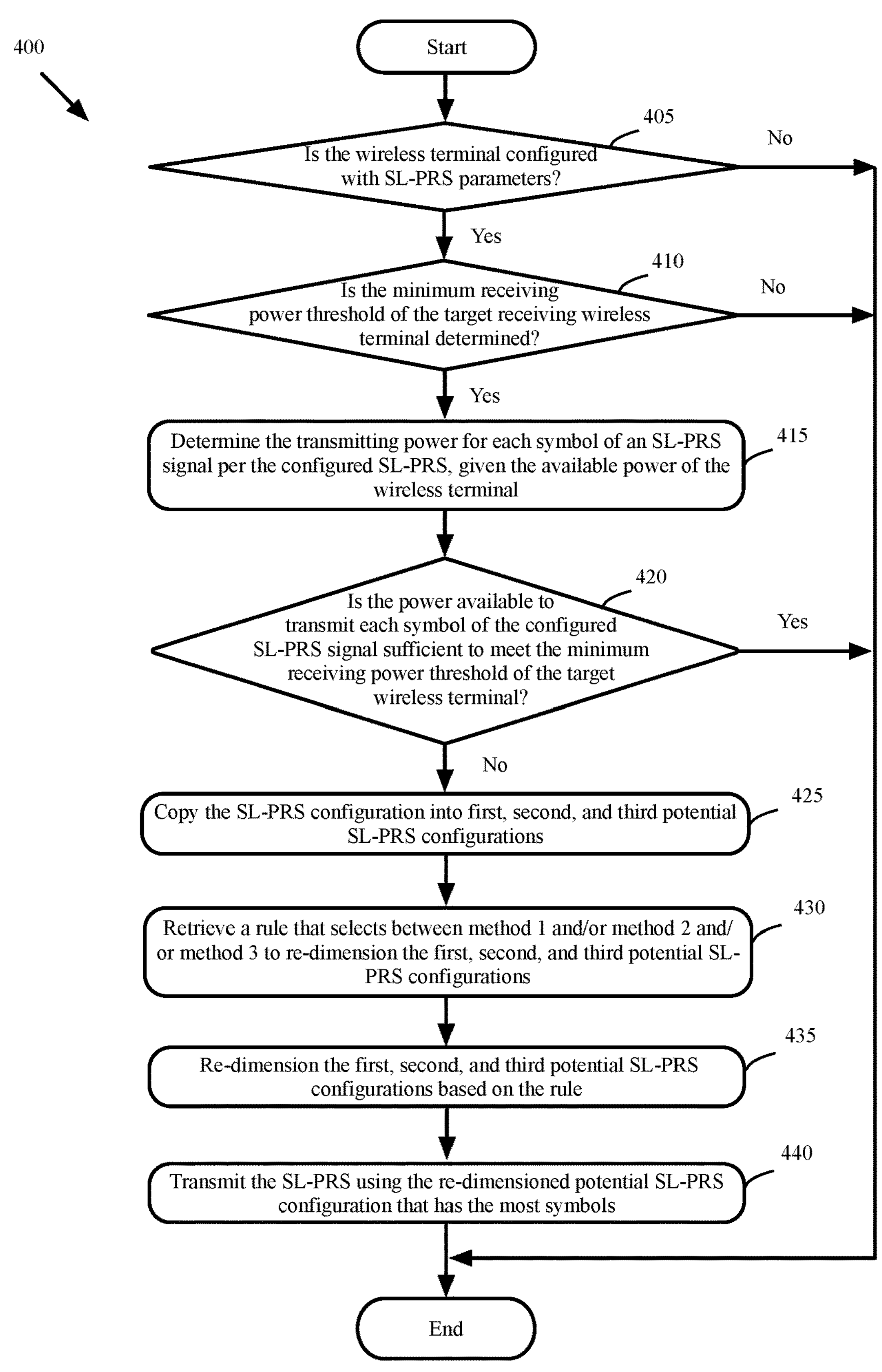
FIG. 4 is a flowchart illustrating an example of an alternative method/process performed by a transmitting wireless terminal to reduce the number of symbols for transmitting an SL-PRS, according to an example implementation of the present disclosure.

FIG. 4 is a flowchart illustrating an example of an alternative method/process 400 performed by a transmitting wireless terminal to reduce the number of symbols for transmitting an SL-PRS, according to an example implementation of the present disclosure. With reference to FIG. 4, the process 400 may be performed by at least one processor of any of the wireless terminals 101-104 of FIG. 1. The process 400 may be performed, for example and without limitations, in response to the wireless terminal being triggered to transmit an SL-PRS.

The process 400 may be similar to the process 300 described above, except that the process 400 may use any combination of the methods 1-3 based on a rule. At block 405, a determination may be made as to whether the wireless terminal is configured with SL-PRS parameters. As described above, the wireless terminal may be pre-configured at the manufacturing time and/or through wireless signals with one or more SL-PRS configurations that may include different parameters. The wireless terminal may be pre-configured with SL-PRS parameters that are dimensioned to the capabilities of the wireless terminal. However, the pre-configured SL-PRS parameters may need to change in order to meet the available power of the wireless terminal as the signal detection threshold of a receiving wireless terminal. When the wireless terminal is not configured with SL-PRS parameters, the process 400 may end.

Otherwise, a determination may be made (at block 410) as to whether the minimum receiving power threshold of the target/receiving wireless terminal is determined. For example, the minimum receiving power threshold of the target/receiving terminal may depend on the distance between the transmitting and receiving wireless terminals and the receiving wireless terminal's capabilities. When the minimum receiving power threshold of the target/receiving terminal is not determined, the process 400 may end.

Otherwise, the transmitting power for each symbol of an SL-PRS signal per the configured SL-PRS may be determined (at block 415), given the available power of the wireless terminal. For example, the transmitting power for each symbol of an SL-PRS signal per the configured SL-PRS may be determined based on the total power available for the transmission of the SL-PRS and the number of symbols required by the SL-PRS configuration.

A determination may be made (at block 420) as to whether the power available to transmit each symbol of the configured SL-PRS signal is sufficient to meet the minimum receiving power threshold of the target wireless terminal. If yes, the process 400 may end. For example, when the power available for the transmission of an SL-PRS (as pre-configured or configured by RRC) is sufficient to meet the detection requirements of a receiver that would receive the SL-PRS transmission, there may be no need to reduce the number of transmitted symbols using the process 400. It should be noted that the determination (at block 420) may be made based the power that would be allocated to a single symbol of the SL-PRS, where the available power allocation to a single symbol may be an equal fractional part of the available power. For example, if each symbol of the SL-PRS that is to be transmitted is allocated an equal part of the available transmission power, then the determination of insufficient transmission power may be made at the level of a single symbol, and not on the total power that would be required to transmit the SL-PRS.

When the power available to transmit each symbol of the configured SL-PRS signal is not sufficient to meet the minimum receiving power threshold of the target wireless terminal, the SL-PRS configuration may be copied (at block 425) into first, second, and third potential SL-PRS configurations. A rule may be retrieved (at block 430) that selects between method 1 and/or method 2 and/or method 3 to re-dimension the first, second, and third potential SL-PRS configurations. Methods 1, 2, and 3 may be applied, respectively, as described above with reference to blocks 340, 360, and 380 of the process 300 (FIGS. 3A-3B).

The rule may be pre-configured at the manufacturing time and/or through wireless signals. The rule, for example, may be based on the power available to the wireless terminal to transmit the SL-PRS, based on the value of the comb_size in the SL-PRS configuration, based on the value of the Num_Sym_Per_SL-PRS in the SL-PRS configuration, or based on the value of the Num_PRBs_Per_SL-PRS in the SL-PRS configuration.

The first, second, and third potential SL-PRS configurations may then be re-dimensioned (at block 435) based on the rule. The SL-PRS may be transmitted (at block 440) using the re-dimensioned potential SL-PRS configuration that has the most symbols. The process 400 may then end.

Figure 5A:
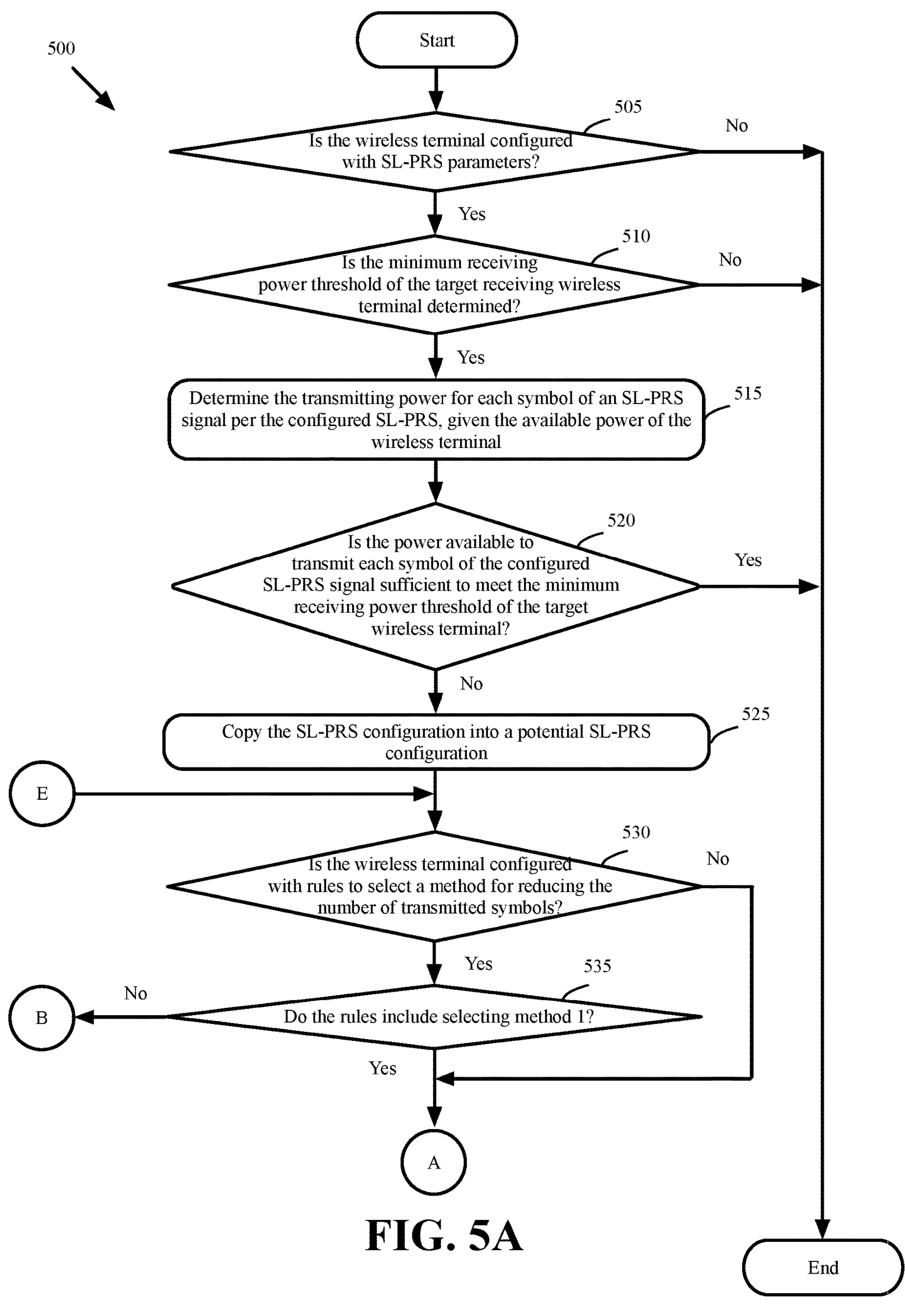
FIGS. 5A-5C illustrate a flowchart of an example of an alternative method/process performed by a transmitting wireless terminal to reduce the number of symbols for transmitting an SL-PRS, according to an example implementation of the present disclosure.
Figure 5B:
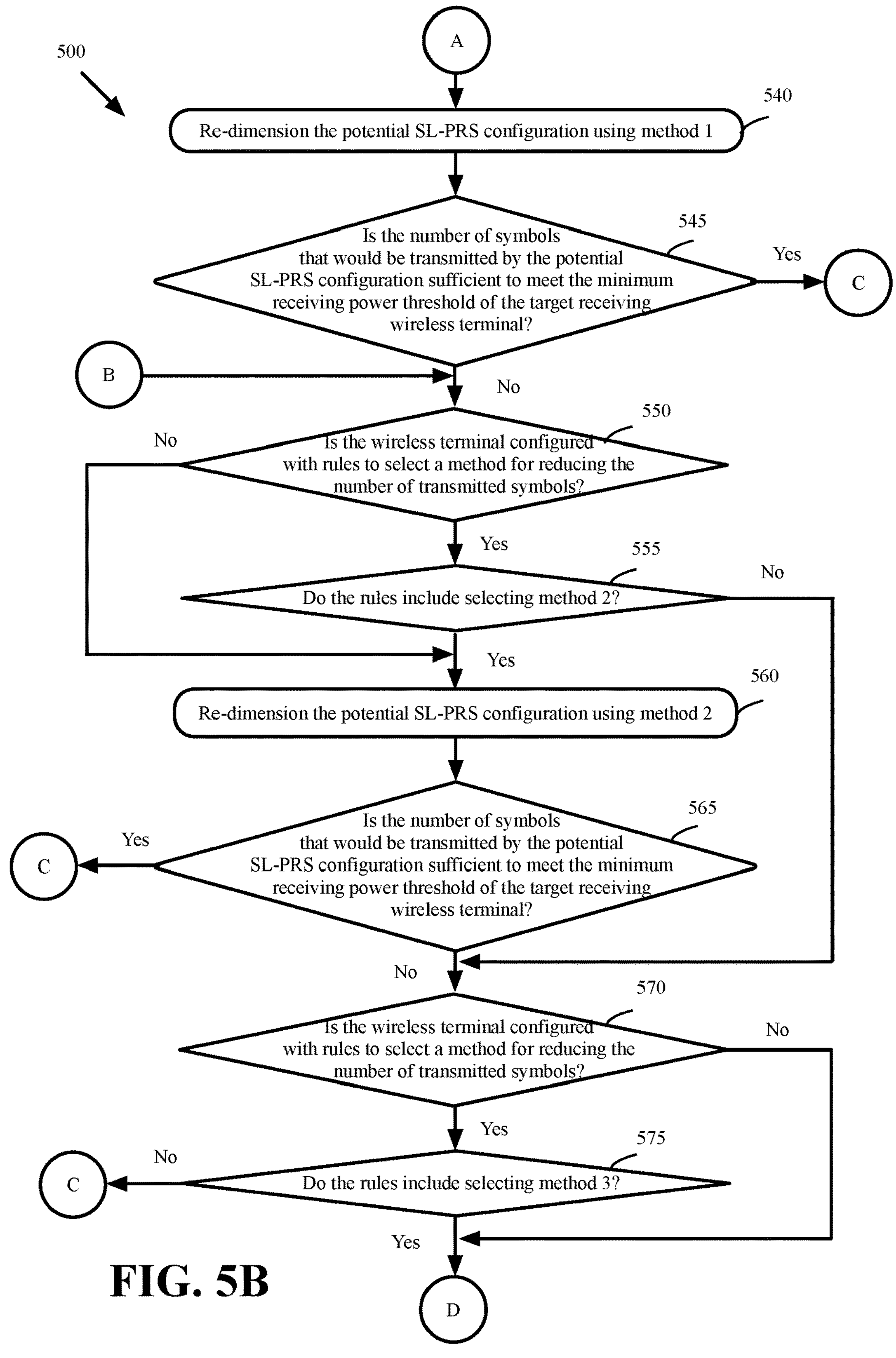
Figure 5C:
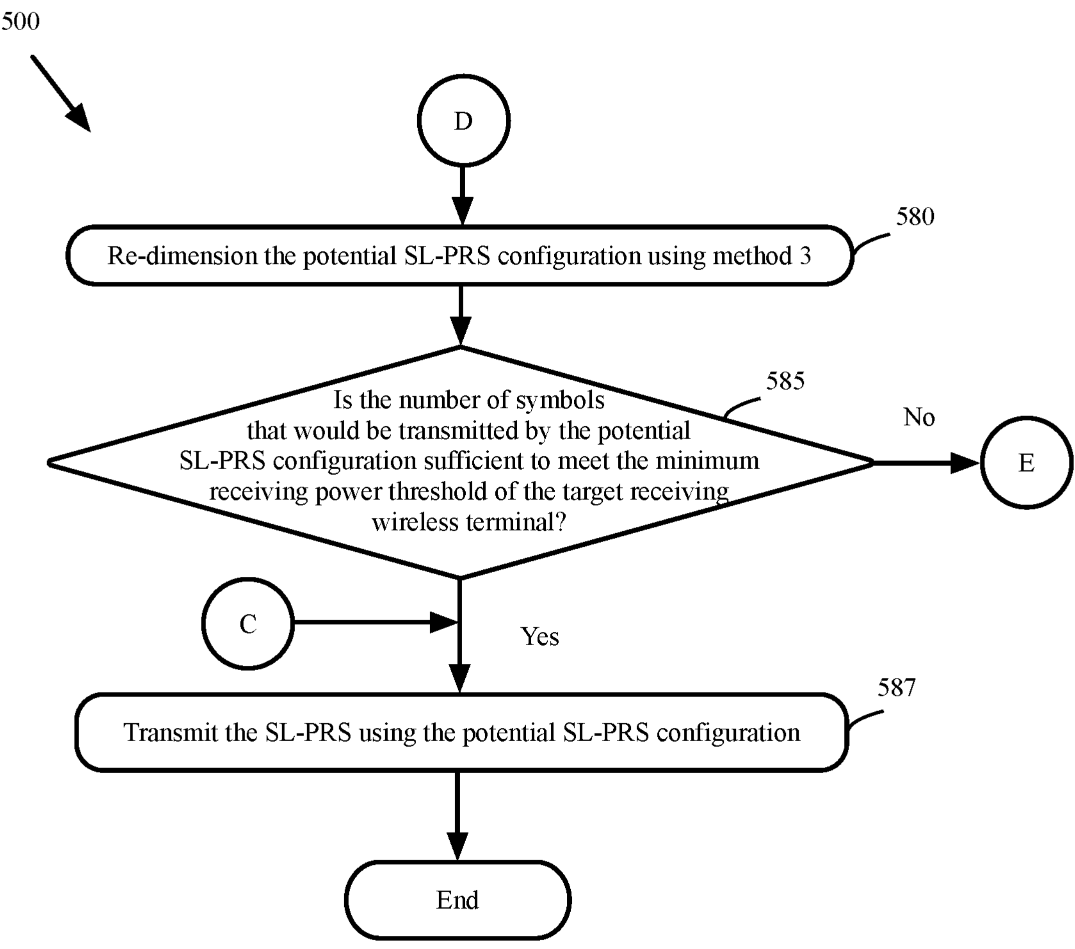

FIGS. 5A-5C illustrate a flowchart of an example of an alternative method/process 500 performed by a transmitting wireless terminal to reduce the number of symbols for transmitting an SL-PRS, according to an example implementation of the present disclosure. With reference to FIGS. 5A-5C, the process 500 may be performed by at least one processor of any of the wireless terminals 101-104 of FIG. 1. The process 500 may be performed, for example and without limitations, in response to the wireless terminal being triggered to transmit an SL-PRS.

At block 505, a determination may be made as to whether the wireless terminal is configured with SL-PRS parameters. As described above, the wireless terminal may be pre-configured at the manufacturing time and/or through wireless signals with one or more SL-PRS configurations that may include different parameters. When the wireless terminal is not configured with SL-PRS parameters, the process 500 may end.

Otherwise, a determination may be made (at block 510) as to whether the minimum receiving power threshold of the target/receiving wireless terminal is determined. For example, the minimum receiving power threshold of the target/receiving terminal may depend on the distance between the transmitting and receiving wireless terminals and the receiving wireless terminal's capabilities. When the minimum receiving power threshold of the target/receiving terminal is not determined, the process 500 may end.

Otherwise, the transmitting power for each symbol of an SL-PRS signal per the configured SL-PRS may be determined (at block 515), given the available power of the wireless terminal. For example, the transmitting power for each symbol of an SL-PRS signal per the configured SL-PRS may be determined based on the total power available for the transmission of the SL-PRS and the number of symbols required by the SL-PRS configuration.

A determination may be made (at block 520) as to whether the power available to transmit each symbol of the configured SL-PRS signal is sufficient to meet the minimum receiving power threshold of the target wireless terminal. If yes, the process 500 may end. For example, when the power available for the transmission of an SL-PRS (as pre-configured or configured by RRC) is sufficient to meet the detection requirements of a receiver that would receive the SL-PRS transmission, there may be no need to reduce the number of transmitted symbols using the process 500. It should be noted that the determination (at block 520) may be made based the power that would be allocated to a single symbol of the SL-PRS, where the available power allocation to a single symbol may be an equal fractional part of the available power. For example, if each symbol of the SL-PRS that is to be transmitted is allocated an equal part of the available transmission power, then the determination of insufficient transmission power may be made at the level of a single symbol, and not on the total power that would be required to transmit the SL-PRS.

When the power available to transmit each symbol of the configured SL-PRS signal is not sufficient to meet the minimum receiving power threshold of the target wireless terminal, the SL-PRS configuration may be copied (at block 525) into a potential SL-PRS configuration. A determination may be made (at block 530) as to whether the wireless terminal is configured with one or more rules to select a method for reducing the number of transmitted symbols. For example, a determination may be made as to whether rules are configured in the wireless terminal that select from the set of methods 1-3 to be used to determine an optimal reduction in the number of symbols that would be used by an SL-PRS transmission.

If the wireless terminal is not configured with the rules, the process 500 may proceed to block 540, which is described below. Otherwise, a determination may be made (at block 535) as to whether the rules include selecting method 1. If not, the process 500 may proceed to block 550, which is described below.

At block 540, the potential SL-PRS configuration may be re-dimensioned using method 1. For example, the potential SL-PRS configuration may be re-dimensioned by changing the comb-size to reduce the total number of symbols that would be transmitted as part of the SL-PRS, as described above with reference to method 1. Changing the comb-size may change density of subcarrier and symbols occupied by the transmitted SL-PRS.

The reduced number of symbols from method 1 may be allocated an equal fraction of the available power. The symbol's allocation of the fraction of power may be sufficient to meet the detection requirements of a receiver that would receive the symbols as part of the SL-PRS transmission. For example, if each symbol of the re-dimensioned SL-PRS configuration that is to be transmitted is allocated an equal part of the available transmission power, then the determination of sufficient transmission power may be made at the level of a single symbol, and not on the total power that would be required to transmit the SL-PRS.

A determination may be made (at block 545) as to whether the number of symbols that would be transmitted by the potential SL-PRS configuration is sufficient to meet the minimum receiving power threshold of the target/receiving wireless terminal. If yes, the process 500 may proceed to block 587, which is described below.

Otherwise, a determination may be made (at block 550) as to whether the wireless terminal is configured with one or more rules to select a method for reducing the number of transmitted symbols. For example, a determination may be made as to whether rules are configured in the wireless terminal that select from the set of methods 1-3 to be used to determine an optimal reduction in the number of symbols that would be used by an SL-PRS transmission.

If the wireless terminal is not configured with the rules, the process 500 may proceed to block 560, which is described below. Otherwise, a determination may be made (at block 555) as to whether the rules include selecting method 2. If not, the process 500 may proceed to block 570, which is described below.

At block 560, the potential SL-PRS configuration may be re-dimensioned using method 2. For example, the potential SL-PRS configuration may be re-dimensioned by reducing the number of symbols transmitted by the SL-PRS (e.g., the parameter Num_Sym_Per_SL-PRS) to reduce the total number of symbols that would be transmitted as part of the SL-PRS, as described above with reference to method 2.

The reduced number of symbols from method 2 may be allocated an equal fraction of the available power. The symbol's allocation of the fraction of power may be sufficient to meet the detection requirements of a receiver that would receive the symbols as part of the SL-PRS transmission. For example, if each symbol of the re-dimensioned SL-PRS configuration that is to be transmitted is allocated an equal part of the available transmission power, then the determination of sufficient transmission power may be made at the level of a single symbol, and not on the total power that would be required to transmit the SL-PRS.

A determination may be made (at block 565) as to whether the number of symbols that would be transmitted by the potential SL-PRS configuration is sufficient to meet the minimum receiving power threshold of the target/receiving wireless terminal. If yes, 500 may proceed to block 587, which is described below.

Otherwise, a determination may be made (at block 570) as to whether the wireless terminal is configured with one or more rules to select a method for reducing the number of transmitted symbols. For example, a determination may be made as to whether rules are configured in the wireless terminal that select from the set of methods 1-3 to be used to determine an optimal reduction in the number of symbols that would be used by an SL-PRS transmission.

If the wireless terminal is not configured with the rules, the process 500 may proceed to block 580, which is described below. Otherwise, a determination may be made (at block 575) as to whether the rules include selecting method 3. If not, the process 500 may proceed to block 590, which is described below.

At block 580, the potential SL-PRS configuration may be re-dimensioned using method 3. For example, the potential SL-PRS configuration may be re-dimensioned by reducing the number of PRBs per SL-PRS (e.g., the parameter Num_PRBs_Per_SL-PRS) to reduce the total number of symbols that would be transmitted as part of the SL-PRS, as described above with reference to method 3.

The reduced number of symbols from method 3 may be allocated an equal fraction of the available power. The symbol's allocation of the fraction of power may be sufficient to meet the detection requirements of a receiver that would receive the symbols as part of the SL-PRS transmission. For example, if each symbol of the re-dimensioned SL-PRS configuration that is to be transmitted is allocated an equal part of the available transmission power, then the determination of sufficient transmission power may be made at the level of a single symbol, and not on the total power that would be required to transmit the SL-PRS.

A determination may be made (at block 585) as to whether the number of symbols that would be transmitted by the potential SL-PRS configuration is sufficient to meet the minimum receiving power threshold of the target/receiving wireless terminal. If not, the process 500 may proceed back to block 530 to continue re-dimensioning using methods 1-3. Otherwise, the SL-PRS may be transmitted (at block 590) using the potential SL-PRS configuration. The process 500 may then end.

Figure 5D:
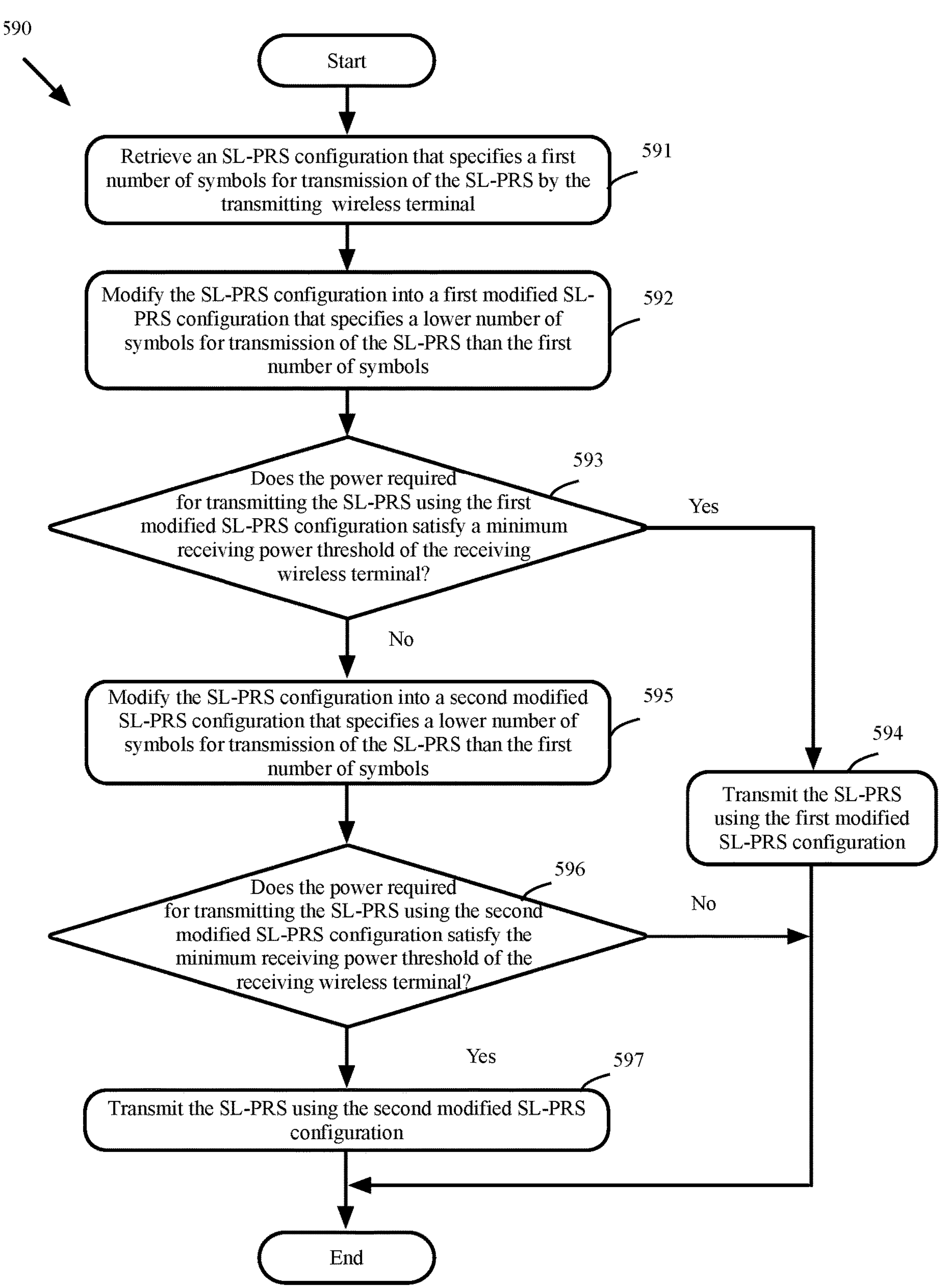
FIG. 5D is a flowchart illustrating an example method/process performed by a transmitting wireless terminal implementing the process of FIGS. 4A-4C, according to an example implementation of the present disclosure.

FIG. 5D is a flowchart illustrating an example method/process 590 performed by a transmitting wireless terminal implementing the process of FIGS. 4A-4C, according to an example implementation of the present disclosure. With reference to FIG. 5D, the process 590 may be performed by at least one processor of any of the wireless terminals 101-104 of FIG. 1. The process 590 may be performed, for example and without limitations, in response to the wireless terminal being triggered to transmit an SL-PRS.

As shown in FIG. 3D, the process 590 may retrieve (at block 591) an SL-PRS configuration that specifies a first number of symbols for transmission of the SL-PRS by the transmitting wireless terminal. The wireless terminal may be pre-configured at the manufacturing time with one or more SL-PRS configurations that may include different parameters. For example, the SL-PRS configuration may be stored in the one or more non-transitory computer-readable media of the wireless terminal when the transmitting wireless terminal was manufactured.

In addition to, or in lieu of, being pre-configured at the manufacturing time, the wireless terminal may be pre-configured through wireless signals (e.g., received from the network). For example, in some implementations, the wireless terminal may receive the SL-PRS configuration from the network (e.g., via RRC signaling, via broadcast, etc.).

The wireless terminal may be pre-configured with SL-PRS parameters, such as the number of transmitted symbols, that are dimensioned to the capabilities of the wireless terminal. However, the pre-configured SL-PRS parameters may need to be changed in order to meet the available power of the transmitting wireless terminal as well as the signal detection threshold of a receiving wireless terminal.

The process 590 may modify (at block 592) the SL-PRS configuration into a first modified SL-PRS configuration that specifies a lower number of symbols for transmission of the SL-PRS than the first number of symbols. For example, the SL-PRS configuration may be modified into the first modified SL-PRS configuration by reducing the density of subcarrier and symbols occupied by each transmitted SL-PRS, by reducing the number of symbols that carry the SL-PRS, or by reducing a number of PRBs allocated to the SL-PRS.

The process 590 may make a determination (at block 593) as to whether the power required for transmitting the SL-PRS using the first modified SL-PRS configuration satisfies a minimum receiving power threshold of the receiving wireless terminal. When the power required for transmitting the SL-PRS using the first modified SL-PRS configuration satisfies the minimum receiving power threshold of the receiving wireless terminal, the process 590 may transmit (at block 594) the SL-PRS using the first modified SL-PRS configuration. The power required for transmitting the SL-PRS using the first modified SL-PRS configurations may not exceed the available power of the transmitting wireless terminal. The process 590 may then end.

Otherwise, when the power required for transmitting the SL-PRS using the first modified SL-PRS configuration does not satisfy the minimum receiving power threshold of the receiving wireless terminal the process 590 may modify (at block 595) the SL-PRS configuration into a second modified SL-PRS configuration that specifies a lower number of symbols for transmission of the SL-PRS than the first number of symbols. For example, the SL-PRS configuration may be modified into the second modified SL-PRS configuration by reducing the density of subcarrier and symbols occupied by each transmitted SL-PRS, by reducing the number of symbols that carry the SL-PRS, or by reducing the number of PRBs allocated to the SL-PRS.

The process 590 may make a determination (at block 596) as to whether the power required for transmitting the SL- PRS using the second modified SL-PRS configuration satisfies a minimum receiving power threshold of the receiving wireless terminal. When the power required for transmitting the SL-PRS using the second modified SL-PRS configuration does not satisfy the minimum receiving power threshold of the receiving wireless terminal, the process 590 may end. Otherwise, the process 590 may transmit (at block 597) the SL-PRS using the first modified SL-PRS configuration. The power required for transmitting the SL-PRS using the second modified SL-PRS configurations may not exceed the available power of the transmitting wireless terminal. The process 590 may then end.

In some implementations, the process 590 may modify the SL-PRS configuration into a third modified SL-PRS configuration (e.g., after a determination is made at block 596 that the power required for transmitting the SL-PRS using the second modified SL-PRS configuration does not satisfy the minimum receiving power threshold of the receiving wireless terminal). For example, the SL-PRS configuration may be modified into the first modified SL-PRS configuration by reducing the density of subcarrier and symbols occupied by each transmitted SL-PRS, by reducing the number of symbols that carry the SL-PRS, or by reducing a number of PRBs allocated to the SL-PRS.

The third modified SL-PRS configuration may specify a lower number of symbols for transmission of the SL-PRS than the first number of symbols, and the power required for transmitting the SL-PRS using the third modified SL-PRS configuration may not exceed the available power of the transmitting wireless terminal. The process 590 may transmit the SL-PRS using the third modified SL-PRS configuration when the power required for transmitting the SL-PRS using the third modified SL-PRS configuration satisfies the minimum receiving power threshold of the receiving wireless terminal.

Figure 6:
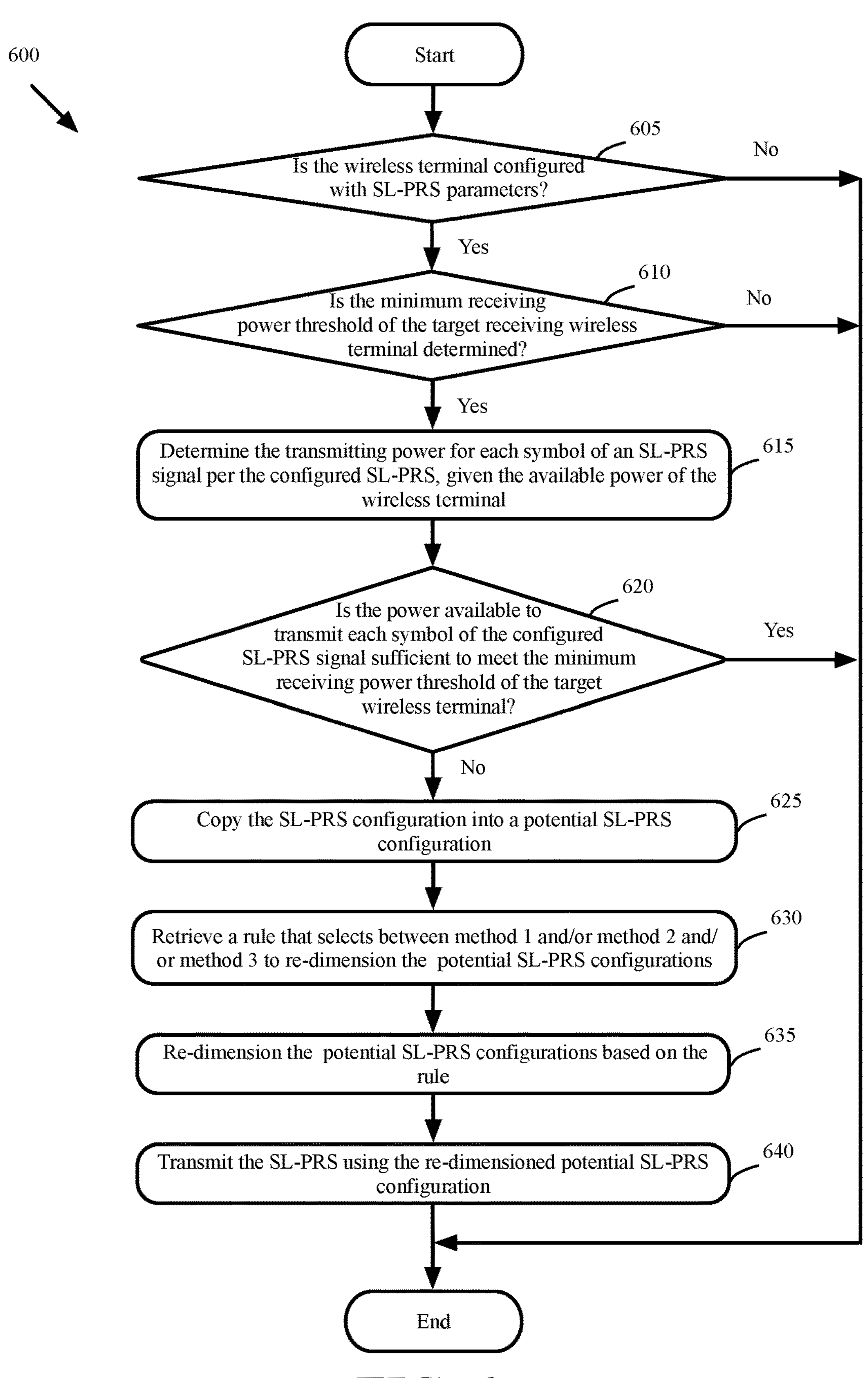
FIG. 6 is a flowchart illustrating an example of an alternative method/process performed by a transmitting wireless terminal to reduce the number of symbols for transmitting an SL-PRS, according to an example implementation of the present disclosure.

FIG. 6 is a flowchart illustrating an example of an alternative method/process 600 performed by a transmitting wireless terminal to reduce the number of symbols for transmitting an SL-PRS, according to an example implementation of the present disclosure. With reference to FIG. 6, the process 600 may be performed by at least one processor of any of the wireless terminals 101-104 of FIG. 1. The process 600 may be performed, for example and without limitations, in response to the wireless terminal being triggered to transmit an SL-PRS.

The process 600 may be similar to the process 500 described above, except that the process 600 may use any combination of the methods 1-3 based on a rule. At block 605, a determination may be made as to whether the wireless terminal is configured with SL-PRS parameters. As described above, the wireless terminal may be pre-configured at the manufacturing time and/or through wireless signals with one or more SL-PRS configurations that may include different parameters. When the wireless terminal is not configured with SL-PRS parameters, the process 600 may end.

Otherwise, a determination may be made (at block 610) as to whether the minimum receiving power threshold of the target/receiving wireless terminal is determined. For example, the minimum receiving power threshold of the target/receiving terminal may depend on the distance between the transmitting and receiving wireless terminals and the receiving wireless terminal's capabilities. When the minimum receiving power threshold of the target/receiving terminal is not determined, the process 600 may end.

Otherwise, the transmitting power for each symbol of an SL-PRS signal per the configured SL-PRS may be determined (at block 615), given the available power of the wireless terminal. For example, the transmitting power for each symbol of an SL-PRS signal per the configured SL-PRS may be determined based on the total power available for the transmission of the SL-PRS and the number of symbols required by the SL-PRS configuration.

A determination may be made (at block 620) as to whether the power available to transmit each symbol of the configured SL-PRS signal is sufficient to meet the minimum receiving power threshold of the target wireless terminal. If yes, the process 600 may end. For example, when the power available for the transmission of an SL-PRS (as pre-configured or configured by RRC) is sufficient to meet the detection requirements of a receiver that would receive the SL-PRS transmission, there may be no need to reduce the number of transmitted symbols using the process 600. It should be noted that the determination (at block 620) may be made based the power that would be allocated to a single symbol of the SL-PRS, where the available power allocation to a single symbol may be an equal fractional part of the available power. For example, if each symbol of the SL-PRS that is to be transmitted is allocated an equal part of the available transmission power, then the determination of insufficient transmission power may be made at the level of a single symbol, and not on the total power that would be required to transmit the SL-PRS.

When the power available to transmit each symbol of the configured SL-PRS signal is not sufficient to meet the minimum receiving power threshold of the target wireless terminal, the SL-PRS configuration may be copied (at block 625) into a potential SL-PRS configuration. A rule may be retrieved (at block 630) that selects between method 1 and/or method 2 and/or method 3 to re-dimension the first, second, and third potential SL-PRS configurations. Methods 1, 2, and 3 may be applied, respectively, as described above with reference to blocks 540, 560, and 580 of the process 500 (FIGS. 5A-5C).

The rule may be pre-configured at the manufacturing time and/or through wireless signals. The rule, for example, may be based on the power available to the wireless terminal to transmit the SL-PRS, based on the value of the comb_size in the SL-PRS configuration, based on the value of the Num_Sym_Per_SL-PRS in the SL-PRS configuration, or based on the value of the Num_PRBs_Per_SL-PRS in the SL-PRS configuration.

The potential SL-PRS configuration may then be re-dimensioned (at block 635) based on the rule. The SL-PRS may be transmitted (at block 640) using the re-dimensioned potential SL-PRS configuration. The process 600 may then end.

Rules Configuration Command

The commands (herein also referred to as Rules Configuration commands), may be transmitted by a BS (e.g., a gNB) or other authorized transmission devices in one or more of multiple signaling methods. Such multiple signaling methods may include system information broadcast and dedicated signaling.

Figure 7:
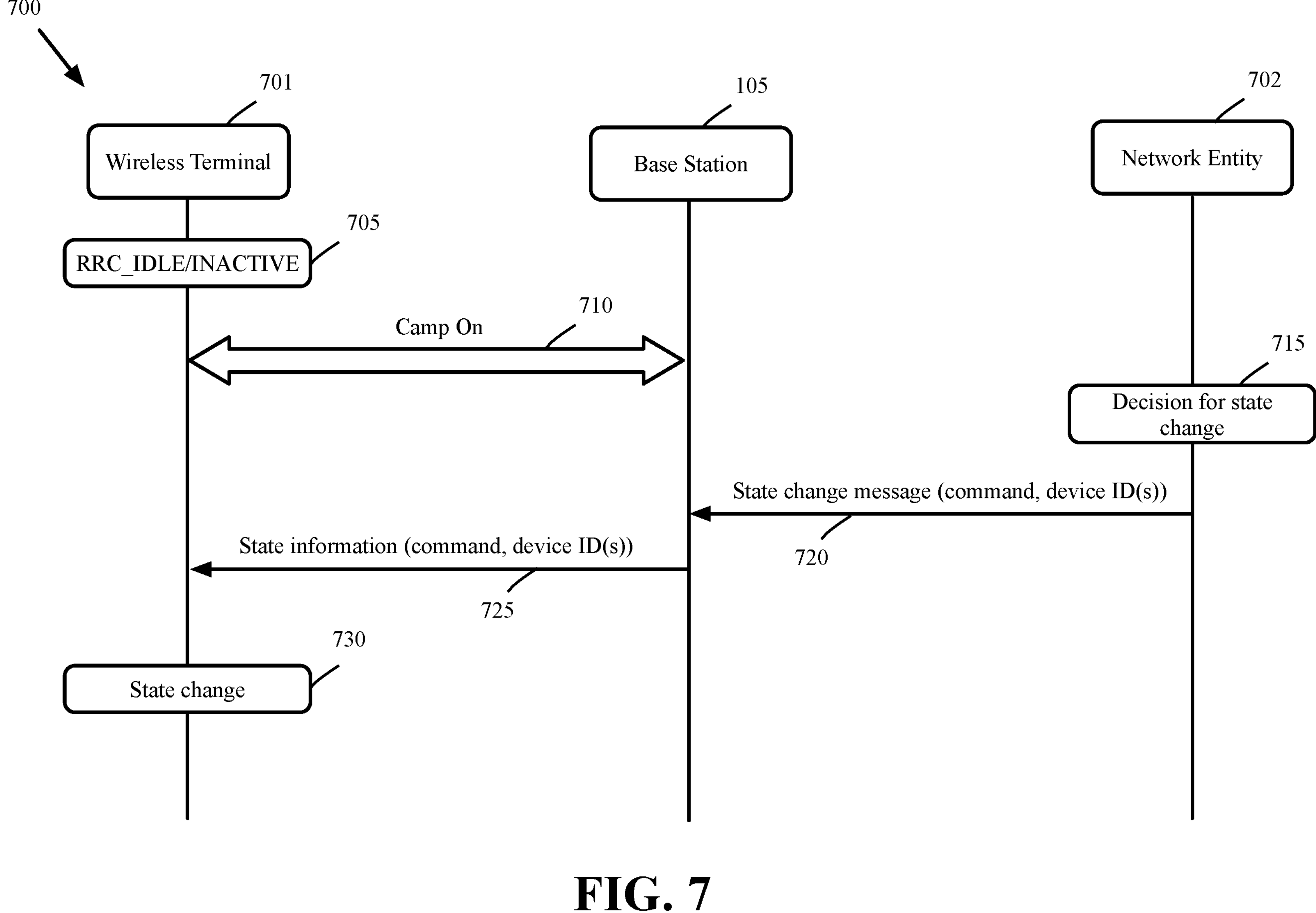
FIG. 7 is a sequence diagram illustrating an example message flow for a wireless terminal to receive a Rules Configuration command by system information broadcast, according to an example implementation of the present disclosure.

FIG. 7 is a sequence diagram 700 illustrating an example message flow for a wireless terminal to receive a Rules Configuration command by system information broadcast, according to an example implementation of the present disclosure. With reference to FIG. 7, the wireless terminal 701 may be one of the energy harvesting wireless terminals 102 or 104 of FIG. 1. In the example of FIG. 7, a network entity 702 may make a decision to send a Rules Configuration to the wireless terminal 710.

In one configuration, the network entity 702 may be a network node such as a server or a node in a core network, such as an Access and Mobility Management Function (AMF). In another configuration, the network entity 702 may be a server resident in a private/public network. The BS 0105 may be similar to the BS 105 of FIG. 1. The BS 105, in some implementation, may be a gNB.

At block 705, the wireless terminal 701 may be in RRC_IDLE or RRC_INACTIVE state. As shown in step 710, the wireless terminal 701 may be camping on a cell served by the BS 105. At block 715, the network entity may decide to change the Rules Configuration of the wireless terminal 701. In step 720, the network entity 702 may then send the Rules Configuration message. The message, for example, may be a state change message that may include one or more rules (e.g., use method 1 and method 3). Each rule may be associated with one or more device IDs.

Additionally, or alternatively, the Rules Configuration message may include one or more device group IDs, each of the device group IDs may identify a group of devices. In step 725, the BS 105 may broadcast the contents of the Rules Configuration Message in system information, such as one or more SIBs. In block 730, the wireless terminal 701 may receive the system information broadcast and check if the device ID of the wireless terminal 701 is included. If so, the wireless terminal 701 may change state (at block 730) by executing the command to change the Rules Configuration as instructed by the received associated with the device ID of the wireless terminal 701.

Figure 8:
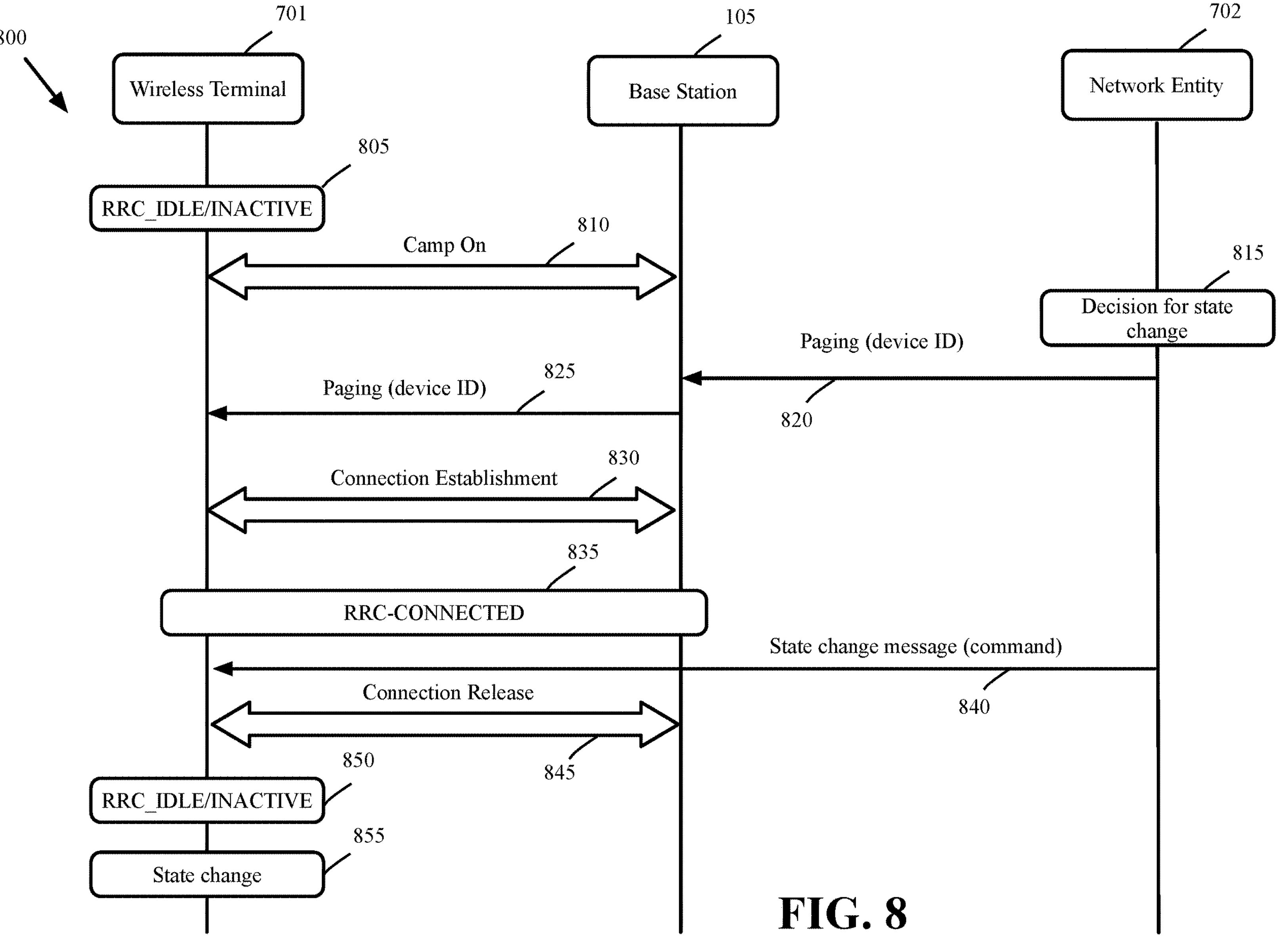
FIG. 8 is a sequence diagram illustrating an example message flow where the Rules Configuration command is delivered to the wireless terminal via a dedicated signaling, according to an example implementation of the present disclosure.

FIG. 8 is a sequence diagram 800 illustrating an example message flow where the Rules Configuration command is delivered to the wireless terminal via a dedicated signaling, according to an example implementation of the present disclosure. With reference to FIG. 8, the wireless terminal 701, the network entity 702, and the BS 105 may be similar to the corresponding devices of FIG. 7.

At block 805, the wireless terminal 701 may be in RRC_IDLE or RRC_INACTIVE state. As shown in step 810, the wireless terminal 701 may be camping on a cell served by the BS 105. At block 815, the network entity may decide to change the Rules Configuration of the wireless terminal 701. In step 820, the network entity may send a paging message including the device ID of the wireless terminal 701. The paging message may be forwarded by the BS 105 to the wireless terminal 701 in step 825. Upon receiving the paging message in step 825, the wireless terminal 701 may initiate the connection establishment, as shown in step 830, to establish an RRC connection.

Once the procedure of the connection establishment is completed, the wireless terminal 701 and the BS 105 may enter RRC_CONNECTED state, as shown in step 835. During the RRC_CONNECTED state, the network entity 702 may send the Rules Configuration message to the wireless terminal 701 as shown in step 840. For step 840, a Non-Access Stratum (NAS) message may be used. Additionally, or alternatively, a user plane message (e.g., IP packets) may be used for step 840. In step 845, the BS 105 may initiate a connection release procedure to instruct the wireless terminal 701 to enter RRC_IDLE or RRC_INACTIVE state (as shown in block 850). In block 855, the terminal 701 change state by executing the Rules Configuration command received in step 840.

Figure 9:
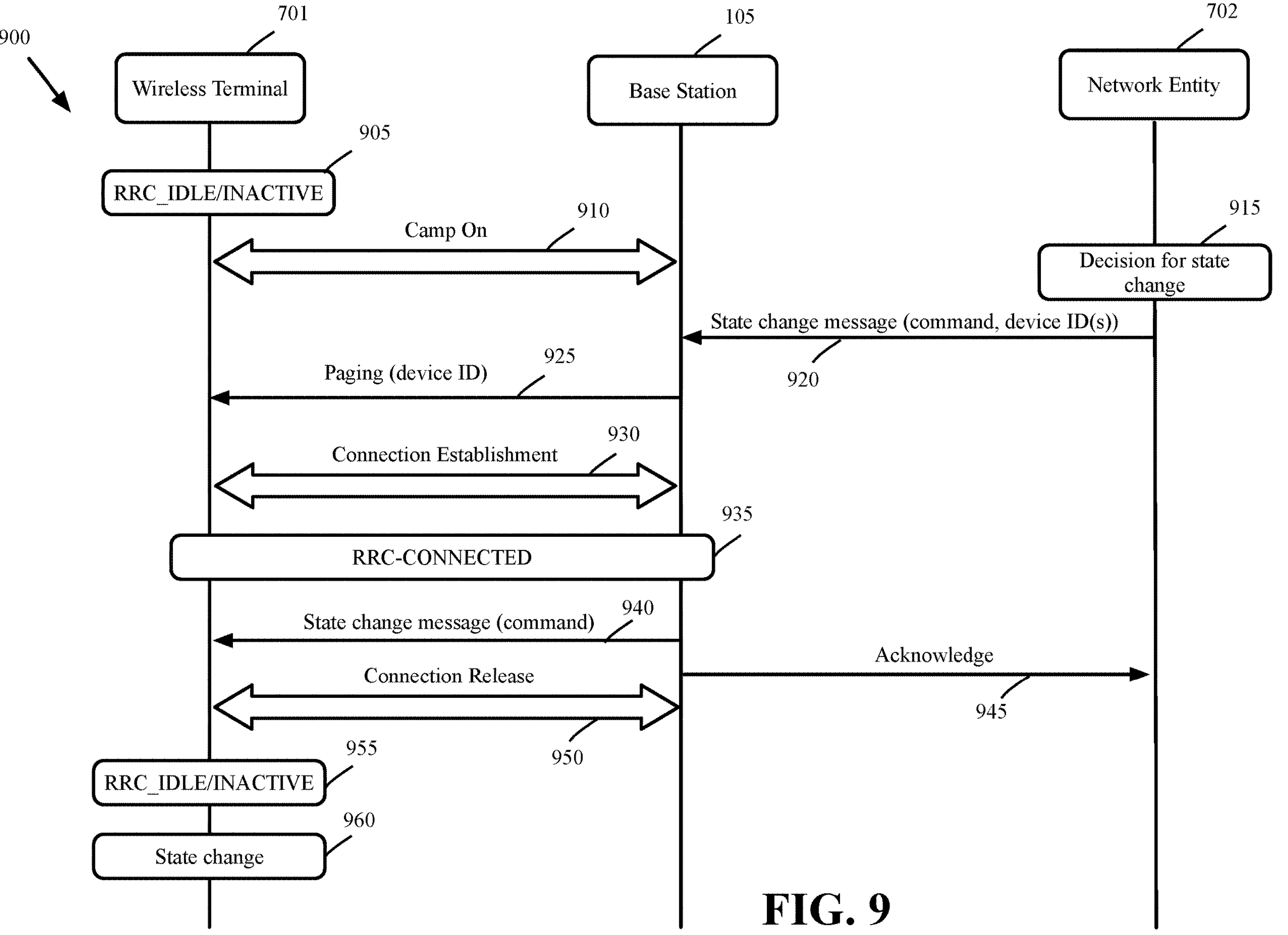
FIG. 9 is a sequence diagram illustrating another example message flow where the Rules Configuration command is delivered to the wireless terminal via a dedicated signaling, according to an example implementation of the present disclosure.

FIG. 9 is a sequence diagram 900 illustrating another example message flow where the Rules Configuration command is delivered to the wireless terminal via a dedicated signaling, according to an example implementation of the present disclosure. With reference to FIG. 8, the wireless terminal 701, the network entity 702, and the BS 105 may be similar to the corresponding devices of FIGS. 7 and 8.

At block 905, the wireless terminal 701 may be in RRC_IDLE or RRC_INACTIVE state. As shown in step 910, the wireless terminal 701 may be camping on a cell served by the BS 105. At block 915, the network entity may decide to change the Rules Configuration of the wireless terminal 701. In step 920, the network entity may send a Rules Configuration message including the Rules Configuration command and the device ID of the wireless terminal. In this case, the Rules Configuration message may be sent and terminated in the BS 105, instructing the BS 105 to setup an RRC connection to the wireless terminal 701 and send the Rules Configuration command in RRC signaling.

In step 925, the BS 105 may send a paging message with the device ID of the wireless terminal 701. Upon receiving the paging message in step 925, the wireless terminal 701 may initiate the connection establishment, as shown in step 930, to establish an RRC connection. Once the procedure of the connection establishment is completed, the wireless terminal 701 and the BS 105 may enter RRC_CONNECTED state, as shown in step 935.

As shown in step 940, during the RRC_CONNECTED state, the BS 105 may send the Rules Configuration message to the wireless terminal 701, as instructed by the network entity 702 in step 920. For step 940, an RRC message, such as RRCReconfiguration message may be used. In the case that the RRCReconfiguration message is used in another step, RRCReconfigurationComplete message may be used. The BS 105 may send another acknowledge to the network entity, in step 950, to inform the network entity of the successful delivery of the Rules Configuration command.

In step 950, the BS 105 may initiate a connection release procedure to instruct the wireless terminal 701 to enter RRC_IDLE or RRC_INACTIVE state (as shown in block 955). In block 960, the terminal 701 change state by executing the Rules Configuration command received in step 940.

NR-DL-PRS-PDC-Info

The NR-DL-PRS-PDC-Info Information Element (IE) that defines downlink PRS configuration for PDC is described below in Tables 3 and 4.

TABLE 3

NR-DL-PRS-PDC-Info Information Element

```
-- ASN1START
-- TAG-NR-DL-PRS-PDC-INFO-START
NR-DL-PRS-PDC-Info-r17 ::= SEQUENCE {
 nr-DL-PRS-PDC-ResourceSet-r17          NR-DL-PRS-PDC-ResourceSet-r17        OPTIONAL, -- Need R
 nr-DL-PRS-PDC-ResourceRules-r18 ::= SEQUENCE {
             rule-r18           ENUMERATED {null,Method1, Method2, Method3, Method1-2, Method1-3,
Method2-3, Method1-2-3},
     }
     ...
}
```

TABLE 3-continued

NR-DL-PRS-PDC-Info Information Element

```
NR-DL-PRS-PDC-ResourceSet-r17 ::= SEQUENCE {
  periodicityAndOffset-r17          NR-DL-PRS-Periodicity-and-ResourceSetSlotOffset-r17,
  numSymbols-r17          ENUMERATED {n2, n4, n6, n12, spare4, spare3, spare2, spare1},
  dl-PRS-ResourceBandwidth-r17          INTEGER (1..63),
  dl-PRS-StartPRB-r17          INTEGER (0..2176),
  resourceList-r17          SEQUENCE (SIZE (1..maxNrofPRS-ResourcesPerSet-r17)) OF NR-
DL-PRS-Resource-r17,
  repFactorAndTimeGap-r17          RepFactorAndTimeGap-r17          OPTIONAL, --
Need S
  ...
}
NR-DL-PRS-Periodicity-and-ResourceSetSlotOffset-r17 ::= CHOICE {
  scs15-r17          CHOICE {
          n4-r17          INTEGER (0..3),
          n5-r17          INTEGER (0..4),
          n8-r17          INTEGER (0..7),
          n10-r17          INTEGER (0..9),
          n16-r17          INTEGER (0..15),
          n20-r17          INTEGER (0..19),
          n32-r17          INTEGER (0..31),
          n40-r17          INTEGER (0..39),
          n64-r17          INTEGER (0..63),
          n80-r17          INTEGER (0..79),
          n160-r17          INTEGER (0..159),
          n320-r17          INTEGER (0..319),
          n640-r17          INTEGER (0..639),
          n1280-r17          INTEGER (0..1279),
          n2560-r17          INTEGER (0..2559),
          n5120-r17          INTEGER (0..5119),
          n10240-r17          INTEGER (0..10239),
          ...
  },
  scs30-r17          CHOICE {
          n8-r17          INTEGER (0..7),
          n10-r17          INTEGER (0..9),
          n16-r17          INTEGER (0..15),
          n20-r17          INTEGER (0..19),
          n32-r17          INTEGER (0..31),
          n40-r17          INTEGER (0..39),
          n64-r17          INTEGER (0..63),
          n80-r17          INTEGER (0..79),
          n128-r17          INTEGER (0..127),
          n160-r17          INTEGER (0..159),
          n320-r17          INTEGER (0..319),
          n640-r17          INTEGER (0..639),
          n1280-r17          INTEGER (0..1279),
          n2560-r17          INTEGER (0..2559),
          n5120-r17          INTEGER (0..5119),
          n10240-r17          INTEGER (0..10239),
          n20480-r17          INTEGER (0..20479),
          ...
  },
  scs60-r17          CHOICE {
          n16-r17          INTEGER (0..15),
          n20-r17          INTEGER (0..19),
          n32-r17          INTEGER (0..31),
          n40-r17          INTEGER (0..39),
          n64-r17          INTEGER (0..63),
          n80-r17          INTEGER (0..79),
          n128-r17          INTEGER (0..127),
          n160-r17          INTEGER (0..159),
          n256-r17          INTEGER (0..255),
          n320-r17          INTEGER (0..319),
          n640-r17          INTEGER (0..639),
          n1280-r17          INTEGER (0..1279),
          n2560-r17          INTEGER (0..2559),
          n5120-r17          INTEGER (0..5119),
          n10240-r17          INTEGER (0..10239),
          n20480-r17          INTEGER (0..20479),
          n40960-r17          INTEGER (0..40959),
          ...
  },
  scs120-r17          CHOICE {
          n32-r17          INTEGER (0..31),
          n40-r17          INTEGER (0..39),
          n64-r17          INTEGER (0..63),
          n80-r17          INTEGER (0..79),
          n128-r17          INTEGER (0..127),
```

TABLE 3-continued

NR-DL-PRS-PDC-Info Information Element

```
                n160-r17                INTEGER (0..159),
                n256-r17                INTEGER (0..255),
                n320-r17                INTEGER (0..319),
                n512-r17                INTEGER (0..511),
                n640-r17                INTEGER (0..639),
                n1280-r17               INTEGER (0..1279),
                n2560-r17               INTEGER (0..2559),
                n5120-r17               INTEGER (0..5119),
                n10240-r17              INTEGER (0..10239),
                n20480-r17              INTEGER (0..20479),
                n40960-r17              INTEGER (0..40959),
                n81920-r17              NTEGER (0..81919),
                ...
  },
  ...
}
NR-DL-PRS-Resource-r17 ::= SEQUENCE {
  nr-DL-PRS-ResourceID-r17                          NR-DL-PRS-ResourceID-r17,
  dl-PRS-SequenceID-r17                 INTEGER (0..4095),
  dl-PRS-CombSizeN-AndReOffset-r17   CHOICE {
    n2-r17                          INTEGER (0..1),
    n4-r17                          INTEGER (0..3),
    n6-r17                          INTEGER (0..5),
    n12-r17                         INTEGER (0..11),
    ...
  },
  dl-PRS-ResourceSlotOffset-r17                     INTEGER (0..maxNrofPRS-ResourceOffsetValue-1-r17),
  dl-PRS-ResourceSymbolOffset-r17                     INTEGER (0..12),
  dl-PRS-QCL-Info-r17                 DL-PRS-QCL-Info-r17                OPTIONAL, -- Need
N
  ...
}
DL-PRS-QCL-Info-r17 ::= CHOICE {
  ssb-r17                     SEQUENCE {
   ssb-Index-r17                    INTEGER (0..63),
   rs-Type-r17                      ENUMERATED {typeC, typeD, typeC-plus-typeD},
   ...
  },
  dl-PRS-r17                  SEQUENCE {
   qcl-DL-PRS-ResourceID-r17                        NR-DL-PRS-ResourceID-r17,
   ...
  },
  ...
}
NR-DL-PRS-ResourceID-r17 ::= INTEGER (0..maxNrofPRS-ResourcesPerSet-1-r17)
RepFactorAndTimeGap-r17 ::= SEQUENCE {
  repetitionFactor-r17              ENUMERATED {n2, n4, n6, n8, n16, n32, spare2, spare1},
  timeGap-r17                     ENUMERATED {s1, s2, s4, s8, s16, s32, spare2, spare1}
}
-- TAG-NR-DL-PRS-PDC-INFO-STOP
-- ASN1STOP
```

TABLE 4

| NR-DL-PRS-PDC-ResourceRules |
|---|
| A rule from a set of rules used to determine which of the methods to use to reduce the number of symbols of an SL-PRS configuration. Where the enumerated values of { null, method1, method2, method3, method1-2, method1-3, method2-3, method1-2-3} represent respectively: No method is used, the first method is used, the second method is used, the third method is used, the first and second method is used, and so on. |

Using Several SL-PRS Configurations

One possible method to address the issue describe above (where the power available for the transmission of an initial (or default) configured SL-PRS may not be sufficient to provide P_Txsym greater than or equal to P_RX_MIN) is to increase the transmission diversity of the SL-PRS signal by selecting an alternate (e.g., different) SL-PRS configuration that is more advantageous for the reception of the SL-PRS signal given the available transmission power.

For example, if it is determined that the available power that would be used by an initial SL-PRS configuration for the transmission of an SL-PRS signal is insufficient to transmit the SL-PRS signal at the device's maximum output level, then a first alternate SL-PRS configuration may be selected from a set of SL-PRS configurations. The selected configuration may be optimal with respect to the number of symbols that would be transmitted in both time and frequency where the available power for transmitting the SL-PRS signal is such that each symbol is transmitted at an optimum output power given the available power of the device that is less than, for example, the maximum output but more then, for example, 90% of the maximum output.

A second alternate SL-PRS configuration may be selected from a set of SL-PRS configurations that is optimal with respect to the number of symbols that would be transmitted in both time and frequency where the available power for transmitting the SL-PRS signal is such that each symbol is transmitted at an optimum output power given the available power of the device that is less than, for example, 90% maximum output but more than, for example, 80% of the maximum output. Similarly, a third alternate configuration, etc., may be selected.

Figure 10A:
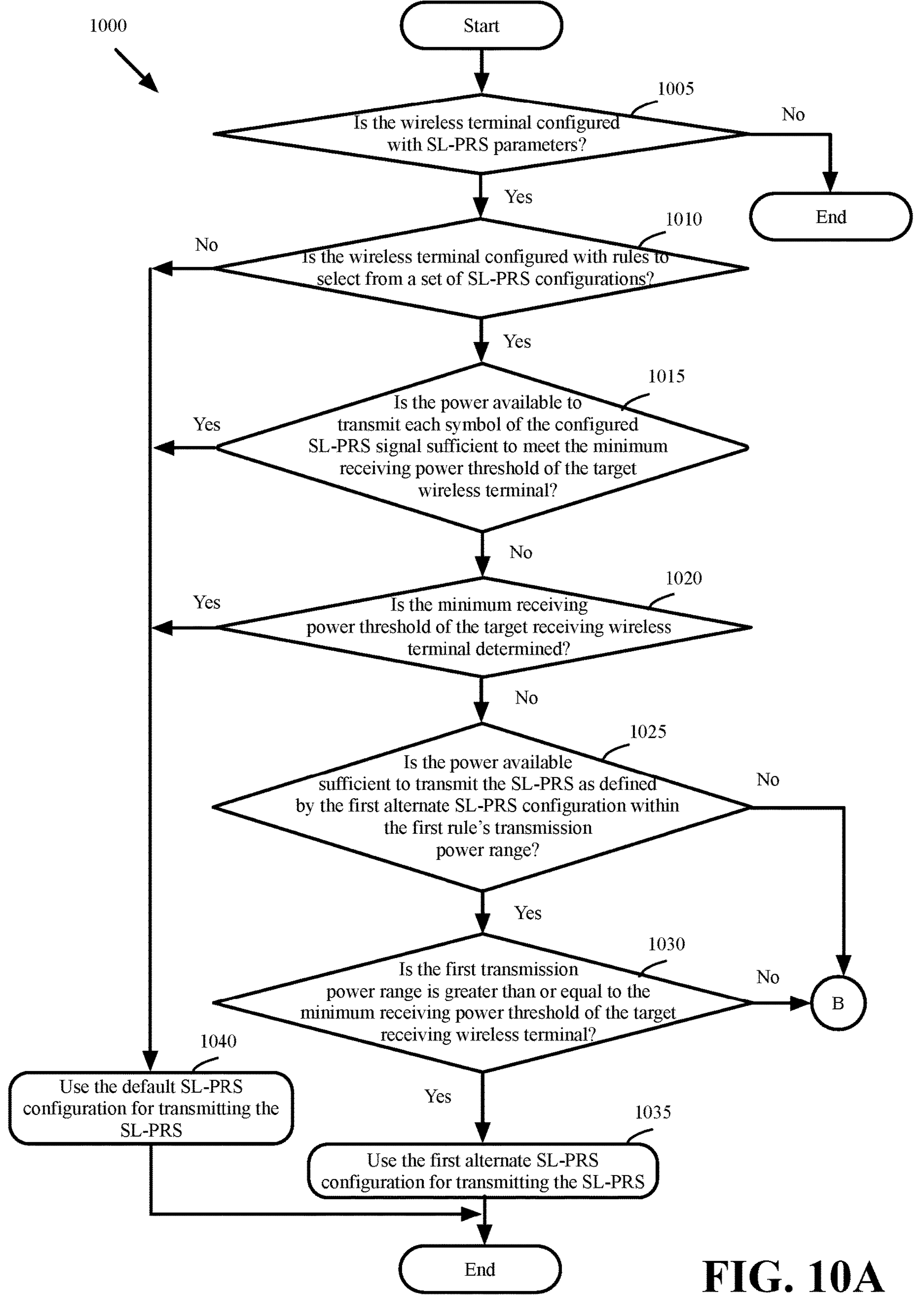
FIGS. 10A-10B illustrate a flowchart of an example method/process performed by a transmitting wireless terminal to reduce the number of symbols for transmitting an SL-PRS using several alternate SL-PRS configurations, according to an example implementation of the present disclosure.
Figure 10B:
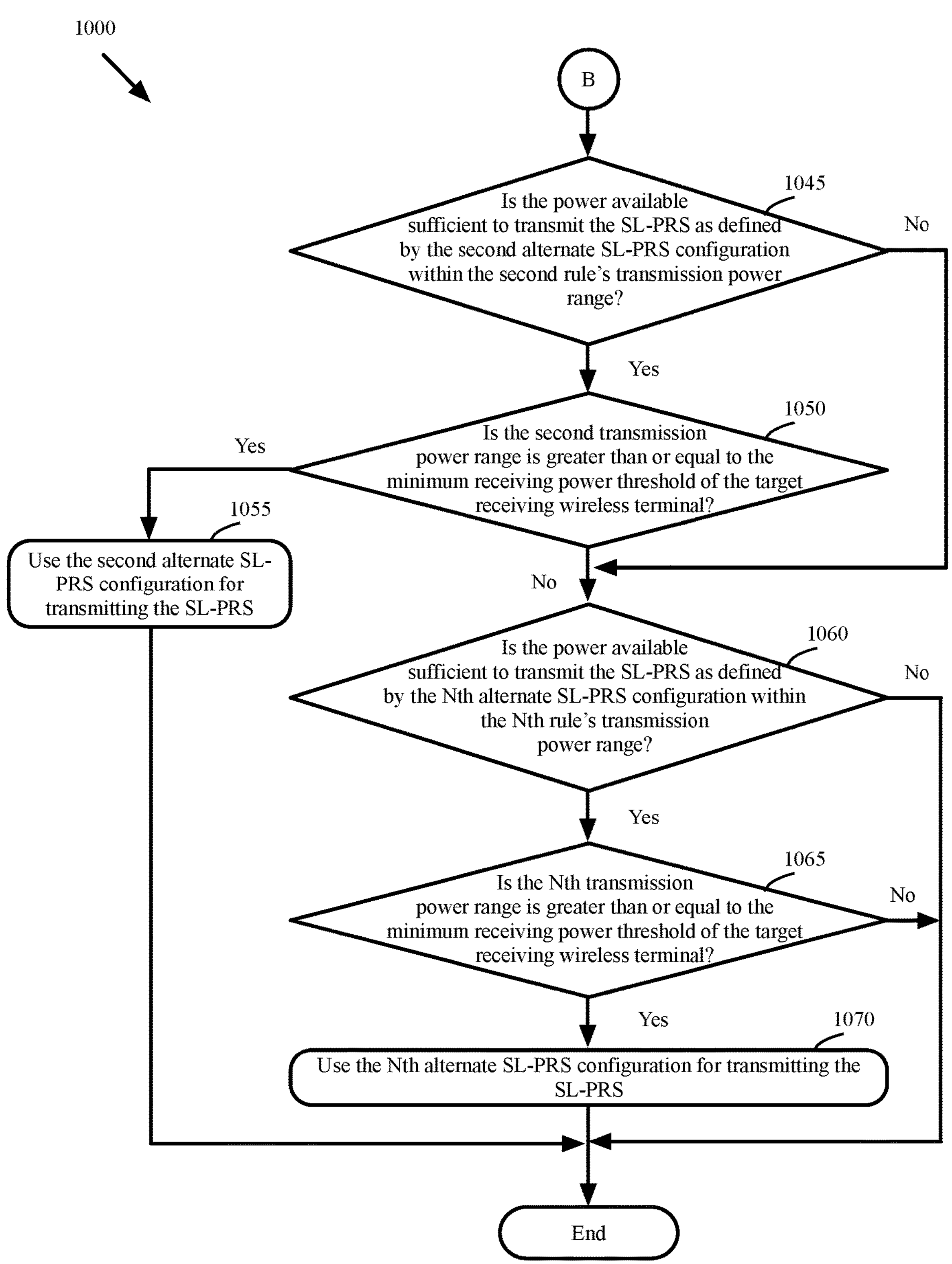

FIGS. 10A-10B illustrate a flowchart of an example method/process 1000 performed by a transmitting wireless terminal to reduce the number of symbols for transmitting an SL-PRS using several alternate SL-PRS configurations, according to an example implementation of the present disclosure. With reference to FIGS. 10A-10B, the process 1000 may be performed by at least one processor of any of the wireless terminals 101-104 of FIG. 1. The process 1000 may be performed, for example and without limitations, in response to the wireless terminal being triggered to transmit an SL-PRS.

At block 1005, a determination may be made as to whether the wireless terminal is configured with SL-PRS parameters. As described above, the wireless terminal may be pre-configured at the manufacturing time and/or through wireless signals with one or more SL-PRS configurations that may include different parameters. The wireless terminal may be pre-configured with SL-PRS parameters that are dimensioned to the capabilities of the wireless terminal. However, the pre-configured SL-PRS parameters may need to change in order to meet the available power of the wireless terminal as the signal detection threshold of a receiving wireless terminal. When the wireless terminal is not configured with the SL-PRS parameters, the process 1000 may end.

Otherwise, a determination may be made (at block 1010) as to whether the wireless terminal is configured with rules to select from a set of SL-PRS configurations. If not, the default SL-PRS configuration may be used (at block 1040) for transmitting the SL-PRS. The process 1000 may then end. The set of rules used by the selection process may define one or more ranges in the wireless terminal's transmission power. The ranges defined by the rules may be such that the maximum of any range is the maximum transmission power of the wireless terminal, and the minimum of any range is the minimum transmission power of the wireless terminal.

For example, a first rule may define a range from the maximum device transmission threshold to 91% of the maximum wireless terminal transmission threshold, and a second rule may define a range from 90% of the maximum wireless terminal transmission threshold to 81% of the maximum wireless terminal transmission threshold, and a third rule may define a range from 80% of the maximum wireless terminal transmission threshold to 71% of the maximum wireless terminal transmission threshold, and a fourth rule may define a range from 70% of the maximum wireless terminal transmission threshold to the wireless terminal's minimum transmission threshold.

When the wireless terminal is configured with rules to select from a set of SL-PRS configurations, a determination may be made (at block 1015) as to whether the power available to transmit each symbol of the configured SL-PRS signal is sufficient to meet the minimum receiving power threshold of the target wireless terminal. If yes, the process 1000 may proceed to block 1040, which was described above. It should be noted that the determination (at block 1020) may be made based the power that would be allocated to a single symbol of the SL-PRS, where the available power allocation to a single symbol may be an equal fractional part of the available power. For example, if each symbol of the SL-PRS that is to be transmitted is allocated an equal part of the available transmission power, then the determination of insufficient transmission power may be made at the level of a single symbol, and not on the total power that would be required to transmit the SL-PRS.

A determination may be made (at block 1020) as to whether the minimum receiving power threshold of the target/receiving wireless terminal is determined. For example, the minimum receiving power threshold of the target/receiving terminal may depend on the distance between the transmitting and receiving wireless terminals and the receiving wireless terminal's capabilities. When the minimum receiving power threshold of the target/receiving terminal is not determined, the process 1000 may proceed to block 1040, which was described above.

Otherwise, a determination may be made (at block 1025) as to whether the power available is sufficient to transmit the SL-PRS as defined by the first alternate SL-PRS configuration within the first rule's transmission power range. If not, the process 1000 may proceed to block 1045, which is described below. Otherwise, a determination may be made (at block 1030) as to whether the first transmission power range is greater than or equal to the minimum receiving power threshold of the target/receiving wireless terminal. If not, the process 1000 may proceed to block 1045, which is described below. Otherwise, the first alternate SL-PRS configuration may be used (at block 1035) for transmitting the SL-PRS. The process 1000 may then end.

At block 1045, a determination may be made as to whether the power available is sufficient to transmit the SL-PRS as defined by the second alternate SL-PRS configuration within the second rule's transmission power range. If yes, the second alternate SL-PRS configuration may be used (at block 1055 for transmitting the SL-PRS. The process 1000 may then end.

At block 1060, a determination may be made as to whether the power available is sufficient to transmit the SL-PRS as defined by the Nth alternate SL-PRS configuration within the Nth rule's transmission power range. If not, the process 1000 may end. Otherwise, the Nth alternate SL-PRS configuration may be used (at block 1070) for transmitting the SL-PRS. The process 1000 may then end.

It should be noted that, some implementations may only have two alternate SL-PRS configurations. In these implementations, blocks 1060-1070 may be skipped. Furthermore, some implementations may only have one alternate SL-PRS configuration. In these implementations, blocks 1045-1070 may be skipped.

Figure 10C:
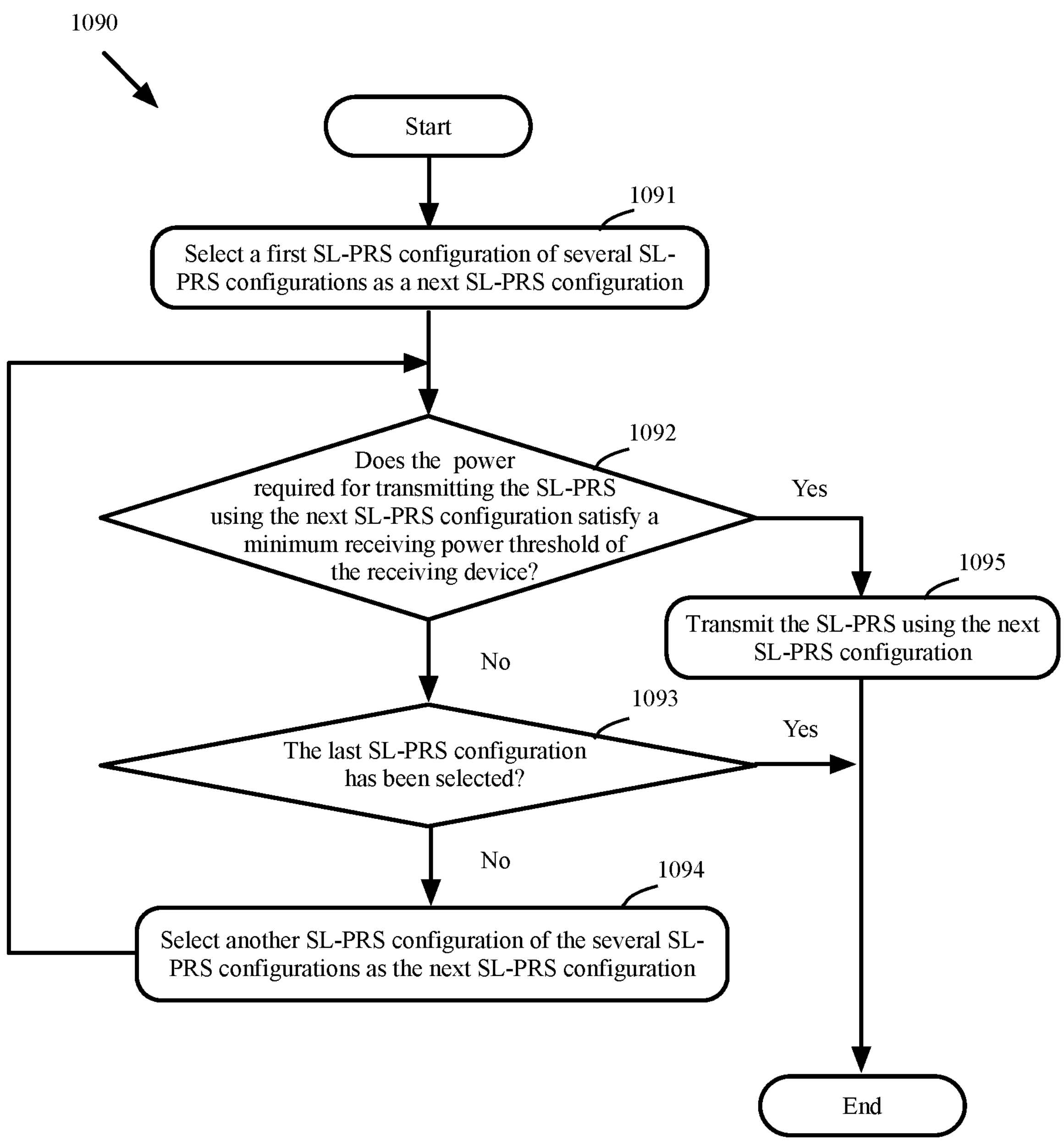
FIG. 10C is a flowchart illustrating an example method/process performed by a transmitting wireless terminal implementing the process of FIGS. 10A-10B, according to an example implementation of the present disclosure.

FIG. 10C is a flowchart illustrating an example method/process 1090 performed by a transmitting wireless terminal implementing the process of FIGS. 10A-10B, according to an example implementation of the present disclosure. With reference to FIG. 10C, the process 1090 may be performed by at least one processor of any of the wireless terminals 101-104 of FIG. 1. The process 1090 may be performed, for example and without limitations, in response to the wireless terminal being triggered to transmit an SL-PRS.

As shown in FIG. 10D, the process 1090 may select (at block 1091) a first SL-PRS configuration of several SL-PRS configurations as a next SL-PRS configuration. Each of the several SL-PRS configurations may be associated with a range of power that is available to the transmitting device. Each SL-PRS configuration may be associated with a range of power that is greater than the range of power associated with a subsequent SL-PRS configuration of the several SL-PRS configurations. Each of the SL-PRS configurations may specify a density of subcarrier and symbols occupied by the transmitted SL-PRS, a number of symbols that carry the SL-PRS, or a number of Physical PRBs allocated to the SL-PRS.

The wireless terminal may be pre-configured at the manufacturing time with one or more SL-PRS configurations that may include different parameters. For example, the SL-PRS configurations may be stored in the one or more non-transitory computer-readable media of the wireless terminal when the transmitting wireless terminal was manufactured.

In addition to, or in lieu of, being pre-configured at the manufacturing time, the wireless terminal may be pre-configured through wireless signals (e.g., received from the network). For example, in some implementations, the wireless terminal may receive the SL-PRS configurations via RRC signaling. As another example, the wireless terminal may receive a system information message that includes the SL-PRS configurations. The system information message may be received from a base station through broadcasting. The system information message may include an identification of the transmitting device. As another example, the wireless terminal may establish an RRC connection with a gNB, may enter an RRC-CONNECTED state with the gNB, and may receive the system information message from the gNB during the RRC-CONNECTED state.

The process 1090 may determine (at block 1092) as to whether the power required for transmitting the SL-PRS using the next SL-PRS configuration satisfies a minimum receiving power threshold of the receiving device.

When the power required for transmitting the SL-PRS using the next SL-PRS configuration satisfies the minimum receiving power threshold of the receiving device, the process 1090 may proceed to block 1095, which is described below. Otherwise, the process 590 may determine (at block 1093) as to whether the last SL-PRC parameter has been selected and determined. If the answer is yes, the process 1090 may end.

Otherwise, the process 1090 may select (at block 1094) another (e.g., a subsequent) SL-PRS configuration of the SL-PRS configurations as the next SL-PRS configuration. The process 1090 may then return back to block 1092, as described above.

At block 1095, the process 1090 may transmit the SL-PRS using the selected SL-PRS configuration. The process 1090 may then end. It should be noted that the process 1090 may repeat the blocks 1092-1094 until the power required for transmitting the SL-PRS using the next (or selected) SL-PRS configuration satisfies the minimum receiving power threshold of the receiving device or the last SL-PRS configuration of the several SL-PRS configurations has already been selected.

In some implementations, the process 1090 may also determine whether the power required for transmitting the SL-PRS using the next SL-PRS configuration meets the available power of the transmitting device.

Rules Configuration Command for Sending Multiple Configurations

The commands (herein also referred to as Rules Configuration commands and set of SL-PRS Configuration command), may be transmitted by a BS (e.g., a gNB) or other authorized transmission devices in one or more of multiple signaling methods. Such multiple signaling methods may include system information broadcast and dedicated signaling.

Figure 11:
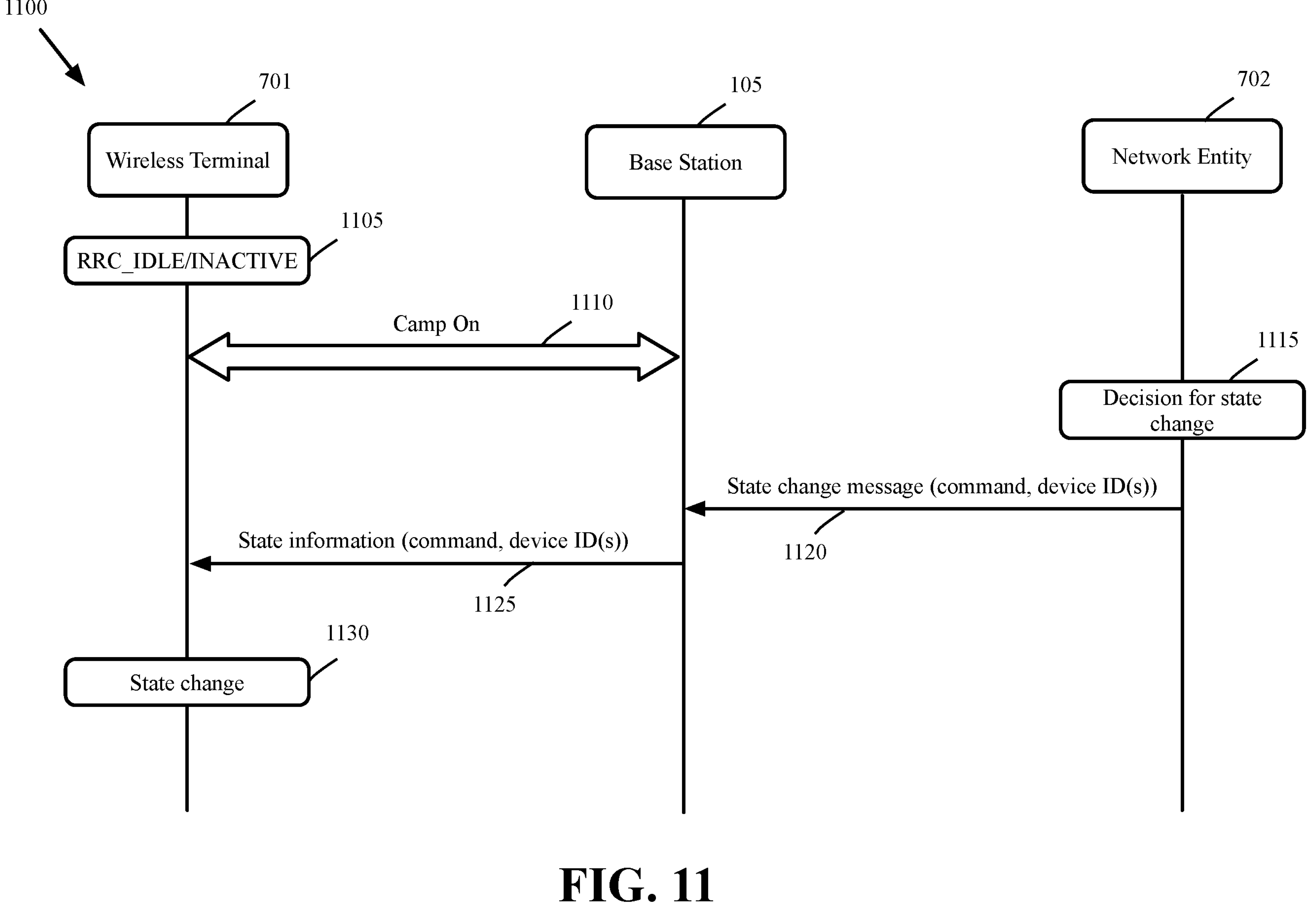
FIG. 11 is a sequence diagram illustrating an example message flow for a wireless terminal to receive a Rules Configuration command and the set of SL-PRS Configurations command by system information broadcast, according to an example implementation of the present disclosure.

FIG. 11 is a sequence diagram 1100 illustrating an example message flow for a wireless terminal to receive a Rules Configuration command and the set of SL-PRS Configurations command by system information broadcast, according to an example implementation of the present disclosure. With reference to FIG. 11, the wireless terminal 701 may be one of the energy harvesting wireless terminals 102 or 104 of FIG. 1. The network entity 702, may be similar to the network entity 702 of FIG. 7. In the example of FIG. 7, a network entity 702 may make a decision to send a Rules Configuration and the set of SL-PRS Configurations command to the wireless terminal 710.

At block 1105, the wireless terminal 701 may be in RRC_IDLE or RRC_INACTIVE state. As shown in step 1110, the wireless terminal 701 may be camping on a cell served by the BS 105. At block 1115, the network entity may decide to change the Rules Configuration of the wireless terminal 701. In step 1120, the network entity 702 may send the Rules Configuration and the set of SL-PRS Configurations message. The message, for example, may be a state change message that may include one or more rules (e.g., use method 1 and method 3). Each rule may be associated with one or more device IDs.

Additionally, or alternatively, the Rules Configuration message may include one or more device group IDs, each of the device group IDs may identify a group of devices. In step 1125, the BS 105 may broadcast the contents of the Rules Configuration Message and the set of SL-PRS Configurations in system information, such as one or more SIBs. In block 1130, the wireless terminal 701 may receive the system information broadcast and check if the device ID of the wireless terminal 701 is included. If so, the wireless terminal 1101 may change state (at block 1130) by executing the command to change the Rules Configuration and the set of SL-PRS Configurations as instructed by the received associated with the device ID of the wireless terminal 701.

Figure 12:
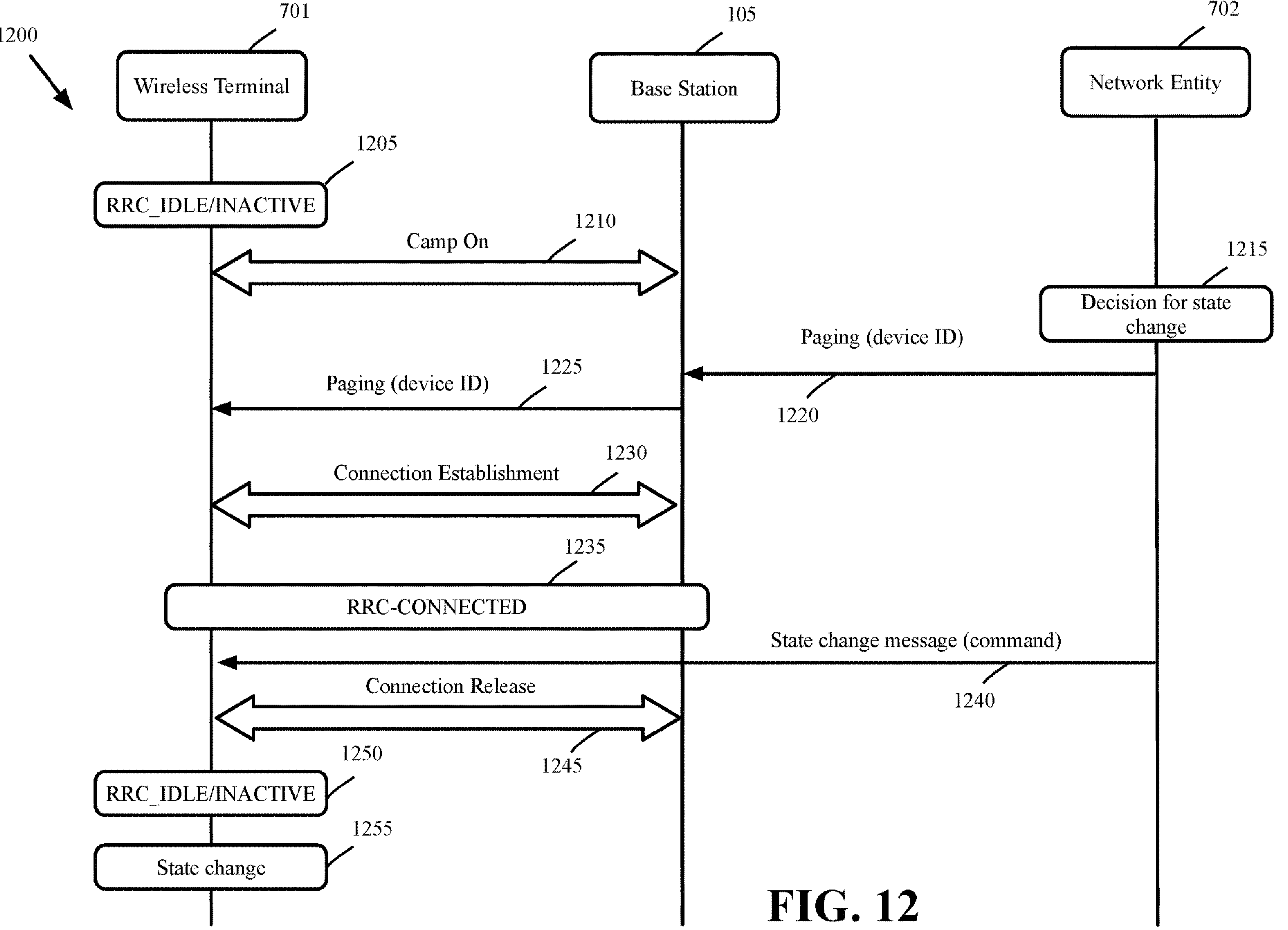
FIG. 12 is a sequence diagram illustrating an example message flow where the Rules Configuration command and the set of SL-PRS Configurations is delivered to the wireless terminal via a dedicated signaling, according to an example implementation of the present disclosure.

FIG. 12 is a sequence diagram 1200 illustrating an example message flow where the Rules Configuration command and the set of SL-PRS Configurations is delivered to the wireless terminal via a dedicated signaling, according to an example implementation of the present disclosure. With reference to FIG. 12, the wireless terminal 701, the network entity 702, and the BS 105 may be similar to the corresponding devices of FIG. 11.

At block 1205, the wireless terminal 701 may be in RRC_IDLE or RRC_INACTIVE state. As shown in step 1210, the wireless terminal 701 may be camping on a cell served by the BS 105. At block 1215, the network entity may decide to change the Rules Configuration of the wireless terminal 701. In step 1220, the network entity may send a paging message including the device ID of the wireless terminal 701. The paging message may be forwarded by the BS 105 to the wireless terminal 701 in step 1225. Upon receiving the paging message in step 1225, the wireless terminal 701 may initiate the connection establishment, as shown in step 1230, to establish an RRC connection.

Once the procedure of the connection establishment is completed, the wireless terminal 701 and the BS 105 may enter RRC_CONNECTED state, as shown in step 1235. During the RRC_CONNECTED state, the network entity 702 may send the Rules Configuration message and the set of SL-PRS configurations to the wireless terminal 701 as shown in step 1240. For step 1240, a Non-Access Stratum (NAS) message may be used. Additionally, or alternatively, a user plane message (e.g., IP packets) may be used for step 1240. In step 1245, the BS 105 may initiate a connection release procedure to instruct the wireless terminal 701 to enter RRC_IDLE or RRC_INACTIVE state (as shown in block 1250). In block 1255, the terminal 701 change state by executing the Rules Configuration command received in step 1240.

Figure 13:
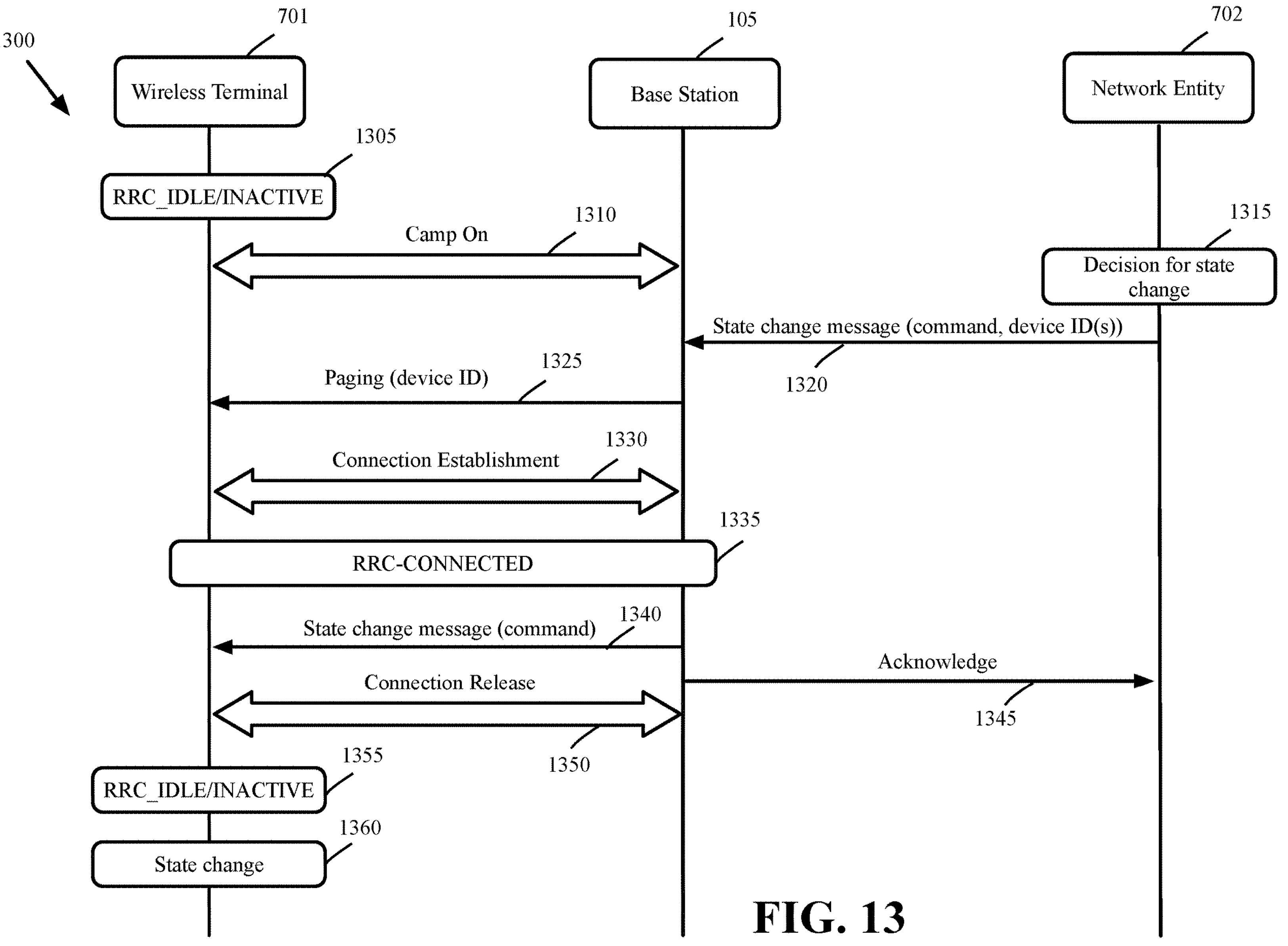
FIG. 13 is a sequence diagram illustrating another example message flow where the Rules Configuration and the set of SL-PRC configuration command is delivered to the wireless terminal via a dedicated signaling, according to an example implementation of the present disclosure.

FIG. 13 is a sequence diagram 1300 illustrating another example message flow where the Rules Configuration and the set of SL-PRC configuration command is delivered to the wireless terminal via a dedicated signaling, according to an example implementation of the present disclosure. With reference to FIG. 13, the wireless terminal 701, the network entity 702, and the BS 105 may be similar to the corresponding devices of FIGS. 11 and 12.

At block 1305, the wireless terminal 701 may be in RRC_IDLE or RRC_INACTIVE state. As shown in step 1310, the wireless terminal 701 may be camping on a cell served by the BS 105. At block 1315, the network entity may decide to change the Rules Configuration of the wireless terminal 701. In step 1320, the network entity may send a Rules Configuration and the set of SL-PRC configuration message including the Rules Configuration command and the device ID of the wireless terminal. In this case, the Rules Configuration message and the set of SL-PRC configuration may be sent and terminated in the BS 105, instructing the BS 105 to setup an RRC connection to the wireless terminal 701 and send the Rules Configuration and the set of SL-PRC configuration command in RRC signaling.

In step 1325, the BS 105 may send a paging message with the device ID of the wireless terminal 701. Upon receiving the paging message in step 1325, the wireless terminal 701 may initiate the connection establishment, as shown in step 1330, to establish an RRC connection. Once the procedure of the connection establishment is completed, the wireless terminal 701 and the BS 105 may enter RRC_CONNECTED state, as shown in step 1335.

As shown in step 1340, during the RRC_CONNECTED state, the BS 105 may send the Rules Configuration and the set of SL-PRC configuration message to the wireless terminal 701, as instructed by the network entity 702 in step 1320. For step 1340, an RRC message, such as RRCReconfiguration message may be used. In the case that the RRCReconfiguration message is used in another step, RRCReconfigurationComplete message may be used. The BS 105 may send another acknowledge to the network entity, in step 1350, to inform the network entity of the successful delivery of the Rules Configuration and the set of SL-PRC configuration command.

In step 1350, the BS 105 may initiate a connection release procedure to instruct the wireless terminal 701 to enter RRC_IDLE or RRC_INACTIVE state (as shown in block 1355). In block 1360, the terminal 701 change state by executing the Rules Configuration and the set of SL-PRC configuration command received in step 1340.

NR-DL-PRS-PDC-Info

The IE NR-DL-PRS-PDC-Info information element (IE) that defines downlink PRS configuration for PDC is described below in Tables 5 and 6.

TABLE 5

NR-DL-PRS-PDC-Info Information Element

```
-- ASN1START
-- TAG-NR-DL-PRS-PDC-INFO-START
NR-DL-PRS-PDC-Info-r17 ::=   SEQUENCE {
 nr-DL-PRS-PDC-ResourceSet-r17              NR-DL-PRS-PDC-ResourceSet-r17
OPTIONAL, -- Need R
 nr-DL-PRS-PDC-ResourceSets-r18 ::= SEQUENCE {
 nr-DL-PRS-PDC-ResourceSet-r18             SEQUENCE (SIZE (1..maxNrofPRS-
ResourcesPerSets-r18)) OF NR-DL-PRS-PDC-ResourceSet-r17
                                                        OPTIONAL, -- Need R
 nr-DL-PRS-PDC-ResourceSets-Rules-r18 SEQUENCE (SIZE (1..maxNrofPRS-
ResourcesPerSets-r18)) OF NR-DL-PRS-PDC-ResourceSet-Rule-r18
                                                         OPTIONAL, -- Need R
PRS-PDC-ResourceSet-Mode-r18
      OPTIONAL, -- Need R
    }
  ...
}
DL-PRS-PDC-ResourceSet-Rule-r18   ::=   SEQUENCE {
    upperTxPower INTEGER (-128..128),
    lowerTxPower INTEGER (-128..128)
    ...
}
NR-DL-PRS-PDC-ResourceSet-r17 ::=   SEQUENCE {
 periodicity AndOffset-r17      NR-DL-PRS-Periodicity-and-ResourceSetSlotOffset-r17,
 numSymbols-r17               ENUMERATED {n2, n4, n6, n12, spare4, spare3, spare2,
spare 1},
 dl-PRS-ResourceBandwidth-r17               INTEGER (1..63),
 dl-PRS-StartPRB-r17                 INTEGER (0..2176),
 resourceList-r17            SEQUENCE (SIZE (1..maxNrofPRS-ResourcesPerSet-r17)) OF
NR-DL-PRS-Resource-r17,
 repFactorAndTimeGap-r17          RepFactorAndTimeGap-r17        OPTIONAL,
-- Need S
 ...
}
NR-DL-PRS-Periodicity-and-ResourceSetSlotOffset-r17 ::= CHOICE {
 scs15-r17             CHOICE {
                  n4-r17          INTEGER (0..3),
                  n5-r17          INTEGER (0..4),
                  n8-r17          INTEGER (0..7),
                  n10-r17           INTEGER (0..9),
                  n16-r17           INTEGER (0..15),
                  n20-r17           INTEGER (0..19),
                  n32-r17           INTEGER (0..31),
                  n40-r17           INTEGER (0..39),
                  n64-r17           INTEGER (0..63),
                  n80-r17           INTEGER (0..79),
```

TABLE 5-continued

NR-DL-PRS-PDC-Info Information Element

```
                n160-r17        INTEGER (0..159),
                n320-r17        INTEGER (0..319),
                n640-r17        INTEGER (0..639),
                n1280-r17        INTEGER (0..1279),
                n2560-r17        INTEGER (0..2559),
                n5120-r17        INTEGER (0..5119),
                n10240-r17        INTEGER (0..10239),
                ...
 },
 scs30-r17         CHOICE {
                n8-r17        INTEGER (0..7),
                n10-r17        INTEGER (0..9),
                n16-r17        INTEGER (0..15),
                n20-r17        INTEGER (0..19),
                n32-r17        INTEGER (0..31),
                n40-r17        INTEGER (0..39),
                n64-r17        INTEGER (0..63),
                n80-r17        INTEGER (0..79),
                n128-r17        INTEGER (0..127),
                n160-r17        INTEGER (0..159),
                n320-r17        INTEGER (0..319),
                n640-r17        INTEGER (0..639),
                n1280-r17        INTEGER (0..1279),
                n2560-r17        INTEGER (0..2559),
                n5120-r17        INTEGER (0..5119),
                n10240-r17        INTEGER (0..10239),
                n20480-r17        INTEGER (0..20479),
                ...
 },
 scs60-r17         CHOICE {
                n16-r17        INTEGER (0..15),
                n20-r17        INTEGER (0..19),
                n32-r17        INTEGER (0..31),
                n40-r17        INTEGER (0..39),
                n64-r17        INTEGER (0..63),
                n80-r17        INTEGER (0..79),
                n128-r17        INTEGER (0..127),
                n160-r17        INTEGER (0..159),
                n256-r17        INTEGER (0..255),
                n320-r17        INTEGER (0..319),
                n640-r17        INTEGER (0..639),
                n1280-r17        INTEGER (0..1279),
                n2560-r17        INTEGER (0..2559),
                n5120-r17        INTEGER (0..5119),
                n10240-r17        INTEGER (0..10239),
                n20480-r17        INTEGER (0..20479),
                n40960-r17        INTEGER (0..40959),
                ...
 },
 scs120-r17         CHOICE {
                n32-r17        INTEGER (0..31),
                n40-r17        INTEGER (0..39),
                n64-r17        INTEGER (0..63),
                n80-r17        INTEGER (0..79),
                n128-r17        INTEGER (0..127),
                n160-r17        INTEGER (0..159),
                n256-r17        INTEGER (0..255),
                n320-r17        INTEGER (0..319),
                n512-r17        INTEGER (0..511),
                n640-r17        INTEGER (0..639),
                n1280-r17        INTEGER (0..1279),
                n2560-r17        INTEGER (0..2559),
                n5120-r17        INTEGER (0..5119),
                n10240-r17        INTEGER (0..10239),
                n20480-r17        INTEGER (0..20479),
                n40960-r17        INTEGER (0..40959),
                n81920-r17        INTEGER (0..81919),
                ...
 },
 ...
}
NR-DL-PRS-Resource-r17 ::= SEQUENCE {
 nr-DL-PRS-ResourceID-r17              NR-DL-PRS-ResourceID-r17,
 dl-PRS-SequenceID-r17              INTEGER (0..4095),
 dl-PRS-CombSizeN-AndReOffset-r17    CHOICE {
     n2-r17                INTEGER (0..1),
     n4-r17                INTEGER (0..3),
```

TABLE 5-continued

```
NR-DL-PRS-PDC-Info Information Element

    n6-r17                  INTEGER (0..5),
    n12-r17                  INTEGER (0..11),
    ...
  },
  dl-PRS-ResourceSlotOffset-r17              INTEGER (0..maxNrofPRS-ResourceOffsetValue-1-
r17),
  dl-PRS-ResourceSymbolOffset-r17              INTEGER (0..12),
  dl-PRS-QCL-Info-r17              DL-PRS-QCL-Info-r17          OPTIONAL, --
Need N
  ...
}
DL-PRS-QCL-Info-r17 ::= CHOICE {
  ssb-r17              SEQUENCE {
    ssb-Index-r17              INTEGER (0..63),
    rs-Type-r17              ENUMERATED {typeC, typeD, typeC-plus-typeD},
    ...
  },
  dl-PRS-r17              SEQUENCE {
    qcl-DL-PRS-ResourceID-r17              NR-DL-PRS-ResourceID-r17,
    ...
  },
  ...
}
NR-DL-PRS-ResourceID-r17 ::= INTEGER (0..maxNrofPRS-ResourcesPerSet-1-r17)
RepFactorAndTimeGap-r17 ::= SEQUENCE {
  repetitionFactor-r17          ENUMERATED {n2, n4, n6, n8, n16, n32, spare2, spare1},
  timeGap-r17              ENUMERATED {s1, s2, s4, s8, s16, s32, spare2, spare1}
}
-- TAG-NR-DL-PRS-PDC-INFO-STOP
-- ASN1STOP
```

TABLE 6

| nr-DL-PRS-PDC-ResourceSets-r18 |
|---|
| A set of one or more NR-DL-PRS-PDC-ResourceSet data objects. Where each NR-DL-PRS-PDC-ResourceSet object of the nr-DL-PRS-PDC-ResourceSets-r18 is associated with at DL-PRS-PDC-ResourceSet-Rule-r18 object, and each DL-PRS-PDC-ResourceSet-Rule-r18 object includes a upperTxPower and lowerTxPower<br>upperTxPower |
| Indicates the energy detection threshold value. Unit in dBm. Value −128 corresponds to −128 dBm, value 128 corresponds to 128 dBm, and so on<br>lowerTxPower |
| Indicates the energy detection threshold value. Unit in dBm. Value −128 corresponds to −128 dBm, value 128 corresponds to 128 dBm, and so on<br>DL-PRS-PDC-ResourceSet-Mode-r18 |
| Indicates the use of mode1 resources or mode2 resources by this configuration. Where mode1 and mode2 refer to the configured sub-channels in NR V2X SL communications using the NR V2X PC5 interface |

Figure 14:
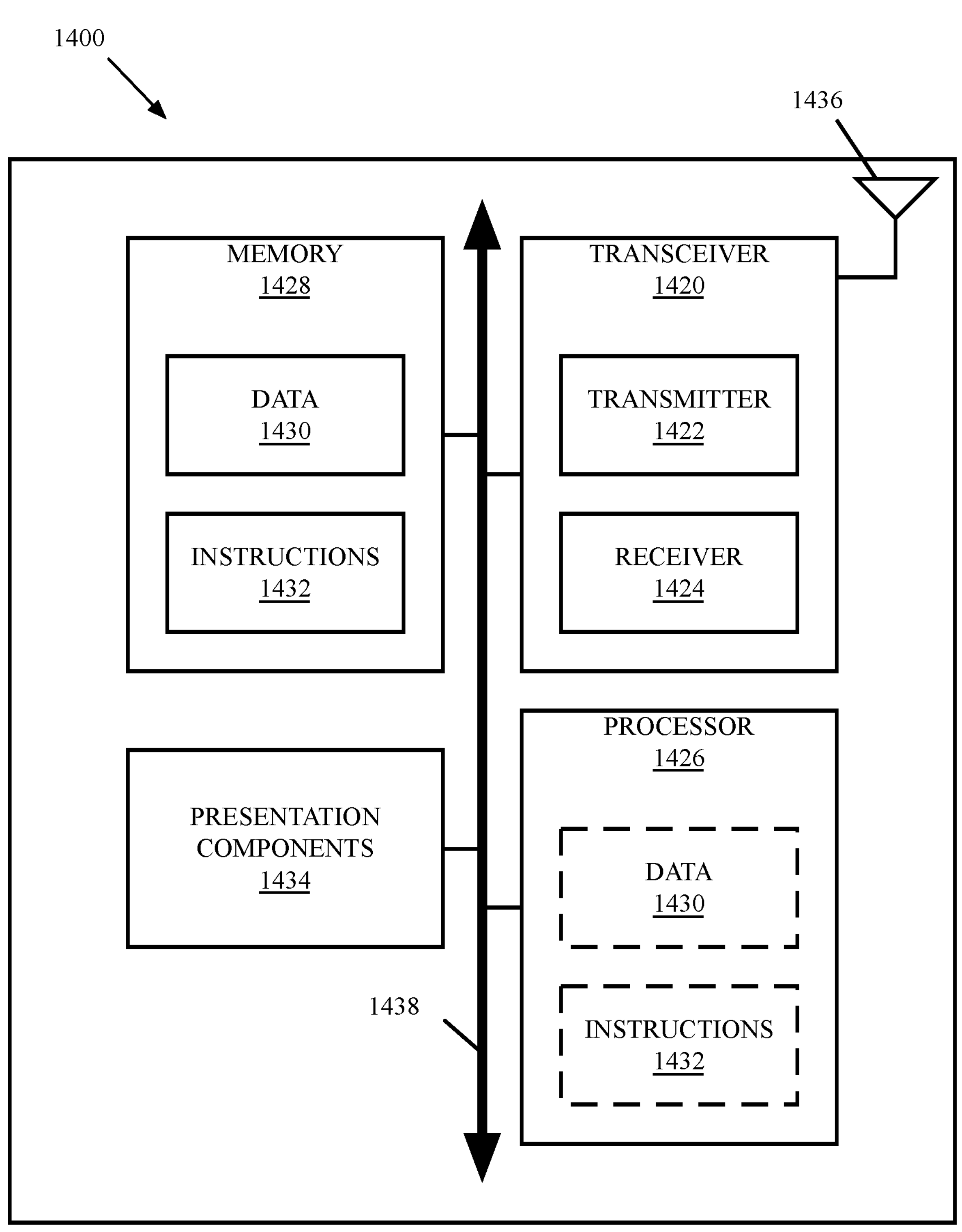
FIG. 14 illustrates a block diagram of a node for wireless communication, according to an example implementation of the present disclosure.

FIG. 14 illustrates a block diagram of a node for wireless communication according to an example implementation of the present disclosure. The node 1400 may, for example, be any of the wireless terminals described above.

As shown in FIG. 14, node 1400 may include transceiver 1420, processor 1426, memory 1428, one or more presentation components 1434, and at least one antenna 1436. Node 1400 may also include a Radio Frequency (RF) spectrum band module, a base station communications module, a network communications module, and a system communications management module, input/output (I/O) ports, I/O components, and power supply (not explicitly shown in FIG. 14). Each of these components may be in communication with each other, directly or indirectly, over one or more buses 1440.

Transceiver 1420 having transmitter 1422 and receiver 1424 may be configured to transmit and/or receive time and/or frequency resource partitioning information. In some implementations, transceiver 1420 may be configured to transmit in different types of subframes and slots including, but not limited to, usable, non-usable, and flexibly usable subframes and slot formats. Transceiver 1420 may be configured to receive data and control signaling.

Node 1400 may include a variety of computer-readable media. Computer-readable media can be any available media that can be accessed by node 1400 and include both volatile and non-volatile media, removable and non-removable media. By way of example, and not limitation, computer-readable media may include computer storage media and communication media. Computer storage media may include both volatile and non-volatile, removable and non-removable media implemented in any method or technology for storage of information, such as computer-readable instructions, data structures, program modules, or other data.

Computer storage media include RAM, ROM, EEPROM, flash memory, or other memory technology, CD-ROM, digital versatile disks (DVD), or other optical disk storage, magnetic cassettes, magnetic tape, magnetic disk storage, or other magnetic storage devices. Computer storage media do not include a propagated data signal. Communication media typically embody computer-readable instructions, data structures, program modules, or other data in a modulated data signal, such as a carrier wave, or other transport mechanism and includes any information delivery media. The term "modulated data signal" means a signal that has one or more of its characteristics set or changed in such a manner as to encode information in the signal. By way of example, and not limitation, communication media include wired media, such as a wired network or direct-wired connection, and wireless media, such as acoustic, RF, infrared, and other wireless media. Combinations of any of the above should also be included within the scope of computer-readable media.

Memory 1428 may include computer-storage media in the form of volatile and/or non-volatile memory. Memory 1428 may be removable, non-removable, or a combination thereof. Exemplary memory includes solid-state memory, hard drives, optical-disc drives, etc. As illustrated in FIG. 14, memory 1428 may store computer-readable, computer-executable instructions 1432 (e.g., software codes) that are configured to, when executed, cause processor 1426 to perform various functions described herein, for example, with reference to FIGS. 1 through 14. Alternatively, instructions 1432 may not be directly executable by processor 1426 but be configured to cause node 1400 (e.g., when compiled and executed) to perform various functions described herein.

Processor 1426 may include an intelligent hardware device, for example, a central processing unit (CPU), a microcontroller, an ASIC, etc. Processor 1426 may include memory. Processor 1426 may process data 1430 and instructions 1432 received from memory 1428, and information through transceiver 1420, the baseband communications module, and/or the network communications module. Processor 1426 may also process information to be sent to transceiver 1420 for transmission through antenna 1436, to the network communications module for transmission to a core network.

One or more presentation components 1434 presents data indications to a person or other device. For example, one or more presentation components 1434 include a display device, speaker, printing component, vibrating component, etc.

From the above description, it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A transmitting wireless terminal for wirelessly communicating with a receiving wireless terminal, wherein the transmitting wireless terminal harvests energy as a power source, the transmitting wireless terminal comprising:

one or more non-transitory computer-readable media storing one or more computer-executable instructions; and at least one processor coupled to the one or more non-transitory computer-readable media, and configured to execute the one or more computer-executable instructions to cause the transmitting wireless terminal to:

select a first Sidelink Position Reference Signal (SL-PRS) configuration of a plurality of SL-PRS configurations as a next SL-PRS configuration;

determine whether power required for transmitting an SL-PRS using the next SL-PRS configuration satisfies a minimum receiving power threshold of the receiving wireless terminal;

when the power required for transmitting the SL-PRS using the next SL-PRS configuration does not satisfy the minimum receiving power threshold of the receiving wireless terminal:

select another SL-PRS configuration of the plurality of SL-PRS configurations as the next SL-PRS configuration, and repeat the determining and the selecting of the next SL-PRS configuration until the power required for transmitting the SL-PRS using the next SL-PRS configuration satisfies the minimum receiving power threshold of the receiving wireless terminal or until a last SL-PRS configuration in the plurality of SL-PRS configurations is not selected for transmitting the SL-PRS; and transmit the SL-PRS using the next SL-PRS configuration when the next SL-PRS configuration is not the last SL-PRS configuration that is not selected as the next SL-PRS configuration, wherein each of the plurality of SL-PRS configurations is associated with a range of power that is available to the transmitting wireless terminal, and each SL-PRS configuration in the plurality of SL-PRS configurations is associated with a range of power that is greater than a range of power associated with a subsequent SL-PRS configuration in the plurality of SL-PRS configurations.

2. The transmitting wireless terminal of claim 1, wherein the determining comprises determining whether the power required for transmitting the SL-PRS using the next SL-PRS configuration meets available power of the transmitting wireless terminal.

3. The transmitting wireless terminal of claim 1, wherein each of the plurality of SL-PRS configurations specifies a density of subcarrier and symbols occupied by the transmitted SL-PRS.

4. The transmitting wireless terminal of claim 1, wherein each of the plurality of SL-PRS configurations specifies a number of symbols that carries the SL-PRS.

5. The transmitting wireless terminal of claim 1, wherein each of the plurality of SL-PRS configurations specifies a number of Physical Resource Blocks (PRBs) allocated to the SL-PRS.

6. The transmitting wireless terminal of claim 1, wherein the plurality of SL-PRS configurations is stored in the one or more non-transitory computer-readable media when the transmitting wireless terminal was manufactured.

7. The transmitting wireless terminal of claim 1, wherein the at least one processor is further configured to execute the one or more computer-executable instructions to cause the transmitting wireless terminal to receive the plurality of SL-PRS configurations via radio resource control (RRC) signaling.

8. The transmitting wireless terminal of claim 1, wherein the at least one processor is further configured to execute the one or more computer-executable instructions to cause the transmitting wireless terminal to receive a system information message comprising the plurality of SL-PRS configurations.

9. The transmitting wireless terminal of claim 8, wherein:
receiving the system information message comprises receiving the system information message from a base station through broadcasting, and
the system information message further comprises an identification of the transmitting wireless terminal.

10. The transmitting wireless terminal of claim 8, wherein the at least one processor is further configured to execute the one or more computer-executable instructions to cause the transmitting wireless terminal to:
establish a radio resource control (RRC) connection with a next-generation node B (gNB);
enter an RRC-CONNECTED state with the gNB; and
receive the system information message from the gNB during the RRC-CONNECTED state.

11. A method of wireless communication performed by a transmitting wireless terminal, wherein the transmitting wireless terminal harvests energy as a power source, the method comprising:
selecting a first Sidelink Position Reference Signal (SL-PRS) configuration of a plurality of SL-PRS configurations as a next SL-PRS configuration;
determining whether power required for transmitting an SL-PRS using the next SL-PRS configuration satisfies a minimum receiving power threshold of a receiving wireless terminal;
when the power required for transmitting the SL-PRS using the next SL-PRS configuration does not satisfy the minimum receiving power threshold of the receiving wireless terminal:
selecting another SL-PRS configuration of the plurality of SL-PRS configurations as the next SL-PRS configuration, and
repeating the determining and the selecting of the next SL-PRS configuration until the power required for transmitting the SL-PRS using the next SL-PRS configuration satisfies the minimum receiving power threshold of the receiving wireless terminal or until a last SL-PRS configuration in the plurality of SL-PRS configurations is not selected for transmitting the SL-PRS; and
transmitting the SL-PRS using the next SL-PRS configuration when the next SL-PRS configuration is not the last SL-PRS configuration that is not selected as the next SL-PRS configuration,
wherein each of the plurality of SL-PRS configurations is associated with a range of power that is available to the transmitting wireless terminal, and
each SL-PRS configuration in the plurality of SL-PRS configurations is associated with a range of power that is greater than a range of power associated with a subsequent SL-PRS configuration in the plurality of SL-PRS configurations.

* * * * *